US011442256B2

(12) United States Patent
Chen et al.

(10) Patent No.: US 11,442,256 B2
(45) Date of Patent: Sep. 13, 2022

(54) IMAGING OPTICAL LENS ASSEMBLY, IMAGING APPARATUS AND ELECTRONIC DEVICE

(71) Applicant: LARGAN PRECISION CO., LTD., Taichung (TW)

(72) Inventors: Wei-Yu Chen, Taichung (TW); Hsiang-Chi Tang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 563 days.

(21) Appl. No.: 16/522,900

(22) Filed: Jul. 26, 2019

(65) Prior Publication Data

US 2020/0150406 A1 May 14, 2020

(30) Foreign Application Priority Data

Nov. 14, 2018 (TW) .................. 107140457

(51) Int. Cl.
| | |
|---|---|
| *G02B 13/18* | (2006.01) |
| *G02B 13/04* | (2006.01) |
| *G03B 9/06* | (2021.01) |
| *G02B 13/00* | (2006.01) |
| *G03B 9/07* | (2021.01) |
| *G02B 9/04* | (2006.01) |
| *G02B 5/00* | (2006.01) |
| *G02B 9/02* | (2006.01) |

(52) U.S. Cl.
CPC .............. *G02B 13/18* (2013.01); *G02B 13/04* (2013.01); *G03B 9/06* (2013.01); *G02B 5/005* (2013.01); *G02B 9/02* (2013.01); *G02B 9/04* (2013.01); *G02B 13/004* (2013.01); *G02B 13/0035* (2013.01); *G02B 13/0045* (2013.01); *G02B 13/0065* (2013.01); *G03B 9/07* (2013.01)

(58) Field of Classification Search
CPC .............. G02B 13/0035; G02B 13/004; G02B 13/0045; G02B 13/18; G02B 13/0065; G02B 13/04; G02B 5/005; G03B 9/02; G03B 9/04; G03B 9/06; G03B 9/07
USPC .......................................... 359/739–740, 680
See application file for complete search history.

(56) References Cited

U.S. PATENT DOCUMENTS

| | | | |
|---|---|---|---|
| 6,538,827 B2 | 3/2003 | Bos | |
| 6,866,198 B2 | 3/2005 | Patel et al. | |
| 9,417,445 B2 | 8/2016 | Suga | |
| 10,852,511 B2 | 12/2020 | Lee et al. | |
| 2013/0128084 A1* | 5/2013 | Vinogradov | G02B 13/006 359/717 |
| 2013/0215395 A1* | 8/2013 | Li | G02B 13/16 359/713 |
| 2014/0346230 A1* | 11/2014 | Liu | G02B 13/004 359/715 |

(Continued)

FOREIGN PATENT DOCUMENTS

| | | |
|---|---|---|
| CN | 1497490 A | 5/2004 |
| CN | 102183835 A | 9/2011 |
| CN | 202057894 U | 11/2011 |

(Continued)

*Primary Examiner* — Evelyn A Lester
(74) *Attorney, Agent, or Firm* — McClure, Qualey & Rodack, LLP

(57) ABSTRACT

An imaging optical lens assembly includes an aperture stop and a plurality of lens elements. The aperture stop has a fixed elliptical shape, and the aperture stop has a major axis and a minor axis.

25 Claims, 46 Drawing Sheets

(56) References Cited

U.S. PATENT DOCUMENTS

2016/0327773 A1  11/2016  Choi et al.
2018/0210314 A1* 7/2018  Märtin .................... G03B 9/04

FOREIGN PATENT DOCUMENTS

| CN | 108802968 A | | 11/2018 |
|---|---|---|---|
| EP | 3358818 A1 | | 8/2018 |
| JP | H0769515 B2 | * | 7/1995 |
| JP | 2007-328030 A | * | 12/2007 |
| JP | 2014-107593 A | * | 6/2014 |
| JP | WO2015064521 A1 | | 3/2017 |

* cited by examiner

IMAGING OPTICAL LENS ASSEMBLY, IMAGING APPARATUS AND ELECTRONIC DEVICE

RELATED APPLICATIONS

This application claims priority to Taiwan Application Serial Number 107140457, filed Nov. 14, 2018, which is herein incorporated by reference.

BACKGROUND

Technical Field

The present disclosure relates to an imaging optical lens assembly and an imaging apparatus. More particularly, the present disclosure relates to an imaging optical lens assembly and an imaging apparatus with compact size applicable to electronic devices.

Description of Related Art

With a wider range of applications in photographing modules, installing photographing modules in various smart electronic devices, portables, mobile devices, recognition devices, entertainment systems, sporting devices and smart home assisting systems is becoming a major trend in developments for the future technology, especially portables which are in high demands on the market. In order to obtain more extensive experiences in utilizations, smart devices with one, two or more than three lens assemblies are becoming the market mainstream, and various photographing modules with different features are developed in response to different demands.

Further, with recent demands of compact electronic devices, conventional photographing modules are unable to satisfy both requirements of a high-end specification and compactness, especially features like a large aperture or a micro lens assembly with a wider field of view. Due to demands of higher specifications in zoom lens assemblies (such as increasing the zoom ratio, etc.), conventional telephoto lens assemblies cannot satisfy the requirements (due to an excessive total track length, overly small aperture, poor image quality or lack of compactness), so that different arrangements of lens properties or folded optics are needed. Due to thickness limitations of electronic devices, the lens assembly or a singular lens element in optical lens systems would be cut (such as D-cut), so as to reduce the size of the lens assembly in a single direction by removing a non-imaging portion of a lens element or of multiple lens elements. However, it is hard to apply the same technique to the telephoto lens assembly since the variation in effective imaging areas between the front end and the rear end is smaller, the cut of the lens element at the rear end would be much less effective, especially when the lens element at the front end cannot be cut due to the size restriction of the aperture. Thus, there is a need for new solutions in solving the aforementioned problems.

SUMMARY

According to one aspect of the present disclosure, an imaging optical lens assembly includes an aperture stop and a plurality of lens elements. The aperture stop has a fixed elliptical shape, and the aperture stop has a major axis and a minor axis. When a major axis diameter of the aperture stop is ESDX, a minor axis diameter of the aperture stop is ESDY, a focal length of the imaging optical lens assembly is f, one of the lens elements closest to an object side is a first lens element, and an axial distance between an object-side surface of the first lens element and an image surface is TL, the following conditions are satisfied:

1.08<ESDX/ESDY; and

TL/f<1.20.

According to another aspect of the present disclosure, an imaging apparatus includes the imaging optical lens assembly of the aforementioned aspect and an image sensor, wherein the image sensor is disposed on the image surface of the imaging optical lens assembly.

According to another aspect of the present disclosure, an electronic device includes the imaging apparatus of the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
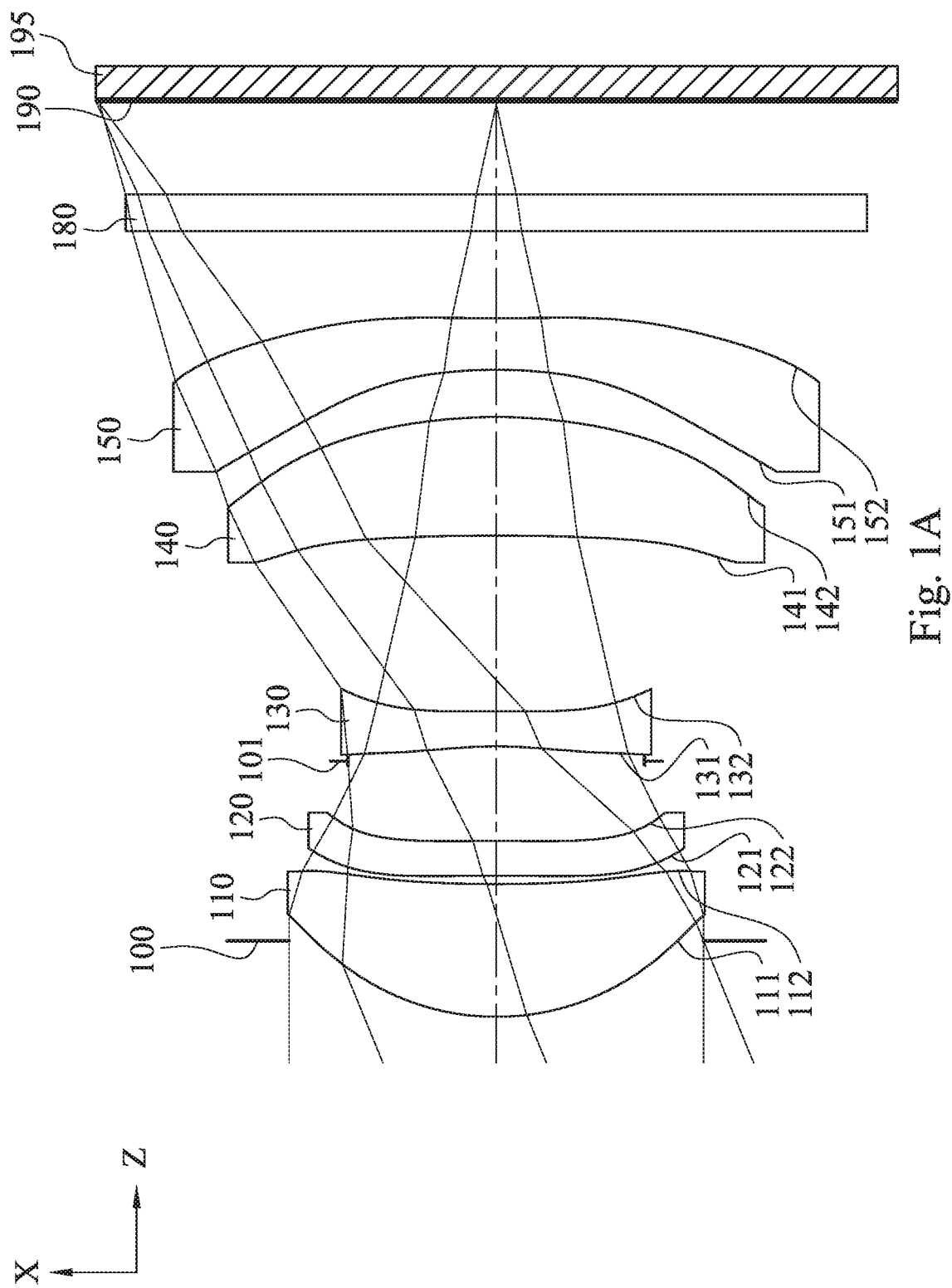
FIG. 1A is a schematic view of an imaging apparatus in a major axis direction of an aperture stop therein according to the 1st embodiment of the present disclosure.

An imaging optical lens assembly includes an aperture stop and a plurality of lens elements. The aperture stop has a fixed elliptical shape, and the aperture stop has a major axis and a minor axis. Therefore, by the arrangement of the elliptical aperture stop instead of a conventional circular aperture stop, it is favorable for reducing the size of the imaging optical lens assembly by shortening an optical effective diameter in one axial direction (such as an axis with the highest degree of space limitation) of the aperture stop, at the same time, an optical effective diameter in another axial direction with lesser space limitation can be increased for providing the effective F-number. Furthermore, it is favorable for shrinking or cutting the lens elements or a lens barrel in an axial direction and also maintaining sufficient image illumination by the arrangement of the elliptical aperture stop.

When a major axis diameter of the aperture stop is ESDX, and a minor axis diameter of the aperture stop is ESDY, the following condition is satisfied: $1.08 < ESDX/ESDY$. Therefore, it is favorable for providing the compactness and sufficient incident light by balancing the ratio between the major axis and the minor axis of the elliptical aperture stop. Moreover, the following condition can be satisfied: $1.10 < ESDX/ESDY < 1.50$.

When a focal length of the imaging optical lens assembly is f, one of the lens elements closest to an object side is a first lens element, and an axial distance between an object-side surface of the first lens element and an image surface is TL, the following condition is satisfied: $TL/f < 1.20$. Therefore, it is favorable for reducing the total track length of the imaging optical lens assembly with improved telephoto functionality thereof. Moreover, the following condition can be satisfied: 0.50<TL/f<1.0.

When a maximum among refractive indices of the lens elements of the imaging optical lens assembly is Nmax, the following condition is satisfied: Nmax<1.70. Therefore, it is favorable for effectively correcting astigmatism of the imaging optical lens assembly. Furthermore, when a minimum among Abbe numbers of the lens elements of the imaging optical lens assembly is Vmin, the following condition is satisfied: Vmin<22. Therefore, it is favorable for reducing the outer diameter of the imaging optical lens assembly and enhancing the compactness thereof by balancing the corrections of chromatic aberration and astigmatism while reducing the effective radius of each lens element. Moreover, the following condition can be satisfied: Vmin<20.

In the imaging optical lens assembly, there are five or more lens elements, and at least three of the lens elements are made of plastic material. Due to the major axis of the elliptical aperture stop is greater than the diameter of a circle with the same area, the instantaneous aperture would be larger. Having five or more lens elements is favorable for correcting astigmatism generated from the major axis of the elliptical aperture stop. Furthermore, the lens elements made of plastic material can be easier to cut into rectangular shapes so as to obtain the compact size of the imaging optical lens assembly.

The first lens element has positive refractive power, and a maximum optical effective diameter of the first lens element is a maximum among maximum optical effective diameters of the lens elements of the imaging optical lens assembly. Therefore, the configuration of the first lens element is favorable for the elliptical aperture stop and for focusing on the image surface along the major axis with sufficient incident light.

A central thickness of the first lens element is a maximum among central thicknesses of the lens elements of the imaging optical lens assembly. Therefore, it is favorable for the assembling or the molding of the first lens element by ensuring the first lens element with sufficient mechanical strength.

When the central thickness of the first lens element is CT1, and a sum of central thicknesses of the lens elements of the imaging optical lens assembly is ΣCT, the following condition is satisfied: 0.55<CT1/(ΣCT-CT1). Therefore, it is favorable for obtaining a better balance between the mechanical strength of the first lens element and the compactness of the imaging optical lens assembly. Moreover, the following condition can be satisfied: 0.65<CT1/(ΣCT-CT1). Moreover, the following condition can be satisfied: 0.8<CT1/(ΣCT-CT1).

The aperture stop can be located on an object side of the first lens element. Therefore, it is favorable for controlling the position and orientation of the elliptical aperture stop.

When a curvature radius of the object-side surface of the first lens element is R1, and the focal length of the imaging optical lens assembly is f, the following condition is satisfied: 3.50<f/R1. Therefore, it is favorable for light converging in the imaging optical lens assembly with sufficient refractive power of the first lens element. Moreover, the following condition can be satisfied: 4.0<f/R1.

Each of at least half of the lens elements has at least one surface being aspheric, and at least one of the lens elements includes at least one inflection point. Therefore, it is favorable for correcting aberrations of the peripheral image, especially the image in the major axis direction. Moreover, at least one of the lens elements includes at least one critical point.

When a maximum among optical effective radii of the lens elements is Ymax, the following condition is satisfied: Ymax<3.0 mm, wherein the optical effective radius is half of the optical effective diameter. Therefore, it is favorable for reducing the effective diameter so as to minimize the outer diameter. Moreover, the following condition can be satisfied: Ymax<2.5 mm.

When the focal length of the imaging optical lens assembly is f, the following condition is satisfied: 8 mm<f<18 mm. Therefore, it is favorable for controlling the size of the imaging optical lens assembly. Moreover, the following condition can be satisfied: 10 mm<f<16 mm.

When a maximum field of view of the imaging optical lens assembly is FOV, the following condition is satisfied: tan(FOV)<0.80. Therefore, it is favorable for providing desirable image quality in a telephoto configuration. Moreover, the following condition can be satisfied: tan(FOV)<0.70. Moreover, the following condition can be satisfied: tan(FOV)<0.55.

When the focal length of the imaging optical lens assembly is f, and a diameter of a circle with an area of the same size as an elliptical entrance pupil of the imaging optical lens assembly is EPDC, the following condition is satisfied: f/EPDC<3.5. Therefore, it is favorable for obtaining sufficient illumination of the image with a proper size aperture of the imaging optical lens assembly. Moreover, the following condition can be satisfied: f/EPDC<2.85.

In the imaging optical lens assembly, an outer diameter of at least one of the lens elements includes at least two cut sides. Therefore, it is favorable for providing compact lens elements by reducing the aperture size as well as the optical effective area in one axial direction, and further providing more utility of the elliptical aperture stop. Moreover, the outer diameter of at least one of the lens elements includes at least four cut sides.

When a double shortest distance from a center to the outer diameter of the at least one of the lens elements is LRmin, and a double longest distance from the center to the outer diameter of the at least one of the lens elements is LRmax, the following condition is satisfied: LRmin/LRmax<0.90. Therefore, it is favorable for balancing the ratio of the lens element corresponding to the major axis direction and the minor axis direction of the elliptical aperture stop so as to obtaining both the functionality of the elliptical aperture stop and the improved structure strength of the lens elements. Moreover, the following condition can be satisfied: LRmin/LRmax<0.80.

The imaging optical lens assembly can further include a lens barrel, wherein an outer diameter of the lens barrel includes at least two cut sides. Therefore, it is favorable for providing a compact lens assembly by reducing the aperture size in a single direction, and further providing the functionality of the elliptical aperture stop. Furthermore, when a double shortest distance from a center to the outer diameter of the lens barrel is BRmin, and a double longest distance from the center to the outer diameter of the lens barrel is BRmax, the following condition is satisfied: BRmin/BRmax<0.95. Moreover, the following condition can be satisfied: BRmin/BRmax<0.90.

The imaging optical lens assembly can further include a light blocking element, wherein an opening of the light blocking element is a non-circular opening. Therefore, the light blocking element can be arranged with the non-circular lens elements or lens barrel, so as to reduce the size of the imaging optical lens assembly. Moreover, the opening of the light blocking element can be elliptical.

The imaging optical lens assembly can further include at least one reflective element. Therefore, it is favorable for providing flexibility in space arrangements of the imaging optical lens assembly in a telephoto configuration. Moreover, the reflective element can be arranged on the object side of the first lens element.

Each of the aforementioned features of the imaging optical lens assembly can be utilized in various combinations for achieving the corresponding effects.

According to the imaging optical lens assembly of the present disclosure, the lens elements thereof can be made of glass or plastic materials. When the lens elements are made of glass materials, the distribution of the refractive power of the imaging optical lens assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the imaging optical lens assembly. Therefore, the total track length of the imaging optical lens assembly can also be reduced. The aspheric surfaces may be formed by plastic injection molding or glass molding.

According to the imaging optical lens assembly of the present disclosure, one or more of the lens material may optionally include an additive which alters the lens transmittance in a specific range of wavelength for reducing unwanted stray light or color deviation. For example, the additive may optionally filter out light in the wavelength range of 600 nm~800 nm for reducing excessive red light and/or near infra-red light, or may optionally filter out light in the wavelength range of 350 nm~450 nm to reduce excessive blue light and/or near ultra-violet light from interfering the final image. The additive may be homogenously mixed with a plastic material to be used in manufacturing a mixed-material lens element by injection molding.

According to the imaging optical lens assembly of the present disclosure, when a surface of a lens element is aspheric, it indicates that the surface has an aspheric shape throughout its optically effective area or a portion(s) thereof.

According to the imaging optical lens assembly of the present disclosure, each of an object-side surface and an image-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the imaging optical lens assembly of the present disclosure, the refractive power or the focal length of a lens element being positive or negative may refer to the refractive power or the focal length in a paraxial region of the lens element.

According to the imaging optical lens assembly of the present disclosure, a critical point is a non-axial point of the lens surface where its tangent is perpendicular to the optical axis.

According to the imaging optical lens assembly of the present disclosure, an inflection point is a point where a curvature is shifted from positive to negative or from negative to positive.

According to the imaging optical lens assembly of the present disclosure, the image surface of the imaging optical lens assembly, based on the corresponding image sensor, can be flat or curved. In particular, the image surface can be a concave curved surface facing towards the object side. According to the imaging optical lens assembly of the present disclosure, at least one image correcting element (such as a field flattener) can be selectively disposed between the lens element closest to the image side of the imaging optical lens assembly and the image surface so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface toward the object side and is disposed close to the image surface.

According to the imaging optical lens assembly of the present disclosure, the imaging optical lens assembly can include at least one stop, such as an aperture stop, a glare stop or a field stop. Said glare stop or said field stop is for eliminating the stray light and thereby improving the image resolution thereof.

According to the imaging optical lens assembly of the present disclosure, an aperture stop can be configured as a front stop or a middle stop. A front stop disposed between an object and the first lens element can provide a longer distance between an exit pupil of the imaging optical lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the imaging optical lens assembly and thereby provides a wider field of view for the same.

According to the imaging optical lens assembly of the present disclosure, an aperture adjusting unit can be properly configured. The aperture adjusting unit can be a mechanical part or a light control part, and the dimension and the shape of the aperture adjusting unit can be electrically controlled. The mechanical part can include a moveable component such as a blade group or a shielding plate. The light control part can include a screen component such as a light filter, an electrochromic material, a liquid crystal layer or the like. The amount of incident light or the exposure time of the image can be controlled by the aperture adjusting unit to enhance the image moderation ability. In addition, the aperture adjusting unit can be the aperture stop of the imaging optical lens assembly according to the present disclosure, so as to moderate the image properties such as depth of field or the exposure speed by changing f-number.

According to the imaging optical lens assembly of the present disclosure, the imaging optical lens assembly can be applied to 3D (three-dimensional) image capturing applications, in products such as digital cameras, mobile devices, digital tablets, smart TVs, surveillance systems, motion sensing input devices, driving recording systems, rearview camera systems, wearable devices, and unmanned aerial vehicles.

According to the present disclosure, an imaging apparatus is provided. The imaging apparatus includes the aforementioned imaging optical lens assembly and an image sensor, wherein the image sensor is disposed on the image side of the aforementioned imaging optical lens assembly, that is, the image sensor can be disposed on or near the image surface of the aforementioned imaging optical lens assembly. Therefore, by the arrangement of the elliptical aperture stop instead of a conventional circular aperture stop, it is favorable for reducing the size of the imaging optical lens assembly by arranging a shorter optical effective diameter in one axial direction (such as an axis with the highest degree of space limitation) of the aperture stop, at the same time, the optical effective diameter in another axial direction providing less limitation can be increased for maintaining the effective F-number. Furthermore, it is favorable for shrinking or cutting the lens elements or a lens barrel while maintaining sufficient image illumination by the arrangement of the elliptical aperture stop.

Furthermore, the imaging apparatus can further include a barrel member, a holder member or a combination thereof.

According to the present disclosure, an electronic device is provided, wherein the electronic device includes at least two photographing apparatuses facing towards the same object side of the imaging apparatus in the electronic device. Therefore, it is favorable for obtaining various photographing functions of the electronic device.

1st Embodiment

Figure 1B:
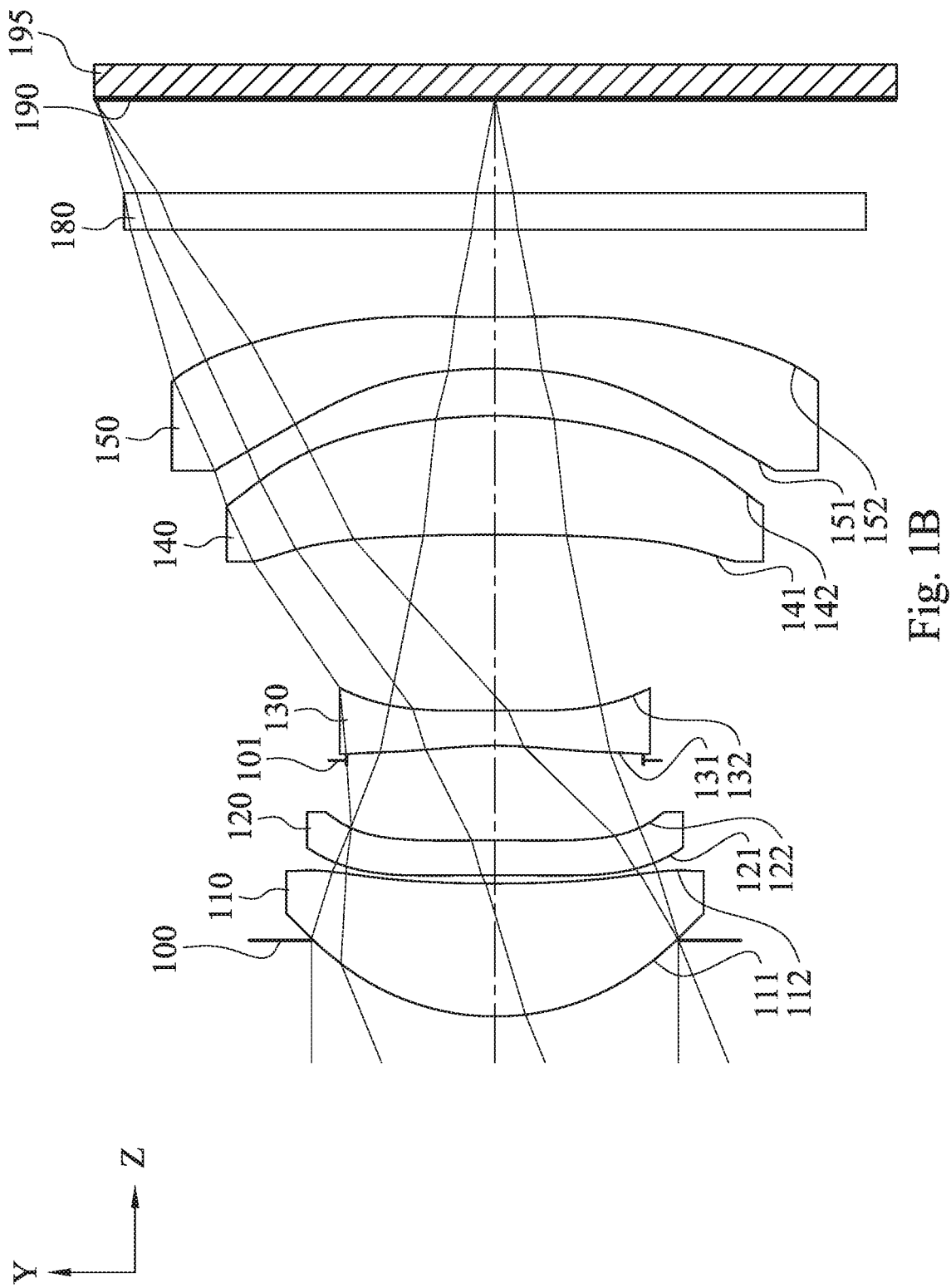
FIG. 1B is a schematic view of the imaging apparatus in a minor axis direction of the aperture stop therein according to the 1st embodiment of FIG. 1A.
Figure 2A:
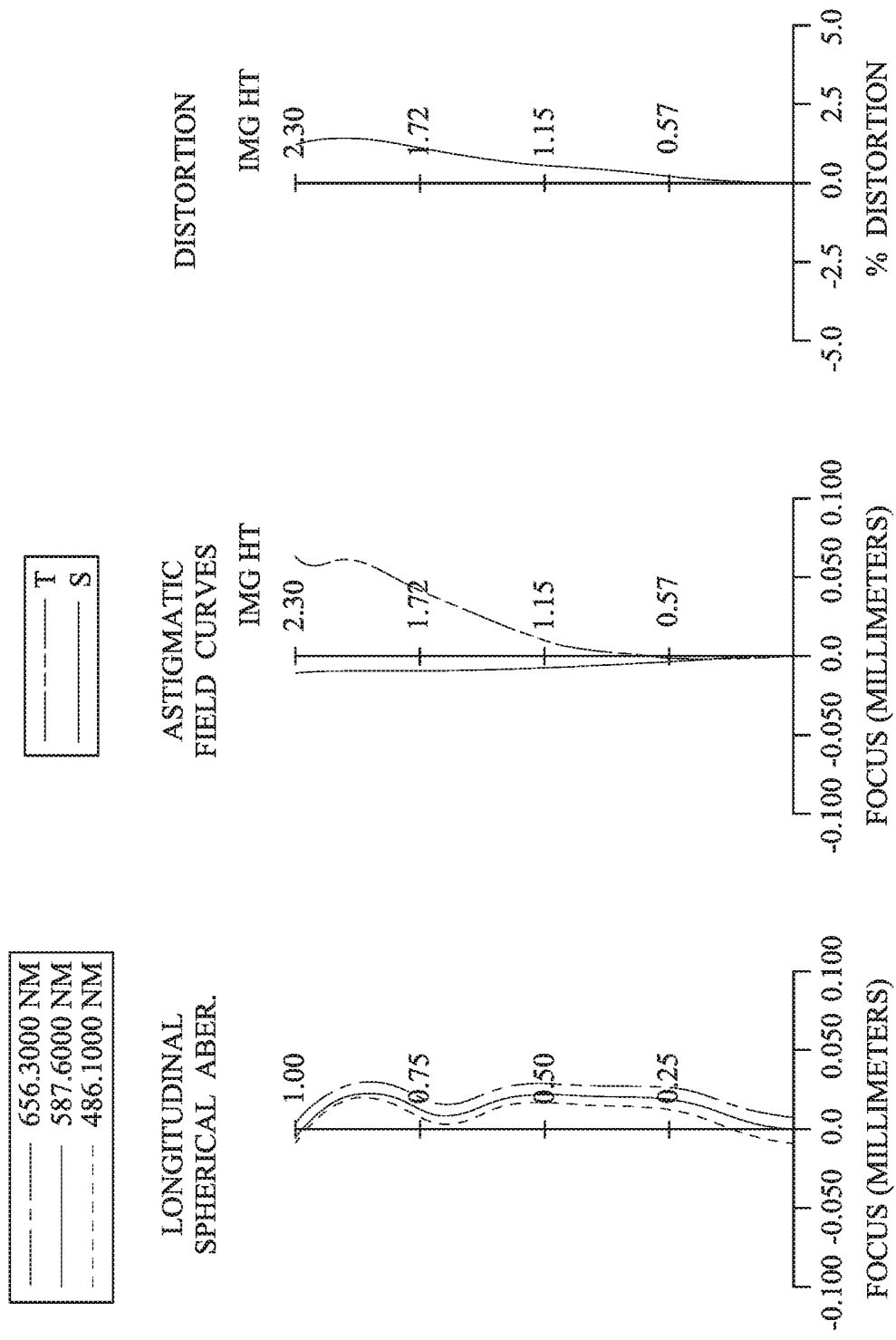
FIG. 2A shows spherical aberration curves, astigmatic field curves and a distortion curve of the imaging apparatus according to the 1st embodiment of FIG. 1A.
Figure 2B:
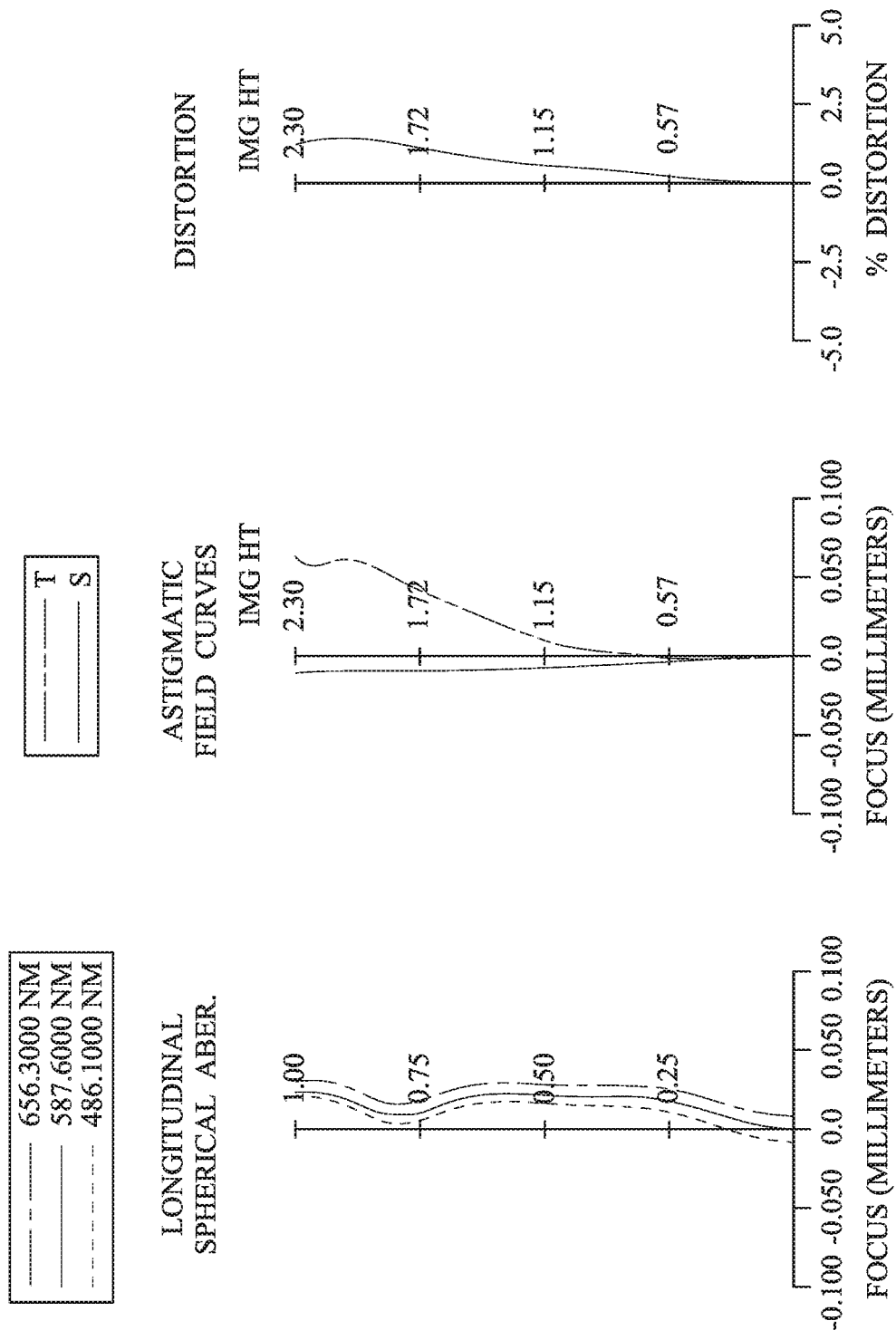
FIG. 2B shows spherical aberration curves, astigmatic field curves and a distortion curve of the imaging apparatus according to the 1st embodiment of FIG. 1B.

FIG. 1A is a schematic view of an imaging apparatus in a major axis direction of an aperture stop therein according to the 1st embodiment of the present disclosure. FIG. 1B is a schematic view of the imaging apparatus in a minor axis direction of the aperture stop therein according to the 1st embodiment of FIG. 1A. FIG. 2A shows spherical aberration curves, astigmatic field curves and a distortion curve of the imaging apparatus according to the 1st embodiment of FIG. 1A. FIG. 2B shows spherical aberration curves, astigmatic field curves and a distortion curve of the imaging apparatus according to the 1st embodiment of FIG. 1B.

In FIG. 1A and FIG. 1B, the imaging apparatus includes an imaging optical lens assembly (its reference numeral is omitted) and an image sensor 195. The imaging optical lens assembly includes an aperture stop 100 and a plurality of lens elements; in detail, the imaging optical lens assembly includes, in order from an object side to an image side, an aperture stop 100, a first lens element 110, a second lens element 120, a stop 101, a third lens element 130, a fourth lens element 140, a fifth lens element 150, an IR-cut filter 180 and an image surface 190, wherein the image sensor 195 is disposed on the image surface 190 of the imaging optical lens assembly. The imaging optical lens assembly includes five lens elements (110, 120, 130, 140, and 150) with no additional lens element inserted between each of the adjacent five lens elements, and there is an air gap in a paraxial region between each of adjacent lens elements.

Figure 17B:
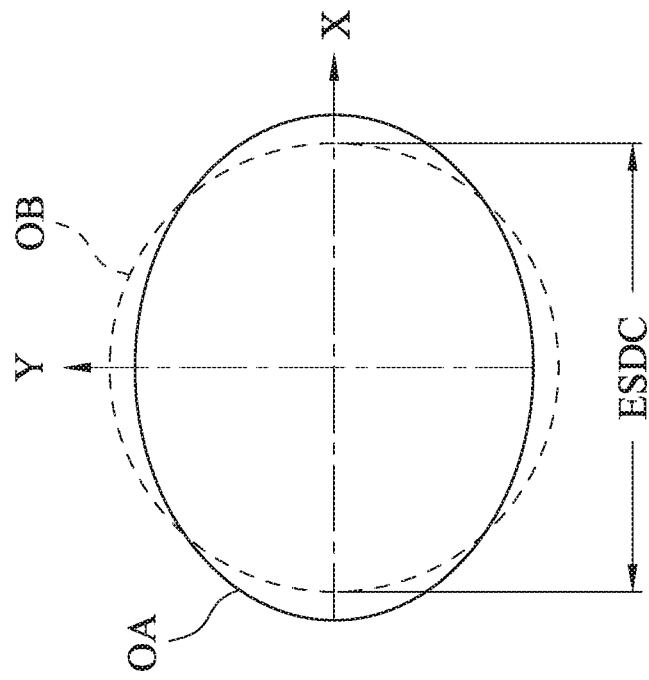
FIG. 17B is a schematic view of a parameter ESDC according to the 1st embodiment of FIG. 1A.
Figure 17A:
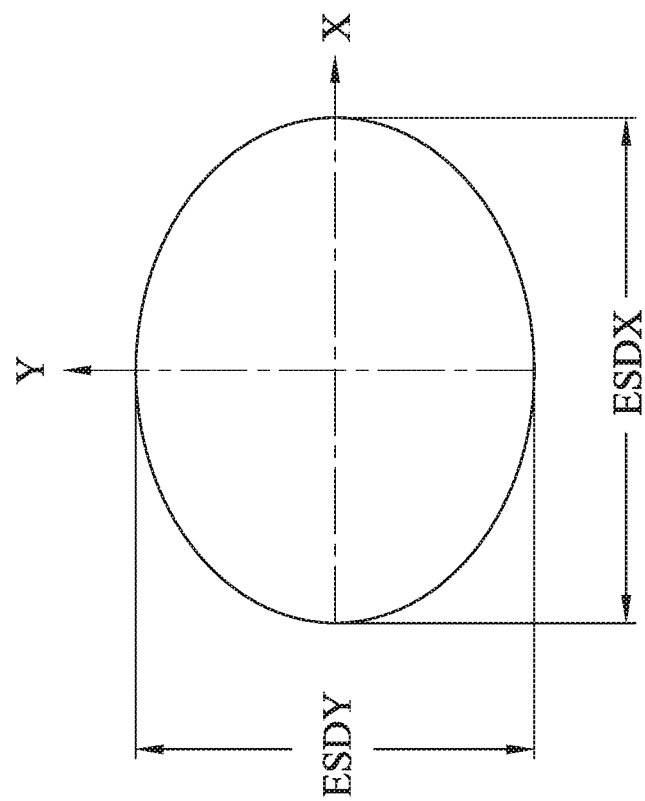
FIG. 17A is a schematic view of the aperture stop according to the 1st embodiment of FIG. 1A.

FIG. 17A is a schematic view of the aperture stop 100 according to the 1st embodiment of FIG. 1A. In FIG. 17A, the aperture stop 100 has a fixed elliptical shape, and the aperture stop 100 has a major axis and a minor axis, wherein the major axis is in an X-direction, the minor axis is in a Y-direction. In FIG. 1A, an optical axis of the imaging optical lens assembly is in a Z-direction.

The first lens element 110 with positive refractive power has an object-side surface 111 being convex in a paraxial region thereof and an image-side surface 112 being concave in, a paraxial region thereof. The first lens element 110 is made of plastic material, and has the object-side surface 111 and the image-side surface 112 being both aspheric. Furthermore, the first lens element 110 includes at least one inflection point and at least one critical point.

The second lens element 120 with negative refractive power has an object-side surface 121 being concave in a paraxial region thereof and an image-side surface 122 being convex in a paraxial region thereof. The second lens element 120 is made of plastic material, and has the object-side surface 121 and the image-side surface 122 being both aspheric. Furthermore, the second lens element 120 includes at least one inflection point and at least one critical point.

The third lens element 130 with negative refractive power has an object-side surface 131 being concave in a paraxial region thereof and an image-side surface 132 being convex in a paraxial region thereof. The third lens element 130 is made of plastic material, and has the object-side surface 131 and the image-side surface 132 being both aspheric. Furthermore, the third lens element 130 includes at least one inflection point and at least one critical point.

The fourth lens element 140 with positive refractive power has an object-side surface 141 being concave in a paraxial region thereof and an image-side surface 142 being convex in a paraxial region thereof. The fourth lens element 140 is made of plastic material, and has the object-side surface 141 and the image-side surface 142 being both aspheric. Furthermore, the fourth lens element 140 includes at least one inflection point.

The fifth lens element 150 with negative refractive power has an object-side surface 151 being concave in a paraxial region thereof and an image-side surface 152 being concave in a paraxial region thereof. The fifth lens element 150 is made of plastic material, and has the object-side surface 151 and the image-side surface 152 being both aspheric. Furthermore, the fifth lens element 150 includes at least one inflection point and at least one critical point.

The IR-cut filter 180 is made of glass material, which is located between the fifth lens element 150 and the image surface 190 in order, and will not affect the focal length of the imaging optical lens assembly.

The equation of the aspheric surface profiles of the aforementioned lens elements of the 1st embodiment is expressed as follows:

$$X(Y) = (Y^2/R)/\left(1 + \mathrm{sqrt}(1 - (1+k) \times (Y/R)^2)\right) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging optical lens assembly according to the 1st embodiment, when a focal length of the imaging optical lens assembly is f, and a diameter of a circle with an area of the same size as an elliptical entrance pupil of the imaging optical lens assembly is EPDC, the following conditions are satisfied: f=5.52 mm; and f/EPDC=2.47.

In the imaging optical lens assembly according to the 1st embodiment, when half of a maximum field of view of the imaging optical lens assembly is HFOV, and a maximum field of view of the imaging optical lens assembly is FOV, the following conditions are satisfied: HFOV=22.3 degrees; and FOV=44.6 degrees.

FIG. 17B is a schematic view of a parameter ESDC according to the 1st embodiment of FIG. 1A. In FIG. 17A and FIG. 17B, a major axis diameter of the aperture stop is ESDX, a minor axis diameter of the aperture stop is ESDY, a diameter of a circle OB with an area being the same with an area OA of the aperture 100 being elliptical-shaped is ESDC (that is, $ESDC^2=ESDX \times ESDY$), and the diameter of the circle with the area of the same size as the elliptical entrance pupil of the imaging optical lens assembly is EPDC, and the following conditions are satisfied: ESDX=2.374; ESDY=2.100; ESDC=2.233; EPDC=2.233; and ESDX/ESDY=1.13.

In the imaging optical lens assembly according to the 1st embodiment, when the maximum field of view of the imaging optical lens assembly is FOV, the following condition is satisfied: tan(FOV)=0.99.

In the imaging optical lens assembly according to the 1st embodiment, when the focal length of the imaging optical lens assembly is f, and the axial distance between the object-side surface 111 of the first lens element 110 and the image surface 190 is TL, the following condition is satisfied: TL/f=0.95.

In the imaging optical lens assembly according to the 1st embodiment, when a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a maximum among refractive indices of the lens elements of the imaging optical lens assembly is Nmax (that is, the maximum among N1, N2, N3, N4 and N5), an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, and a minimum among Abbe numbers of the lens elements of the imaging optical lens assembly is Vmin (that is, the minimum among V1, V2, V3, V4 and V5), the following conditions are satisfied: Nmax=1.69; and Vmin=17.56.

In the imaging optical lens assembly according to the 1st embodiment, when a curvature radius of the object-side surface 111 of the first lens element 110 is R1, and the focal length of the imaging optical lens assembly is f, the following condition is satisfied: f/R1=3.87.

In the imaging optical lens assembly according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, and a sum of central thicknesses of the lens elements of the imaging optical lens assembly is ΣCT (that is, ΣCT=CT1+CT2+CT3+CT4+CT5), the following condition is satisfied: CT1/(ΣCT−CT1)=0.55.

In the imaging optical lens assembly according to the 1st embodiment, when a maximum among optical effective radii of the lens elements is Ymax, the following condition is satisfied: Ymax=1.84 mm.

The detailed optical data of the 1st embodiment are shown in Table 1 and the aspheric surface data are shown in Table 2 below.

TABLE 1

1st Embodiment
f = 5.52 mm, Fno_eff = 2.47, HFOV = 22.3 deg.
EPDX = 2.374 mm, EPDY = 2.100 mm

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.436 | | | | |
| 2 | Lens 1 | 1.425 | ASP | 0.762 | Plastic | 1.544 | 56.0 | 3.01 |
| 3 | | 8.953 | ASP | 0.047 | | | | |
| 4 | Lens 2 | −14.927 | ASP | 0.200 | Plastic | 1.653 | 20.5 | −63.52 |
| 5 | | −23.449 | ASP | 0.458 | | | | |
| 6 | Stop | Plano | | 0.084 | | | | |
| 7 | Lens 3 | −2.567 | ASP | 0.202 | Plastic | 1.689 | 17.6 | −4.51 |
| 8 | | −15.239 | ASP | 1.007 | | | | |
| 9 | Lens 4 | −13.914 | ASP | 0.680 | Plastic | 1.654 | 19.8 | 5.95 |
| 10 | | −3.099 | ASP | 0.271 | | | | |
| 11 | Lens 5 | −2.974 | ASP | 0.296 | Plastic | 1.544 | 56.0 | −4.49 |
| 12 | | 14.074 | ASP | 0.500 | | | | |
| 13 | IR-cut filter | Plano | | 0.210 | Glass | 1.517 | 64.2 | — |
| 14 | | Plano | | 0.539 | | | | |
| 15 | Image | Plano | | — | | | | |

Reference wavelength is 587.6 nm (d-line).
Ape. Stop is elliptical-shaped.
EPDX is a major axis (in X-direction) & EPDY is a minor axis (in Y-direction).
Effective region of Surface 6 is circular-shaped, which has a radius being 1.700 mm.
Maximum effective region of Surface 12 is circular-shaped, which has a radius being 3.700 mm.

TABLE 2

Aspheric Coefficients

| Surface # | 2 | 3 | 4 | 5 | 7 |
|---|---|---|---|---|---|
| k= | 9.1970E−02 | 0.0000E+00 | 0.0000E+00 | 5.0975E+01 | −5.2123E+01 |
| A4= | −1.6370E−02 | 1.6879E−02 | 1.0856E−01 | 1.4382E−01 | 4.0795E−02 |
| A6= | 5.7500E−02 | 1.2021E−01 | 1.0040E−01 | −1.9027E−02 | 4.2014E−01 |

TABLE 2-continued

| Aspheric Coefficients | | | | | |
|---|---|---|---|---|---|
| A8= | −1.8640E−01 | −2.1646E−01 | −1.1017E−01 | 3.1551E−01 | −1.1671E+00 |
| A10= | 3.2327E−01 | 1.2241E−01 | 3.8677E−02 | −6.4596E−01 | 1.3011E+00 |
| A12= | −3.3535E−01 | −2.2083E−02 | 2.7670E−02 | 7.2729E−01 | −6.1341E−01 |
| A14= | 1.8277E−01 | −3.8747E−03 | −1.9094E−02 | −3.1057E−01 | |
| A16= | −4.2461E−02 | | | | |

| Surface # | 8 | 9 | 10 | 11 | 12 |
|---|---|---|---|---|---|
| k= | 0.0000E+00 | 1.8511E+01 | −4.0643E−01 | −1.0000E+00 | 0.0000E+00 |
| A4= | 4.1781E−01 | 2.1036E−03 | 1.1523E−02 | −9.2092E−02 | −1.2271E−01 |
| A6= | −4.6802E−01 | −2.7842E−03 | −4.2281E−02 | −7.3795E−02 | 1.1797E−02 |
| A8= | 9.4930E−01 | −4.3478E−02 | 2.7968E−02 | 1.9835E−01 | 6.3323E−02 |
| A10= | −1.7771E+00 | 5.4208E−02 | −7.8068E−03 | −1.5732E−01 | −6.0710E−02 |
| A12= | 1.8427E+00 | −4.1434E−02 | −4.0798E−03 | 6.8181E−02 | 2.9110E−02 |
| A14= | −7.6198E−01 | 1.8032E−02 | 2.9851E−03 | −1.7860E−02 | −8.1701E−03 |
| A16= | | −2.9933E−03 | −4.5343E−04 | 2.7933E−03 | 1.2652E−03 |
| A18= | | | | −2.1270E−04 | −8.3328E−05 | in Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-A18 represent the aspheric coefficients ranging from the 4th order to the 18th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Furthermore, in the imaging optical lens assembly according to the 1st embodiment, a maximum optical effective diameter of the fifth lens element 150 is a maximum among maximum optical effective diameters of the lens elements of the imaging optical lens assembly.

2nd Embodiment

Figure 3A:
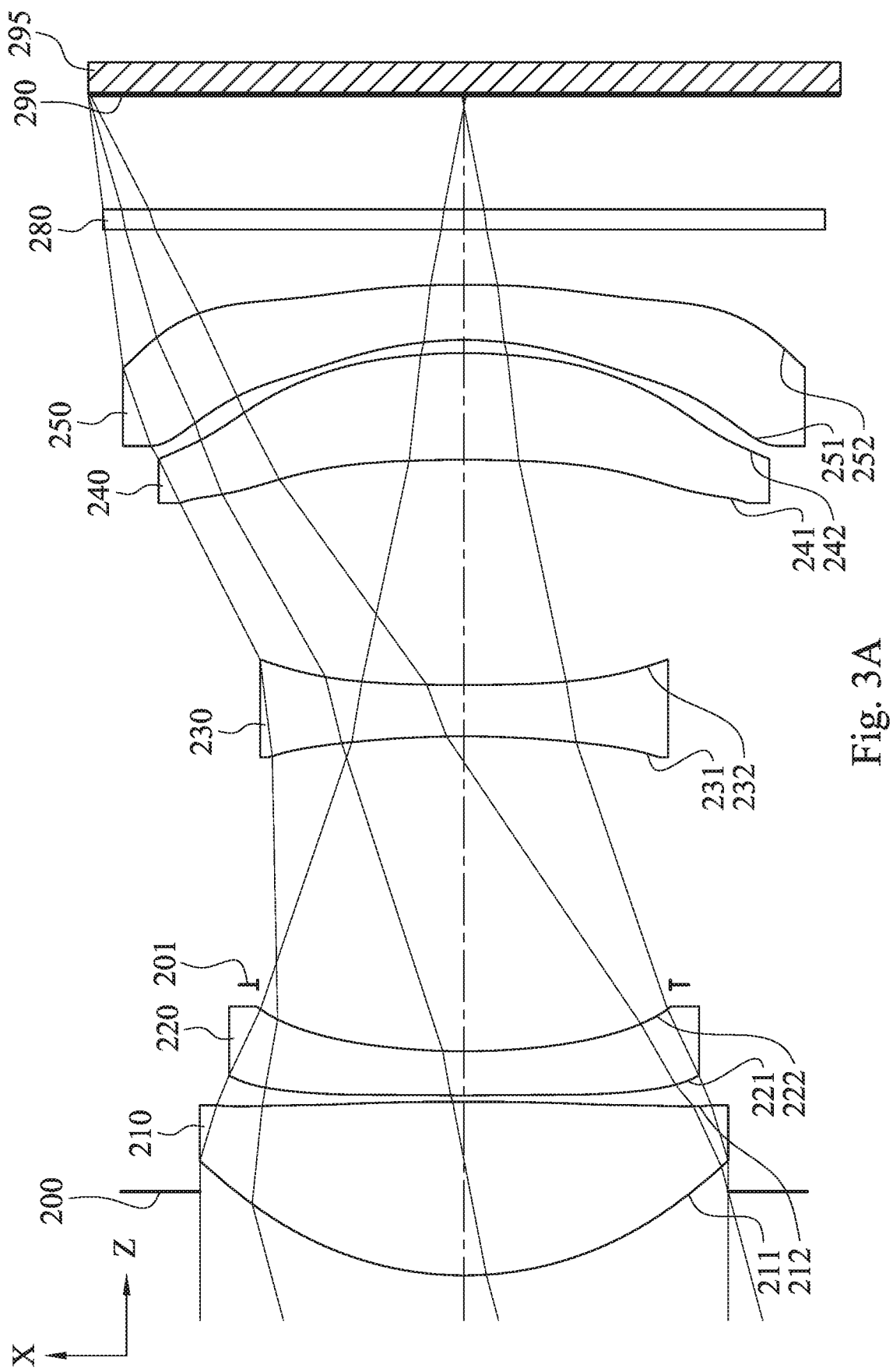
FIG. 3A is a schematic view of an imaging apparatus in a major axis direction of an aperture stop therein according to the 2nd embodiment of the present disclosure.
Figure 3B:
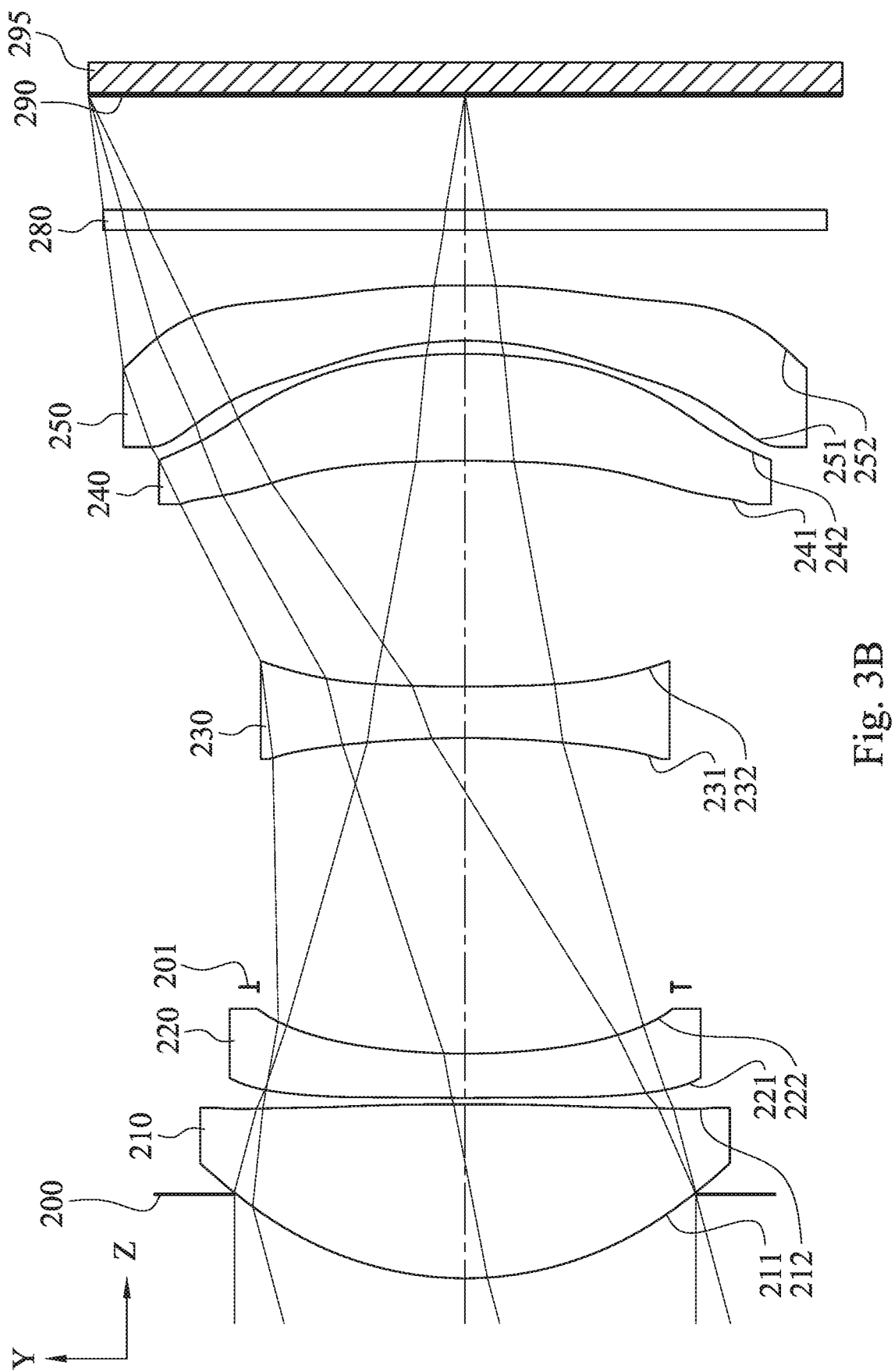
FIG. 3B is a schematic view of the imaging apparatus in a minor axis direction of the aperture stop therein according to the 2nd embodiment of FIG. 3A.
Figure 4A:
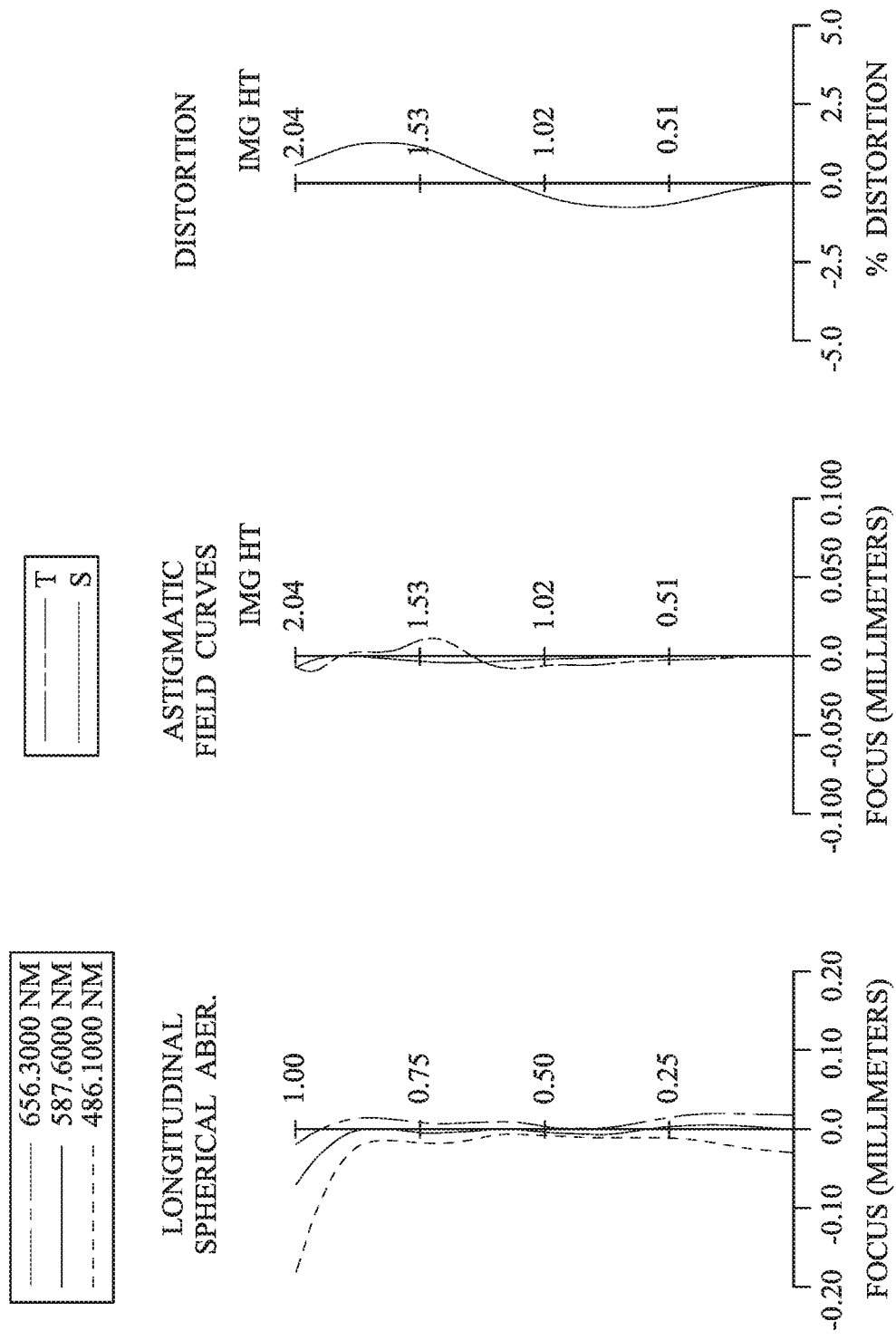
FIG. 4A shows spherical aberration curves, astigmatic field curves and a distortion curve of the imaging apparatus according to the 2nd embodiment of FIG. 3A.
Figure 4B:
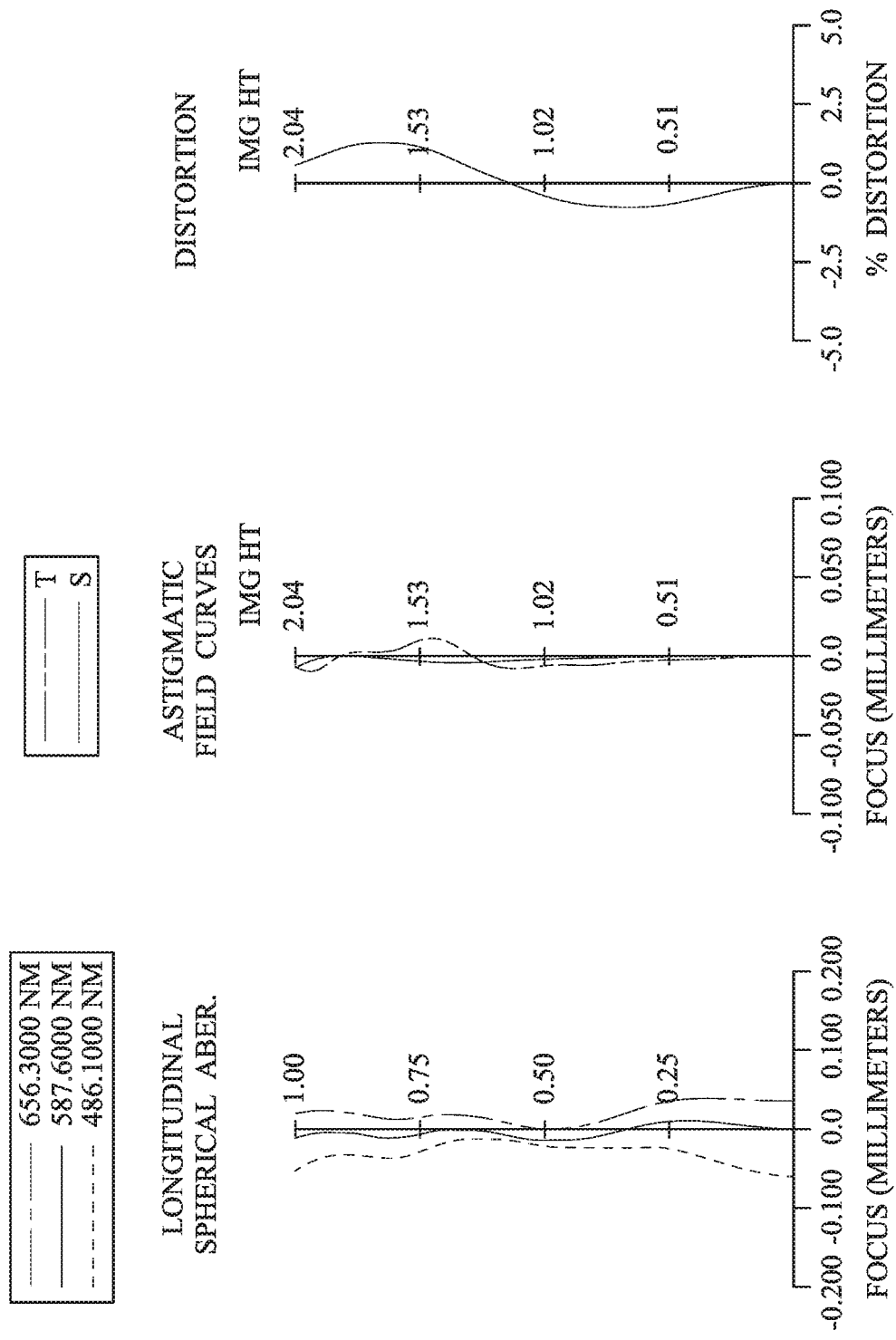
FIG. 4B shows spherical aberration curves, astigmatic field curves and a distortion curve of the imaging apparatus according to the 2nd embodiment of FIG. 3B.

FIG. 3A is a schematic view of an imaging apparatus in a major axis direction of an aperture stop therein according to the 2nd embodiment of the present disclosure. FIG. 3B is a schematic view of the imaging apparatus in a minor axis direction of the aperture stop therein according to the 2nd embodiment of FIG. 3A. FIG. 4A shows spherical aberration curves, astigmatic field curves and a distortion curve of the imaging apparatus according to the 2nd embodiment of FIG. 3A. FIG. 4B shows spherical aberration curves, astigmatic field curves and a distortion curve of the imaging apparatus according to the 2nd embodiment of FIG. 3B.

In FIG. 3A and FIG. 3B, the imaging apparatus includes an imaging optical lens assembly (its reference numeral is omitted) and an image sensor 295. The imaging optical lens assembly includes, in order from an object side to an image side, an aperture stop 200, a first lens element 210, a second lens element 220, a stop 201, a third lens element 230, a fourth lens element 240, a fifth lens element 250, an IR-cut filter 280 and an image surface 290, wherein the image sensor is disposed on the image surface 290 of the imaging optical lens assembly. The imaging optical lens assembly includes five lens elements (210, 220, 230, 240, and 250) with no additional lens element inserted between each of the adjacent five lens elements, and there is an air gap in a paraxial region between each of adjacent lens elements.

The aperture stop 200 has a fixed elliptical shape, and the aperture stop 200 has a major axis and a minor axis, wherein the major axis is in an X-direction, the minor axis is in a Y-direction, and an optical axis of the imaging optical lens assembly is in a Z-direction.

The first lens element 210 with positive refractive power has an object-side surface 211 being convex in a paraxial region thereof and an image-side surface 212 being convex in a paraxial region thereof. The first lens element 210 is made of plastic material, and has the object-side surface 211 and the image-side surface 212 being both aspheric. Furthermore, the first lens element 210 includes at least one inflection point and at least one critical point.

The second lens element 220 with negative refractive power has an object-side surface 221 being convex in a paraxial region thereof and an image-side surface 222 being concave in a paraxial region thereof. The second lens element 220 is made of plastic material, and has the object-side surface 221 and the image-side surface 222 being both aspheric. Furthermore, the second lens element 220 includes at least one inflection point.

The third lens element 230 with negative refractive power has an object-side surface 231 being concave in a paraxial region thereof and an image-side surface 232 being concave in a paraxial region thereof. The third lens element 230 is made of plastic material, and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of plastic material, and has the object-side surface 241 and the image-side surface 242 being both aspheric. Furthermore, the fourth lens element 240 includes at least one inflection point.

The fifth lens element 250 with negative refractive power has an object-side surface 251 being concave in a paraxial region thereof and an image-side surface 252 being convex in a paraxial region thereof. The fifth lens element 250 is made of plastic material, and has the object-side surface 251 and the image-side surface 252 being both aspheric. Furthermore, the fifth lens element 250 includes at least one inflection point.

The IR-cut filter 280 is made of glass material, which is located between the fifth lens element 250 and the image surface 290 in order, and will not affect the focal length of the imaging optical lens assembly.

The detailed optical data of the 2nd embodiment are shown in Table 3 and the aspheric surface data are shown in Table 4 below.

TABLE 3

2nd Embodiment
f = 7.57 mm, Fno_eff = 2.82, HFOV= 15.0 deg.
EPDX = 2.868 mm, EPDY = 2.500 mm

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.455 | | | | |
| 2 | Lens 1 | 1.866 | ASP | 0.943 | Plastic | 1.544 | 56.0 | 3.38 |
| 3 | | −100.288 | ASP | 0.035 | | | | |
| 4 | Lens 2 | 14.160 | ASP | 0.240 | Plastic | 1.639 | 23.5 | −8.17 |
| 5 | | 3.788 | ASP | 0.361 | | | | |
| 6 | Stop | Plano | | 1.350 | | | | |
| 7 | Lens 3 | −5.754 | ASP | 0.279 | Plastic | 1.582 | 30.2 | −6.47 |
| 8 | | 11.129 | ASP | 1.224 | | | | |
| 9 | Lens 4 | −8.332 | ASP | 0.580 | Plastic | 1.669 | 19.5 | 5.44 |
| 10 | | −2.604 | ASP | 0.071 | | | | |
| 11 | Lens 5 | −1.807 | ASP | 0.300 | Plastic | 1.544 | 56.0 | −4.66 |
| 12 | | −6.647 | ASP | 0.300 | | | | |
| 13 | IR-cut filter | Plano | | 0.110 | Glass | 1.517 | 64.2 | — |
| 14 | | Plano | | 0.624 | | | | |
| 15 | Image | Plano | | — | | | | |

Reference wavelength is 587.6 nm (d-line).
Ape. Stop is elliptical-shaped.
EPDX is a major axis (in X-direction) & EPDY is a minor axis (in Y-direction).
Effective region of Surface 6 is circular-shaped, which has a radius being 2.240 mm.
Maximum effective region of Surface 11 is circular-shaped, which has a radius being 3.400 mm.

TABLE 4

Aspheric Coefficients

| Surface # | 2 | 3 | 4 | 5 | 7 |
|---|---|---|---|---|---|
| k= | −3.0468E−01 | −9.0000E+01 | −3.0102E+00 | −3.3841E+01 | −2.5839E−01 |
| A4= | 2.8138E−03 | −1.4507E−01 | −1.6009E−01 | 5.3260E−02 | 7.9679E−04 |
| A6= | 8.5384E−03 | 3.1750E−01 | 3.5795E−01 | 1.7354E−02 | 1.5608E−02 |
| A8= | −1.9878E−02 | −2.9237E−01 | −2.9118E−01 | 5.2703E−02 | −1.5698E−02 |
| A10= | 2.2751E−02 | 1.2716E−01 | 7.9676E−02 | −1.1972E−01 | 1.8068E−02 |
| A12= | −1.2113E−02 | −2.5111E−02 | 1.6785E−02 | 8.9563E−02 | −5.8886E−02 |
| A14= | 2.2400E−03 | 2.9230E−03 | −8.1320E−03 | −1.9990E−02 | 3.2249E−02 |
| A16= | | −4.5241E−04 | | | |

| Surface # | 8 | 9 | 10 | 11 | 12 |
|---|---|---|---|---|---|
| k= | −1.1955E+01 | 2.1872E+00 | 7.0211E−02 | −1.2536E+00 | −5.6637E+00 |
| A4= | 4.3560E−02 | −1.0235E−02 | 2.7622E−01 | 3.0393E−01 | −1.1925E−01 |
| A6= | 2.4749E−02 | −1.1549E−01 | −1.1116E+00 | −1.2822E+00 | 1.6374E−01 |
| A8= | 2.1040E−02 | 1.6718E−01 | 1.9032E+00 | 2.6916E+00 | 1.5688E−02 |
| A10= | −3.1867E−02 | −1.8632E−01 | −1.8086E+00 | −2.9838E+00 | −1.4702E−01 |
| A12= | −1.0083E−02 | 1.6585E−01 | 9.9371E−01 | 1.9252E+00 | 1.1579E−01 |
| A14= | 1.1897E−02 | −8.9687E−02 | −3.0953E−01 | −7.5318E−01 | −4.5535E−02 |
| A16= | | 2.7089E−02 | 5.0011E−02 | 1.7592E−01 | 1.0180E−02 |
| A18= | | −4.2216E−03 | −3.0787E−03 | −2.2448E−02 | −1.2467E−03 |
| A20= | | 2.5668E−04 | −3.4658E−05 | 1.1939E−03 | 6.6042E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 7.57 | ESDX/ESDY | 1.15 |
| f/EPDC | 2.82 | Tan(FOV) | 0.58 |
| HFOV [deg.] | 15.0 | TL/f | 0.85 |
| FOV [deg.] | 30.0 | Nmax | 1.67 |
| ESDX | 2.868 | Vmin | 19.45 |
| ESDY | 2.500 | f/R1 | 4.06 |
| ESDC | 2.678 | CT1/(ΣCT − CT1) | 0.67 |
| EPDC | 2.678 | Ymax [mm] | 1.85 |

Furthermore, in the imaging optical lens assembly according to the 2nd embodiment, a maximum optical effective diameter of the fifth lens element 250 is a maximum among maximum optical effective diameters of the lens elements of the imaging optical lens assembly.

3rd Embodiment

Figure 5A:
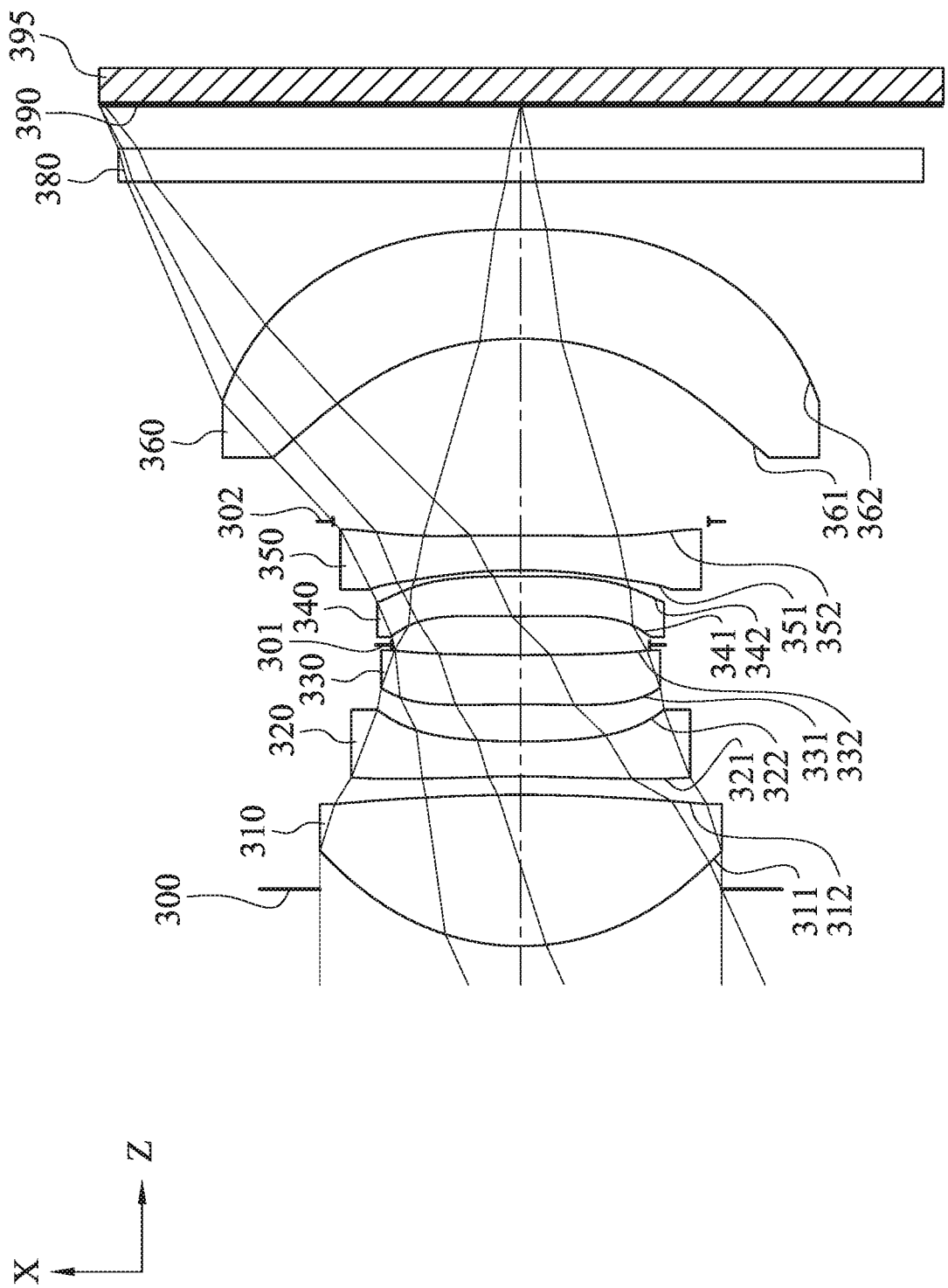
FIG. 5A is a schematic view of an imaging apparatus in a major axis direction of an aperture stop therein according to the 3rd embodiment of the present disclosure.
Figure 5B:
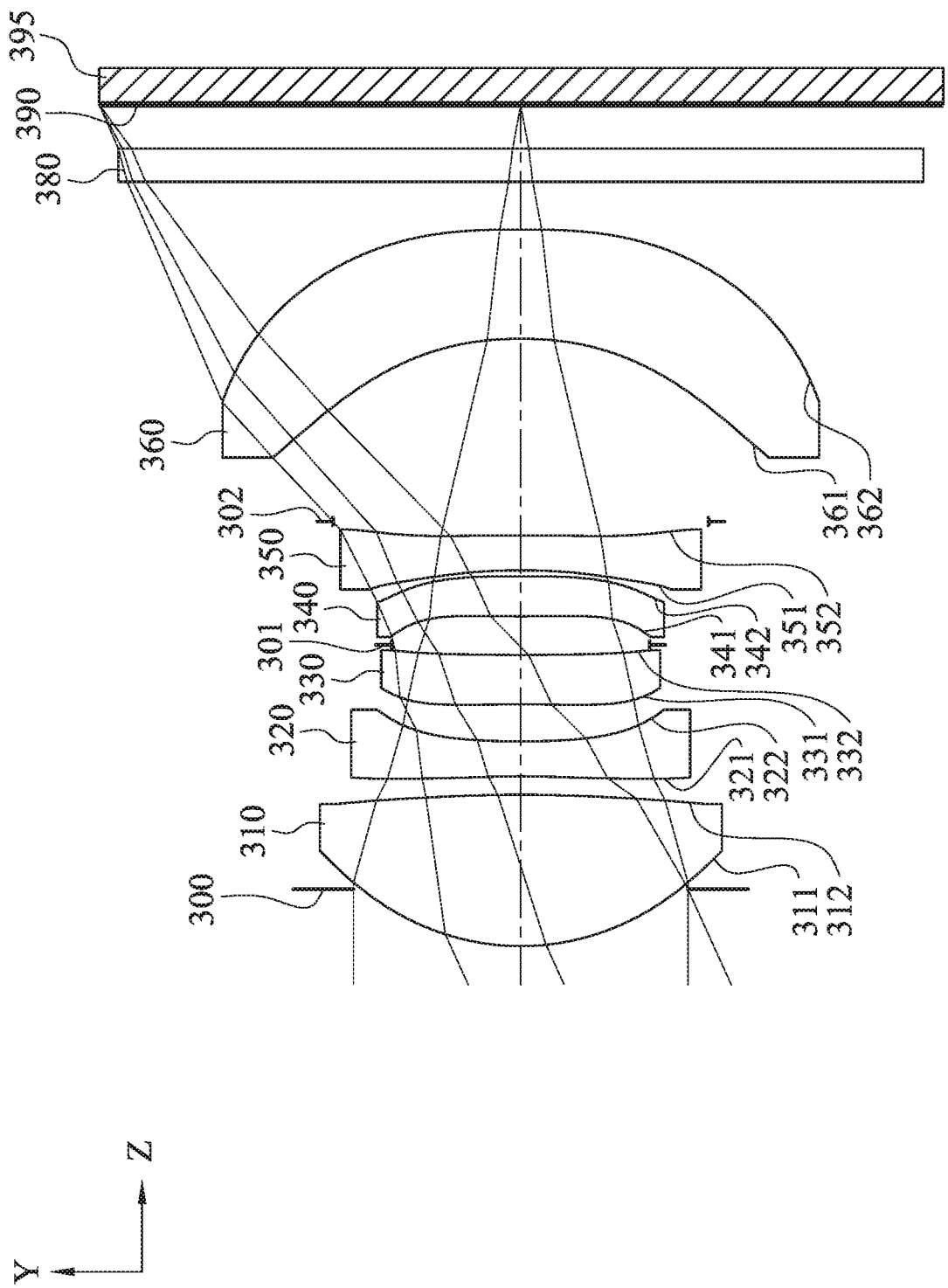
FIG. 5B is a schematic view of the imaging apparatus in a minor axis direction of the aperture stop therein according to the 3rd embodiment of FIG. 5A.
Figure 6A:
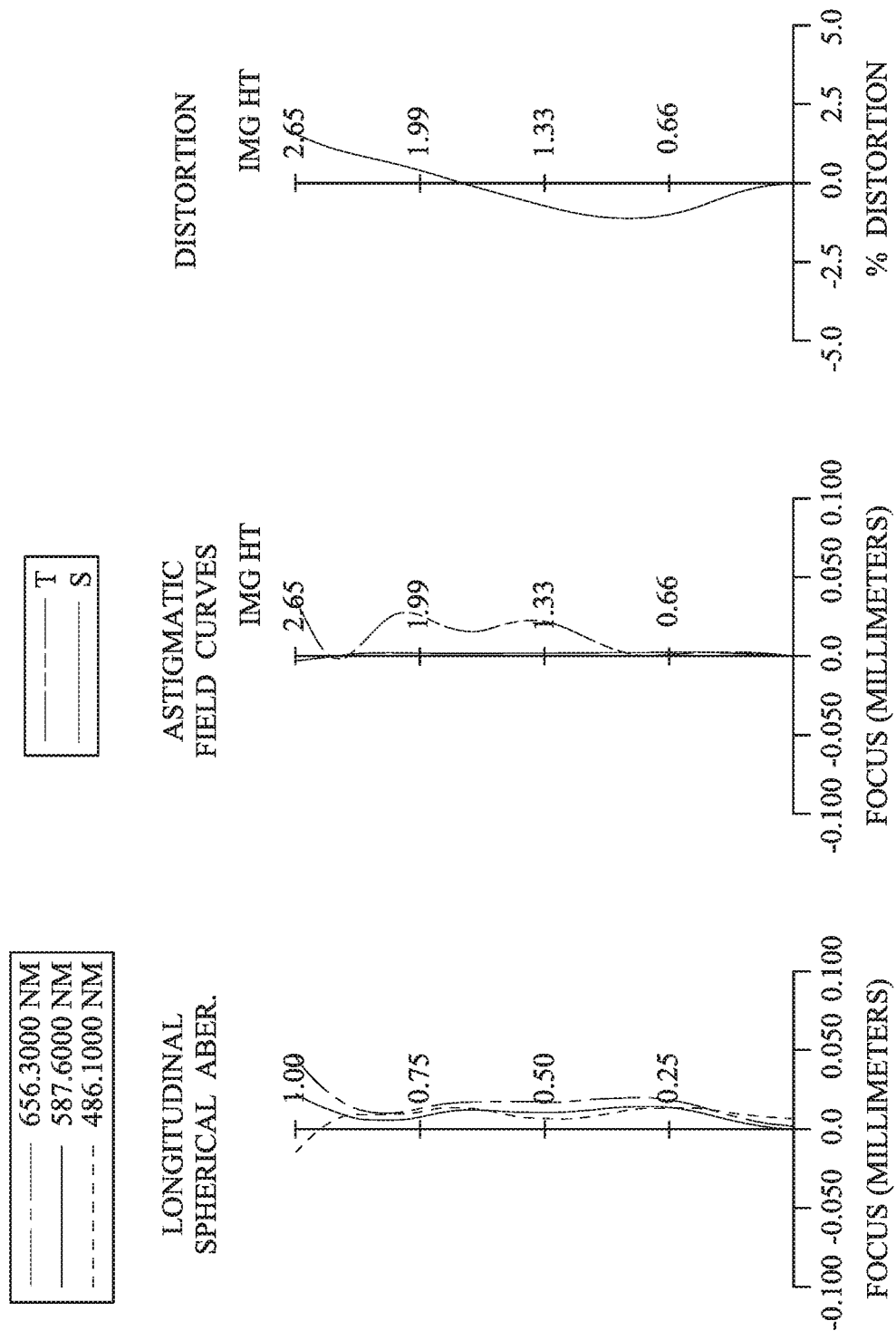
FIG. 6A shows spherical aberration curves, astigmatic field curves and a distortion curve of the imaging apparatus according to the 3rd embodiment of FIG. 5A.
Figure 6B:
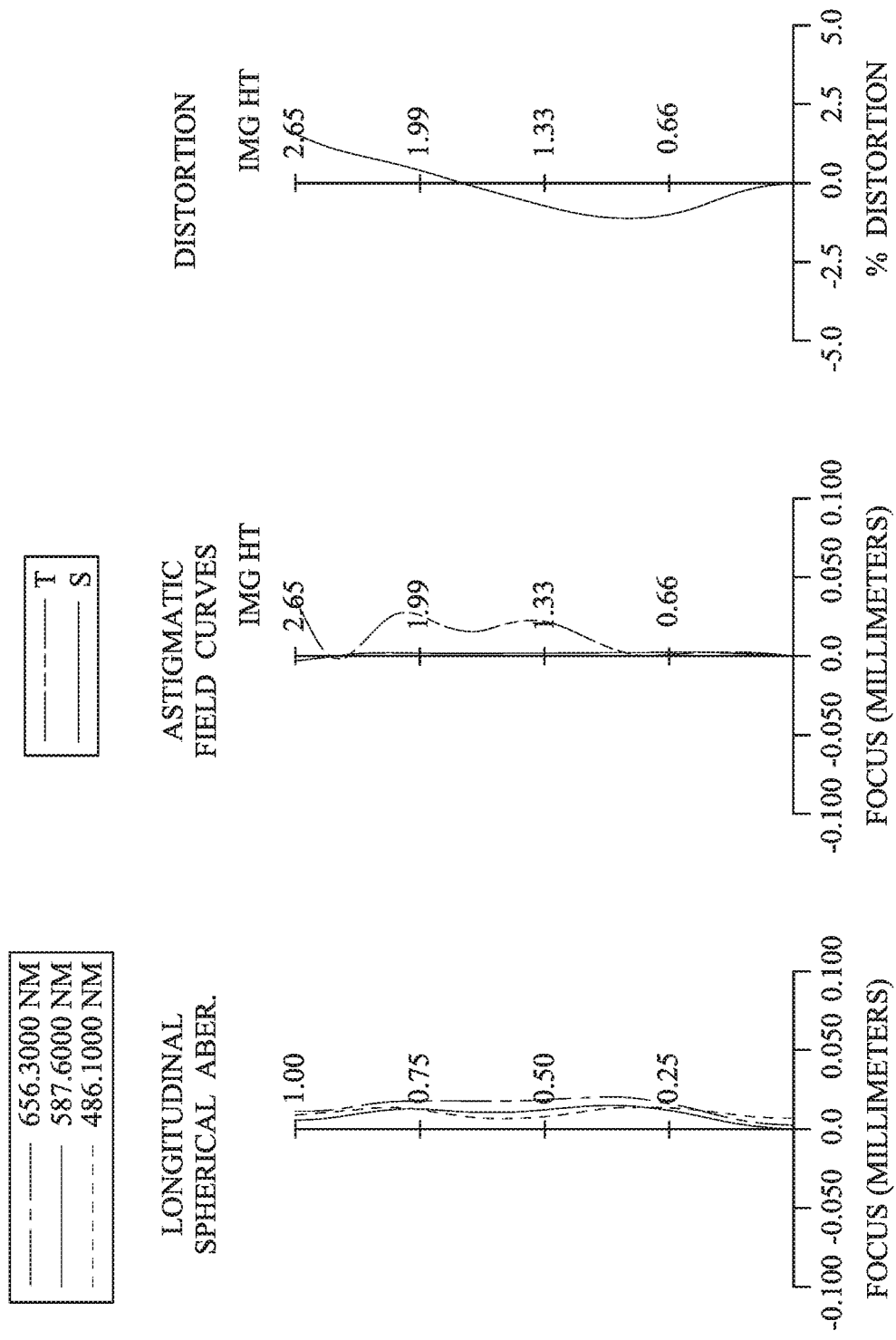
FIG. 6B shows spherical aberration curves, astigmatic field curves and a distortion curve of the imaging apparatus according to the 3rd embodiment of FIG. 5B.

FIG. 5A is a schematic view of an imaging apparatus in a major axis direction of an aperture stop therein according to the 3rd embodiment of the present disclosure. FIG. 5B is a schematic view of the imaging apparatus in a minor axis direction of the aperture stop therein according to the 3rd embodiment of FIG. 5A. FIG. 6A shows spherical aberration curves, astigmatic field curves and a distortion curve of the imaging apparatus according to the 3rd embodiment of FIG. 5A. FIG. 6B shows spherical aberration curves, astigmatic field curves and a distortion curve of the imaging apparatus according to the 3rd embodiment of FIG. 5B.

In FIG. 5A and FIG. 5B, the imaging apparatus includes an imaging optical lens assembly (its reference numeral is omitted) and an image sensor 395. The imaging optical lens assembly includes, in order from an object side to an image side, an aperture stop 300, a first lens element 310, a second lens element 320, a third lens element 330, a stop 301, a fourth lens element 340, a fifth lens element 350, a stop 302, a sixth lens element 360, an IR-cut filter 380 and an image surface 390, wherein the image sensor is disposed on the image surface 390 of the imaging optical lens assembly. The imaging optical lens assembly includes six lens elements (310, 320, 330, 340, 350, and 360) with no additional lens element inserted between each of the adjacent six lens elements, and there is an air gap in a paraxial region between each of adjacent lens elements.

The aperture stop 300 has a fixed elliptical shape, and the aperture stop 300 has a major axis and a minor axis, wherein the major axis is in an X-direction, the minor axis is in a Y-direction, and an optical axis of the imaging optical lens assembly is in a Z-direction.

The first lens element 310 with positive refractive power has an object-side surface 311 being convex in a paraxial region thereof and an image-side surface 312 being convex in a paraxial region thereof. The first lens element 310 is made of plastic material, and has the object-side surface 311 and the image-side surface 312 being both aspheric. Furthermore, the first lens element 310 includes at least one inflection point.

The second lens element 320 with negative refractive power has an object-side surface 321 being concave in a paraxial region thereof and an image-side surface 322 being concave in a paraxial region thereof. The second lens element 320 is made of plastic material, and has the object-side surface 321 and the image-side surface 322 being both aspheric. Furthermore, the second lens element 320 includes at least one inflection point and at least one critical point.

The third lens element 330 with negative refractive power has an object-side surface 331 being concave in a paraxial region thereof and an image-side surface 332 being concave in a paraxial region thereof. The third lens element 330 is made of plastic material, and has the object-side surface 331 and the image-side surface 332 being both aspheric. Furthermore, the third lens element 330 includes at least one inflection point and at least one critical point.

The fourth lens element 340 with positive refractive power has an object-side surface 341 being convex in a paraxial region thereof and an image-side surface 342 being convex in a paraxial region thereof. The fourth lens element 340 is made of plastic material, and has the object-side surface 341 and the image-side surface 342 being both aspheric. Furthermore, the fourth lens element 340 includes at least one inflection point and at least one critical point.

The fifth lens element 350 with negative refractive power has an object-side surface 351 being concave in a paraxial region thereof and an image-side surface 352 being convex in a paraxial region thereof. The fifth lens element 350 is made of plastic material, and has the object-side surface 351 and the image-side surface 352 being both aspheric. Furthermore, the fifth lens element 350 includes at least one inflection point and at least one critical point.

The sixth lens element 360 with negative refractive power has an object-side surface 361 being concave in a paraxial region thereof and an image-side surface 362 being convex in a paraxial region thereof. The sixth lens element 360 is made of plastic material, and has the object-side surface 361 and the image-side surface 362 being both aspheric. Furthermore, the sixth lens element 360 includes at least one inflection point.

The IR-cut filter 380 is made of glass material, which is located between the sixth lens element 360 and the image surface 390 in order, and will not affect the focal length of the imaging optical lens assembly.

The detailed optical data of the 3rd embodiment are shown in Table 5 and the aspheric surface data are shown in Table 6 below.

TABLE 5

3rd Embodiment
f = 5.72 mm, Fno_eff = 2.48, HFOV = 24.5 deg.
EPDX = 2.524 mm, EPDY = 2.100 mm

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.357 | | | | |
| 2 | Lens 1 | 1.542 | ASP | 0.952 | Plastic | 1.545 | 55.9 | 2.42 |
| 3 | | −7.175 | ASP | 0.115 | | | | |
| 4 | Lens 2 | −6.180 | ASP | 0.220 | Plastic | 1.666 | 20.4 | −4.50 |
| 5 | | 5.883 | ASP | 0.232 | | | | |
| 6 | Lens 3 | −17.978 | ASP | 0.311 | Plastic | 1.656 | 21.5 | −10.74 |
| 7 | | 11.665 | ASP | 0.063 | | | | |
| 8 | Stop | Plano | | 0.181 | | | | |
| 9 | Lens 4 | 9.995 | ASP | 0.252 | Plastic | 1.675 | 19.4 | 9.19 |
| 10 | | −16.180 | ASP | 0.036 | | | | |
| 11 | Lens 5 | −5.727 | ASP | 0.220 | Plastic | 1.545 | 55.9 | −12.09 |
| 12 | | −44.139 | ASP | 0.088 | | | | |
| 13 | Stop | Plano | | 1.149 | | | | |
| 14 | Lens 6 | −2.182 | ASP | 0.687 | Plastic | 1.545 | 55.9 | −5.68 |
| 15 | | −8.212 | ASP | 0.300 | | | | |

TABLE 5-continued

3rd Embodiment
f = 5.72 mm, Fno_eff = 2.48, HFOV = 24.5 deg.
EPDX = 2.524 mm, EPDY = 2.100 mm

| Surface # | | Curvature Radius | Thickness | Material | Index | Abbe # | Focal Length |
|---|---|---|---|---|---|---|---|
| 16 | IR-cut filter | Plano | 0.210 | Glass | 1.518 | 64.2 | — |
| 17 | | Plano | 0.276 | | | | |
| 18 | Image | Plano | — | | | | |

Reference wavelength is 587.6 nm (d-line).
Ape. Stop is elliptical-shaped.
EPDX is a major axis (in X-direction) & EPDY is a minor axis (in Y-direction).
Effective region of Surface 8 is circular-shaped, which has a radius being 1.620 mm.
Effective region of Surface 13 is circular-shaped, which has a radius being 2.360 mm.

TABLE 6

Aspheric Coefficients

| Surface # | 2 | 3 | 4 | 5 | 6 | 7 |
|---|---|---|---|---|---|---|
| k= | −1.2538E−01 | −6.0222E+00 | 1.3815E+01 | 1.4103E+01 | 9.0000E+01 | 4.2513E+01 |
| A4= | −2.1053E−03 | 9.1437E−02 | 2.1214E−01 | 1.7390E−01 | 2.7955E−02 | −1.3225E−01 |
| A6= | 6.9006E−03 | −1.6146E−01 | −3.5046E−01 | −1.0997E−01 | 4.4332E−01 | 3.9891E−01 |
| A8= | −1.3978E−02 | 1.5967E−01 | 4.0307E−01 | 3.3430E−01 | −4.5727E−01 | −3.5257E−01 |
| A10= | 1.1103E−02 | −8.8405E−02 | −2.8182E−01 | −3.0218E−01 | 4.6744E−01 | 1.4129E−01 |
| A12= | −4.6839E−03 | 2.4811E−02 | 1.1930E−01 | 1.3635E−01 | −4.1271E−01 | −1.0805E−01 |
| A14= | | −2.5908E−03 | −2.2572E−02 | −4.8021E−02 | 1.8392E−01 | |

| Surface # | 9 | 10 | 11 | 12 | 14 | 15 |
|---|---|---|---|---|---|---|
| k= | 8.9138E+01 | 6.7617E+01 | −4.3691E+01 | 9.0000E+01 | −2.2857E−01 | −1.0000E+00 |
| A4= | −2.9362E−01 | −6.1233E−01 | −7.7297E−01 | −1.3416E−01 | −1.6470E−01 | −2.1573E−01 |
| A6= | 6.2567E−02 | 3.1859E+00 | 4.8873E+00 | 8.6108E−01 | 2.6122E−01 | 2.5412E−01 |
| A8= | −1.0642E+00 | −1.3015E+01 | −1.7538E+01 | −2.0457E+00 | −3.2727E−01 | −2.5526E−01 |
| A10= | 2.6566E+00 | 2.9099E+01 | 3.7205E+01 | 3.2192E+00 | 2.8577E−01 | 1.8412E−01 |
| A12= | −3.6417E+00 | −3.6456E+01 | −4.5671E+01 | −3.4268E+00 | −1.6068E−01 | −9.3446E−02 |
| A14= | 2.0660E+00 | 2.4153E+01 | 3.0011E+01 | 2.2940E+00 | 5.5944E−02 | 3.2280E−02 |
| A16= | | −6.4893E+00 | −8.2280E+00 | −8.6486E−01 | −1.1200E−02 | −7.2156E−03 |
| A18= | | | | 1.3943E−01 | 1.1038E−03 | 9.3858E−04 |
| A20= | | | | | −3.4925E−05 | −5.4047E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.72 | ESDX/ESDY | 1.20 |
| f/EPDC | 2.48 | Tan(FOV) | 1.15 |
| HFOV [deg.] | 24.5 | TL/f | 0.93 |
| FOV [deg.] | 49.0 | Nmax | 1.67 |
| ESDX | 2.524 | Vmin | 19.44 |
| ESDY | 2.100 | f/R1 | 3.71 |
| ESDC | 2.302 | CT1/(ΣCT − CT1) | 0.56 |
| EPDC | 2.302 | Ymax [mm] | 1.87 |

Furthermore, in the imaging optical lens assembly according to the 3rd embodiment, a maximum optical effective diameter of the sixth lens element 360 is a maximum among maximum optical effective diameters of the lens elements of the imaging optical lens assembly.

4th Embodiment

Figure 7A:
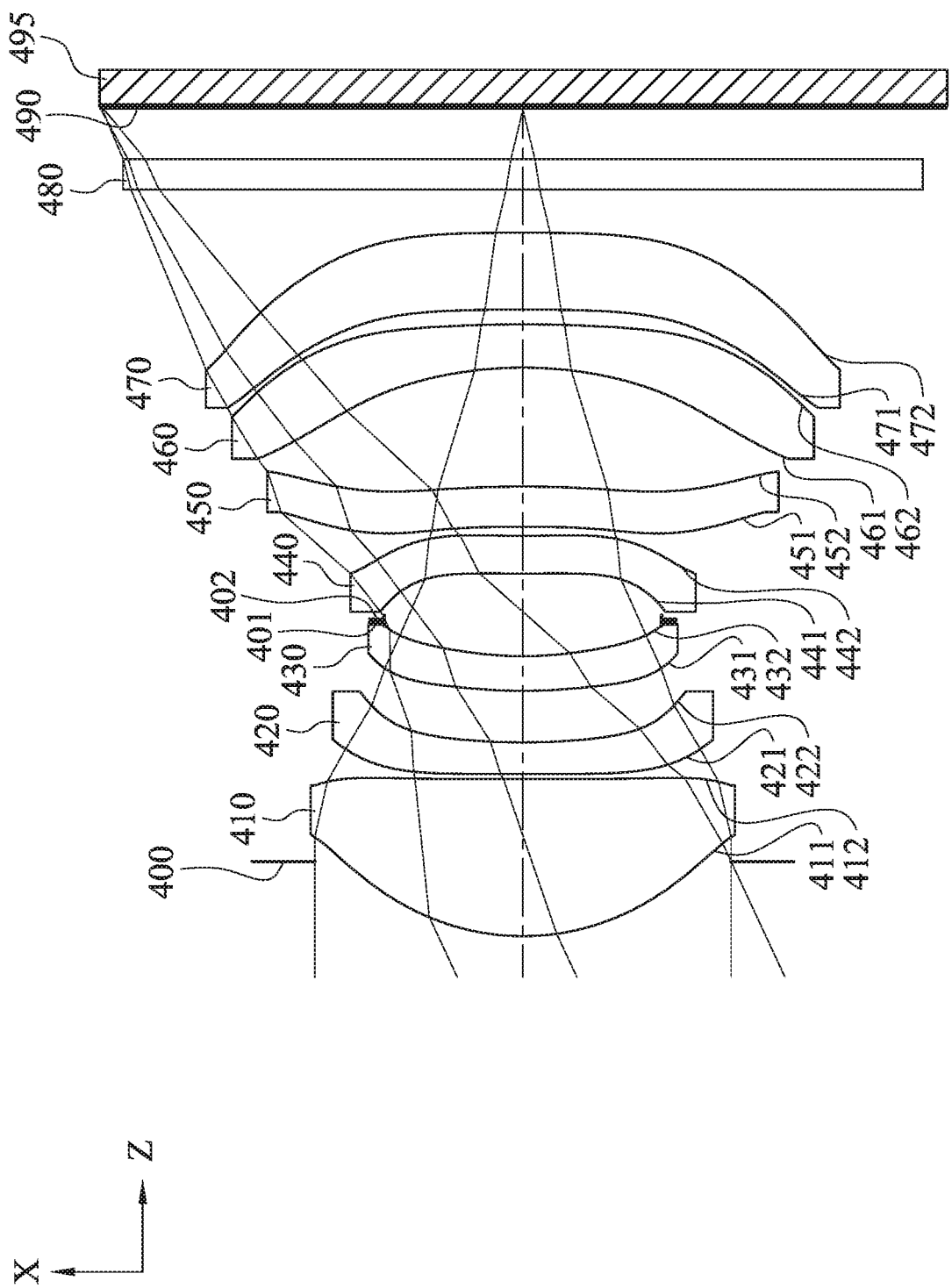
FIG. 7A is a schematic view of an imaging apparatus in a major axis direction of an aperture stop therein according to the 4th embodiment of the present disclosure.
Figure 7B:
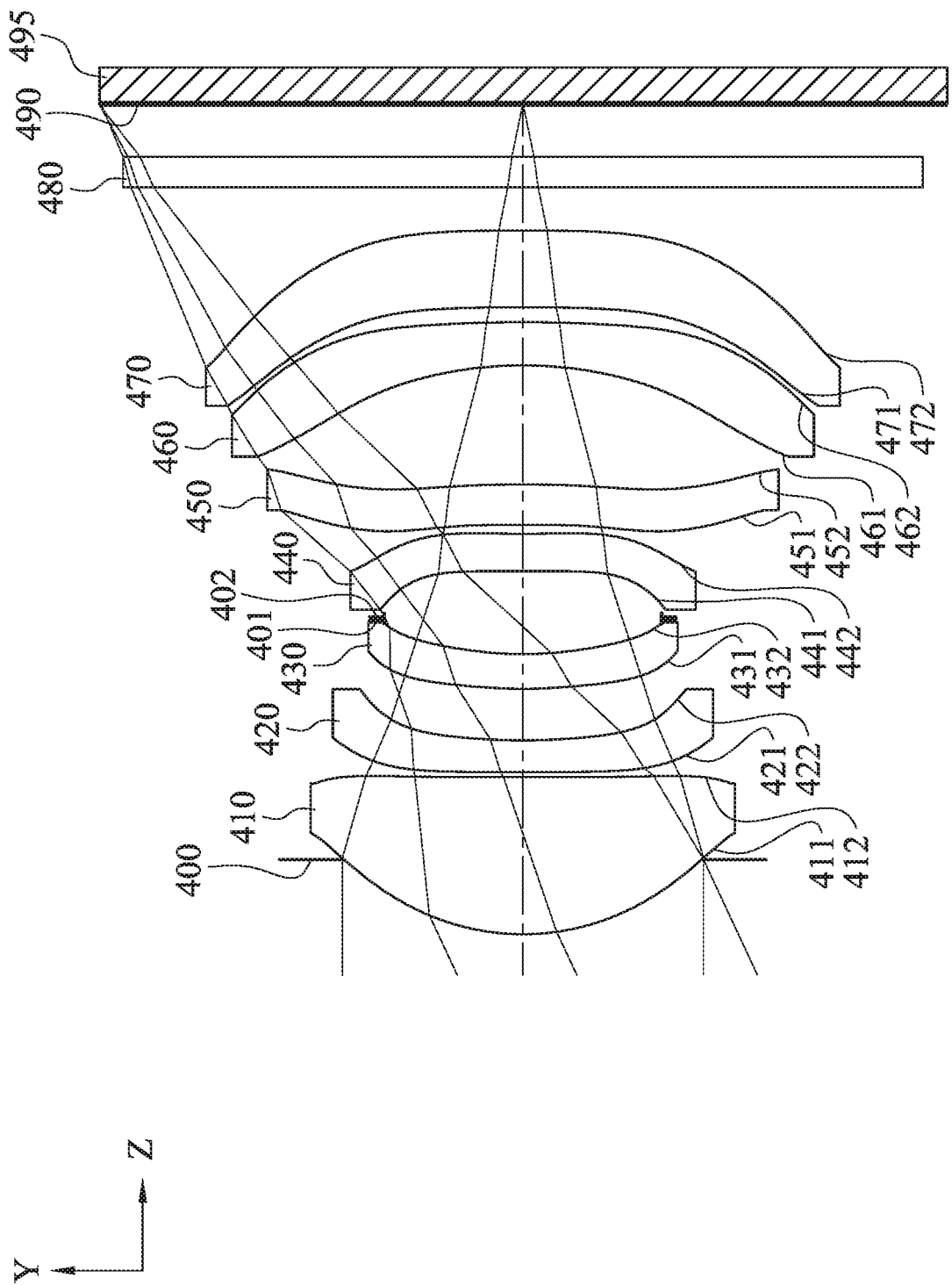
FIG. 7B is a schematic view of the imaging apparatus in a minor axis direction of the aperture stop therein according to the 4th embodiment of FIG. 7A.
Figure 8A:
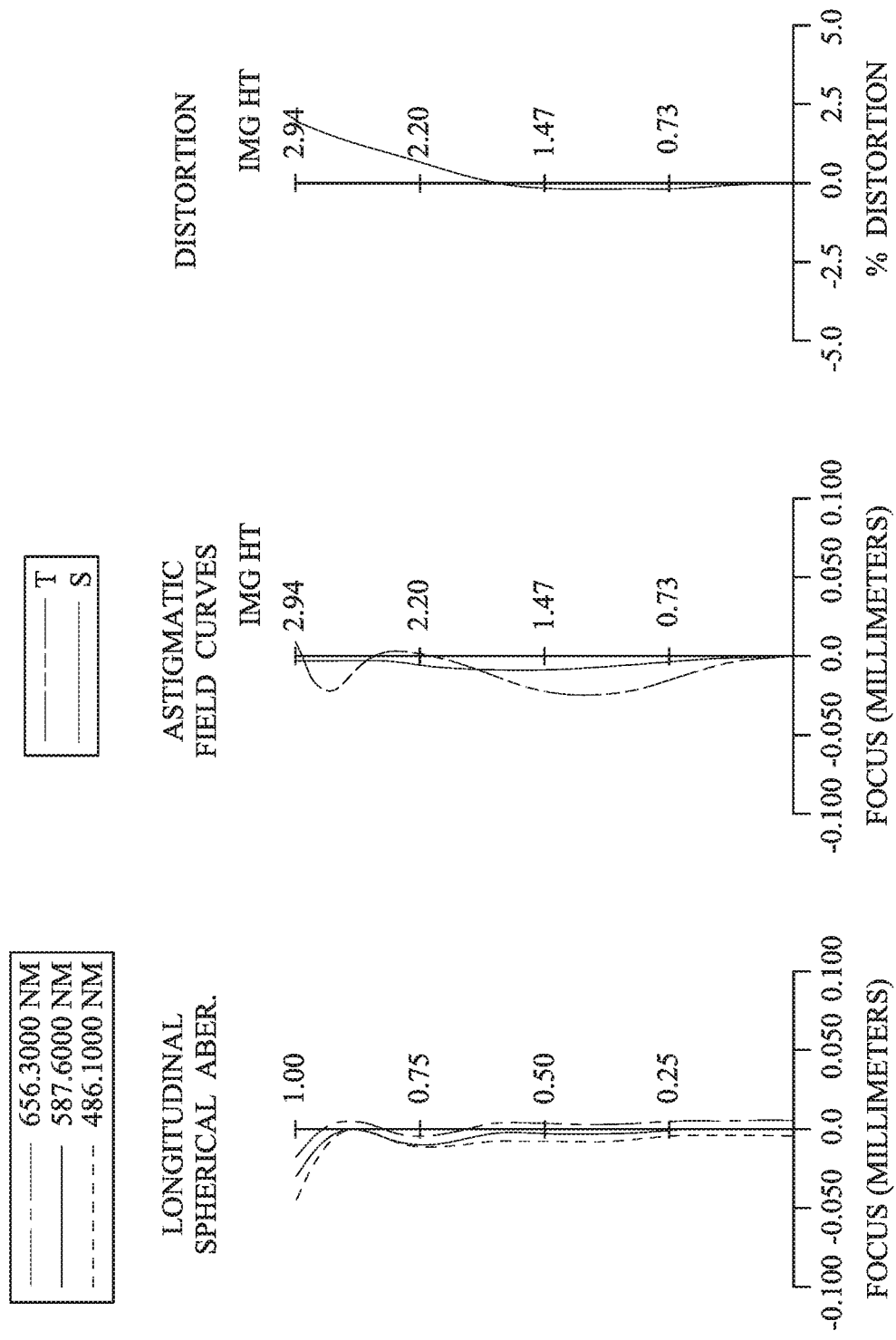
FIG. 8A shows spherical aberration curves, astigmatic field curves and a distortion curve of the imaging apparatus according to the 4th embodiment of FIG. 7A.
Figure 8B:
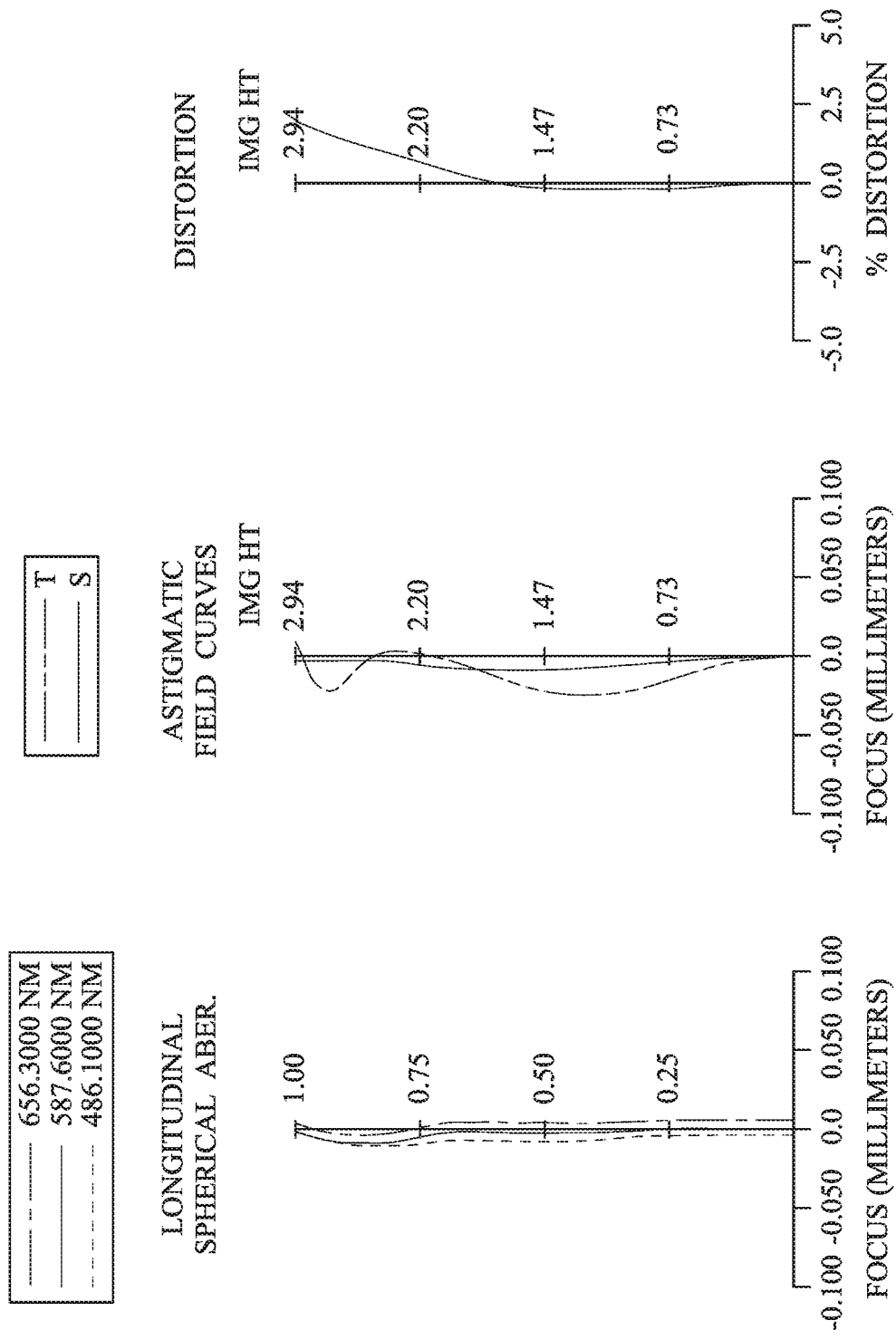
FIG. 8B shows spherical aberration curves, astigmatic field curves and a distortion curve of the imaging apparatus according to the 4th embodiment of FIG. 7B.

FIG. 7A is a schematic view of an imaging apparatus in a major axis direction of an aperture stop therein according to the 4th embodiment of the present disclosure. FIG. 7B is a schematic view of the imaging apparatus in a minor axis direction of the aperture stop therein according to the 4th embodiment of FIG. 7A. FIG. 8A shows spherical aberration curves, astigmatic field curves and a distortion curve of the imaging apparatus according to the 4th embodiment of FIG. 7A. FIG. 8B shows spherical aberration curves, astigmatic field curves and a distortion curve of the imaging apparatus according to the 4th embodiment of FIG. 7B.

In FIG. 7A and FIG. 7B, the imaging apparatus includes an imaging optical lens assembly (its reference numeral is omitted) and an image sensor 495. The imaging optical lens assembly includes, in order from an object side to an image side, an aperture stop 400, a first lens element 410, a second lens element 420, a third lens element 430, a stop 401, a stop 402, a fourth lens element 440, a fifth lens element 450, a sixth lens element 460, a seventh lens element 470, an IR-cut filter 480 and an image surface 490, wherein the image sensor is disposed on the image surface 490 of the imaging optical lens assembly. The imaging optical lens assembly includes seven lens elements (410, 420, 430, 440, 450, 460, and 470) with no additional lens element inserted between each of the adjacent seven lens elements, and there is an air gap in a paraxial region between each of adjacent lens elements.

The aperture stop 400 has a fixed elliptical shape, and the aperture stop 400 has a major axis and a minor axis, wherein the major axis is in an X-direction, the minor axis is in a Y-direction, and an optical axis of the imaging optical lens assembly is in a Z-direction.

The first lens element 410 with positive refractive power has an object-side surface 411 being convex in a paraxial region thereof and an image-side surface 412 being convex in a paraxial region thereof. The first lens element 410 is made of plastic material, and has the object-side surface 411 and the image-side surface 412 being both aspheric. Furthermore, the first lens element 410 includes at least one inflection point and at least one critical point.

The second lens element 420 with negative refractive power has an object-side surface 421 being convex in a paraxial region thereof and an image-side surface 422 being concave in a paraxial region thereof. The second lens element 420 is made of plastic material, and has the object-side surface 421 and the image-side surface 422 being both aspheric. Furthermore, the second lens element 420 includes at least one inflection point.

The third lens element 430 with negative refractive power has an object-side surface 431 being convex in a paraxial region thereof and an image-side surface 432 being concave in a paraxial region thereof. The third lens element 430 is made of plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material, and has the object-side surface 441 and the image-side surface 442 being both aspheric. Furthermore, the fourth lens element 440 includes at least one inflection point and at least one critical point.

The fifth lens element 450 with positive refractive power has an object-side surface 451 being concave in a paraxial region thereof and an image-side surface 452 being convex in a paraxial region thereof. The fifth lens element 450 is made of plastic material, and has the object-side surface 451 and the image-side surface 452 being both aspheric. Furthermore, the fifth lens element 450 includes at least one inflection point and at least one critical point.

The sixth lens element 460 with negative refractive power has an object-side surface 461 being convex in a paraxial region thereof and an image-side surface 462 being concave in a paraxial region thereof. The sixth lens element 460 is made of plastic material, and has the object-side surface 461 and the image-side surface 462 being both aspheric. Furthermore, the sixth lens element 460 includes at least one inflection point.

The seventh lens element 470 with negative refractive power has an object-side surface 471 being concave in a paraxial region thereof and an image-side surface 472 being concave in a paraxial region thereof. The seventh lens element 470 is made of plastic material, and has the object-side surface 471 and the image-side surface 472 being both aspheric. Furthermore, the seventh lens element 470 includes at least one inflection point.

The IR-cut filter 480 is made of glass material, which is located between the seventh lens element 470 and the image surface 490 in order, and will not affect the focal length of the imaging optical lens assembly.

The detailed optical data of the 4th embodiment are shown in Table 7 and the aspheric surface data are shown in Table 8 below.

TABLE 7

4th Embodiment
f = 6.18 mm, Fno_eff = 2.30, HFOV = 25.0 deg.
EPDX = 2.882 mm, EPDY = 2.500 mm

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.517 | | | | |
| 2 | Lens 1 | 1.902 ASP | 1.088 | Plastic | 1.544 | 55.9 | 3.07 |
| 3 | | −494.868 ASP | 0.035 | | | | |
| 4 | Lens 2 | 14.834 ASP | 0.220 | Plastic | 1.680 | 18.4 | −7.42 |
| 5 | | 2.907 ASP | 0.357 | | | | |
| 6 | Lens 3 | 4.761 ASP | 0.240 | Plastic | 1.544 | 55.9 | −16.57 |
| 7 | | 5.009 ASP | 0.235 | | | | |
| 8 | Stop | Plano | 0.023 | | | | |
| 9 | Stop | Plano | 0.316 | | | | |
| 10 | Lens 4 | 3.535 ASP | 0.260 | Plastic | 1.680 | 18.4 | −13.15 |
| 11 | | 3.757 ASP | 0.061 | | | | |
| 12 | Lens 5 | −5.784 ASP | 0.280 | Plastic | 1.667 | 19.3 | 13.76 |
| 13 | | −2.155 ASP | 0.825 | | | | |
| 14 | Lens 6 | 10.815 ASP | 0.300 | Plastic | 1.544 | 55.9 | −7.81 |
| 15 | | 7.682 ASP | 0.102 | | | | |
| 16 | Lens 7 | −123.133 ASP | 0.532 | Plastic | 1.680 | 18.4 | −69.33 |
| 17 | | 2.208 ASP | 0.300 | | | | |
| 18 | IR-cut filter | Plano | 0.210 | Glass | 1.517 | 64.2 | — |
| 19 | | Plano | 0.367 | | | | |
| 20 | Image | Plano | — | | | | |

Reference wavelength is 587.6 nm (d-line).
Ape. Stop is elliptical-shaped.
EPDX is a major axis (in X-direction) & EPDY is a minor axis (in Y-direction).
Effective region of Surface 8 is circular-shaped, which has a radius being 1.920 mm.
Effective region of Surface 9 is circular-shaped, which has a radius being 1.920 mm.

TABLE 8

Aspheric Coefficients

| Surface # | 2 | 3 | 4 | 5 | 6 |
|---|---|---|---|---|---|
| k= | −2.3828E−01 | −9.0000E+01 | −4.0699E+01 | −4.8101E+01 | 2.4460E+00 |
| A4= | 2.2619E−03 | −1.6041E−02 | −4.8671E−02 | 9.1717E−03 | −1.8968E−01 |
| A6= | 8.4745E−04 | 8.1417E−02 | 2.0813E−01 | 1.1048E−01 | 2.6554E−01 |
| A8= | −1.3928E−03 | −9.9427E−02 | −1.9830E−01 | 8.1557E−02 | −6.7803E−02 |
| A10= | −9.2013E−04 | 5.2495E−02 | 1.2747E−01 | −2.4139E−01 | −2.0410E−02 |
| A12= | 5.3627E−04 | −1.4240E−02 | −4.6482E−02 | 2.7203E−01 | 3.1897E−02 |
| A14= | −4.2680E−04 | 1.5192E−03 | 7.0612E−03 | −1.0195E−01 | 1.7420E−04 |
| A16= | | | | | |

| Surface # | 7 | 10 | 11 | 12 | 13 |
|---|---|---|---|---|---|
| k= | 2.8367E+00 | 1.0661E+01 | −3.0337E+00 | 9.0000E+01 | 1.0687E+01 |
| A4= | −2.1001E−01 | −2.3169E−01 | −4.4209E−01 | −3.5838E−01 | −8.9934E−02 |
| A6= | 3.5594E−01 | 6.2998E−02 | 5.1721E−01 | 6.3821E−01 | 2.1647E−01 |
| A8= | −5.9740E−01 | −3.1255E−01 | −7.1174E−01 | −5.1256E−01 | −1.6418E−01 |
| A10= | 9.9694E−01 | 3.5291E−01 | 6.9120E−01 | 2.4167E−01 | 6.9712E−02 |
| A12= | −9.7886E−01 | −5.1439E−01 | −4.7281E−01 | −6.8585E−02 | −1.7498E−02 |
| A14= | 4.1480E−01 | 5.4000E−01 | 2.2977E−01 | 1.0844E−02 | 2.4068E−03 |
| A16= | | −2.0649E−01 | −5.2030E−02 | −7.3770E−04 | −1.4143E−04 |

| Surface # | 14 | 15 | 16 | 17 |
|---|---|---|---|---|
| k= | −2.0235E+01 | −4.7269E+01 | 6.1253E+01 | 1.0135E+01 |
| A4= | −1.0980E−01 | 3.1171E−02 | −3.8481E−02 | −8.3849E−02 |
| A6= | 1.1458E−01 | −4.7699E−02 | 4.0834E−03 | 3.9678E−02 |
| A8= | −1.2900E−01 | 5.5952E−03 | −3.1419E−02 | −3.1870E−02 |
| A10= | 8.0226E−02 | 6.2680E−03 | 2.9146E−02 | 1.5906E−02 |
| A12= | −2.5637E−02 | −2.7259E−03 | −1.1097E−02 | −4.1863E−03 |
| A14= | 4.0680E−03 | 4.1162E−04 | 1.9621E−03 | 5.4262E−04 |
| A16= | −2.5439E−04 | −2.0443E−05 | −1.3258E−04 | −2.7023E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.18 | ESDX/ESDY | 1.15 |
| f/EPDC | 2.30 | Tan(FOV) | 1.19 |
| HFOV [deg.] | 25.0 | TL/f | 0.93 |
| FOV [deg.] | 50.0 | Nmax | 1.68 |
| ESDX | 2.882 | Vmin | 18.40 |
| ESDY | 2.500 | f/R1 | 3.73 |
| ESDC | 2.684 | CT1/(ΣCT − CT1) | 0.59 |
| EPDC | 2.684 | Ymax [mm] | 2.19 |

Furthermore, in the imaging optical lens assembly according to the 4th embodiment, a maximum optical effective diameter of the seventh lens element 470 is a maximum among maximum optical effective diameters of the lens elements of the imaging optical lens assembly.

5th Embodiment

Figure 9A:
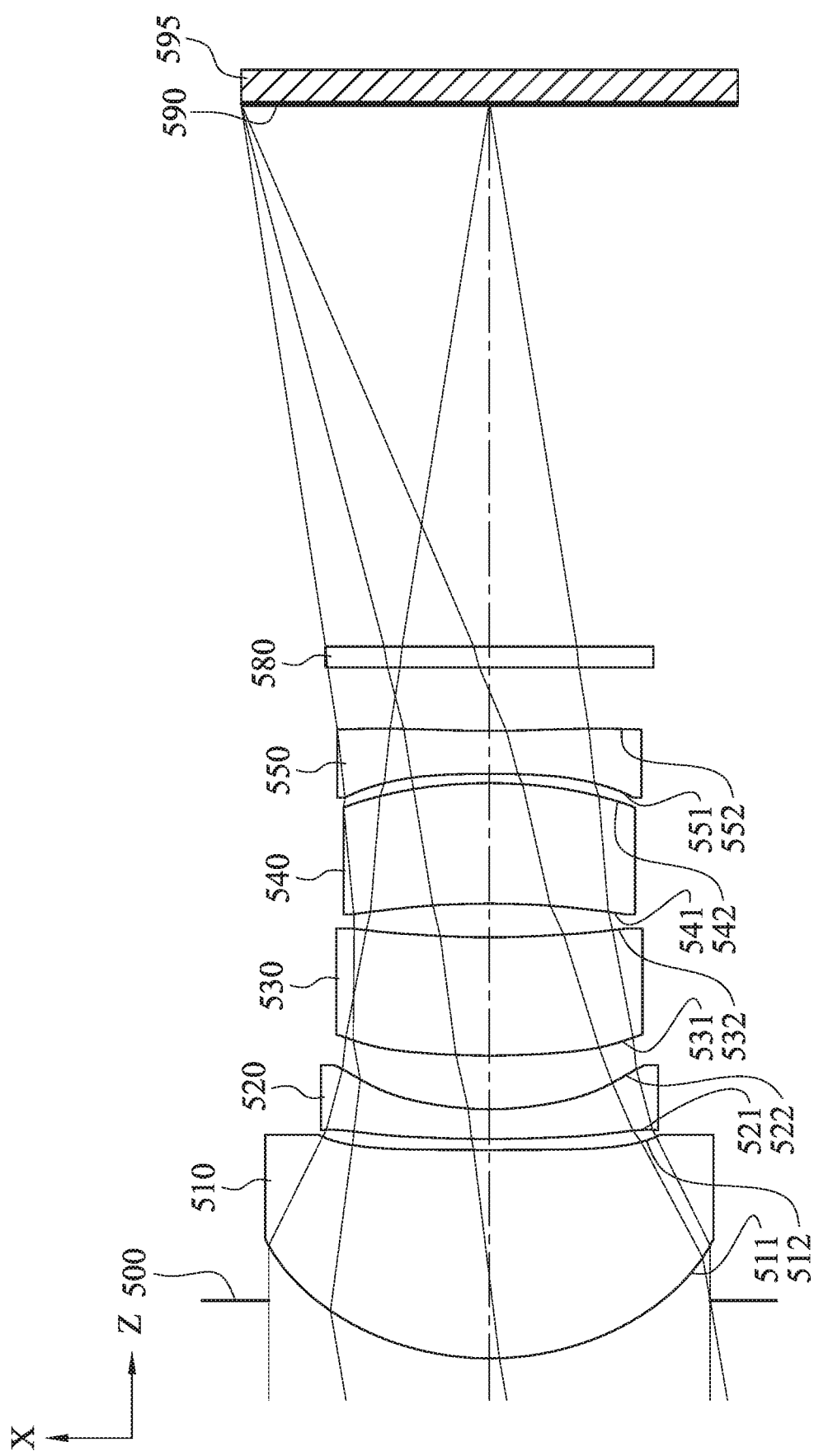
FIG. 9A is a schematic view of an imaging apparatus in a major axis direction of an aperture stop therein according to the 5th embodiment of the present disclosure.
Figure 9B:
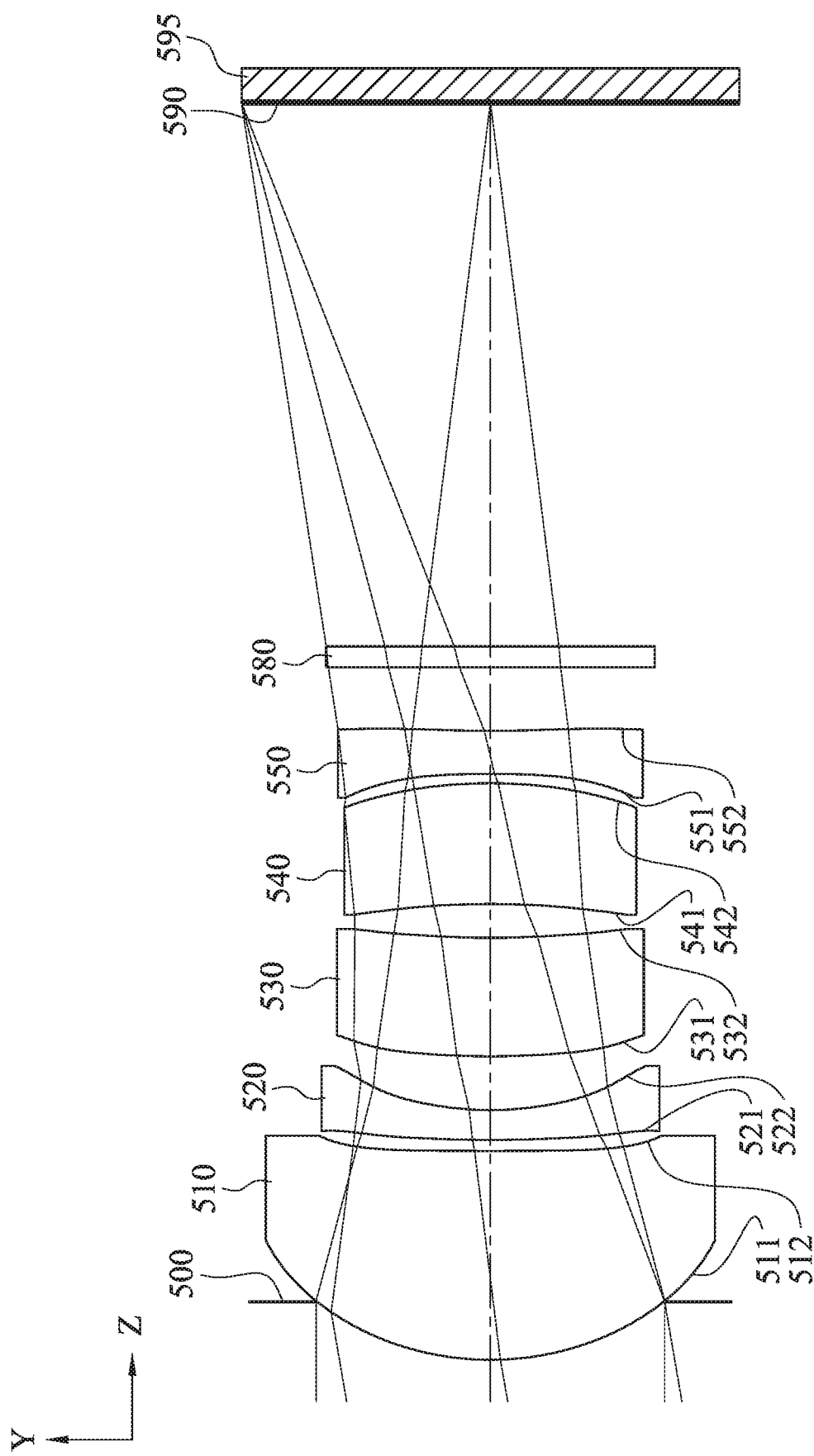
FIG. 9B is a schematic view of the imaging apparatus in a minor axis direction of the aperture stop therein according to the 5th embodiment of FIG. 9A.
Figure 10A:
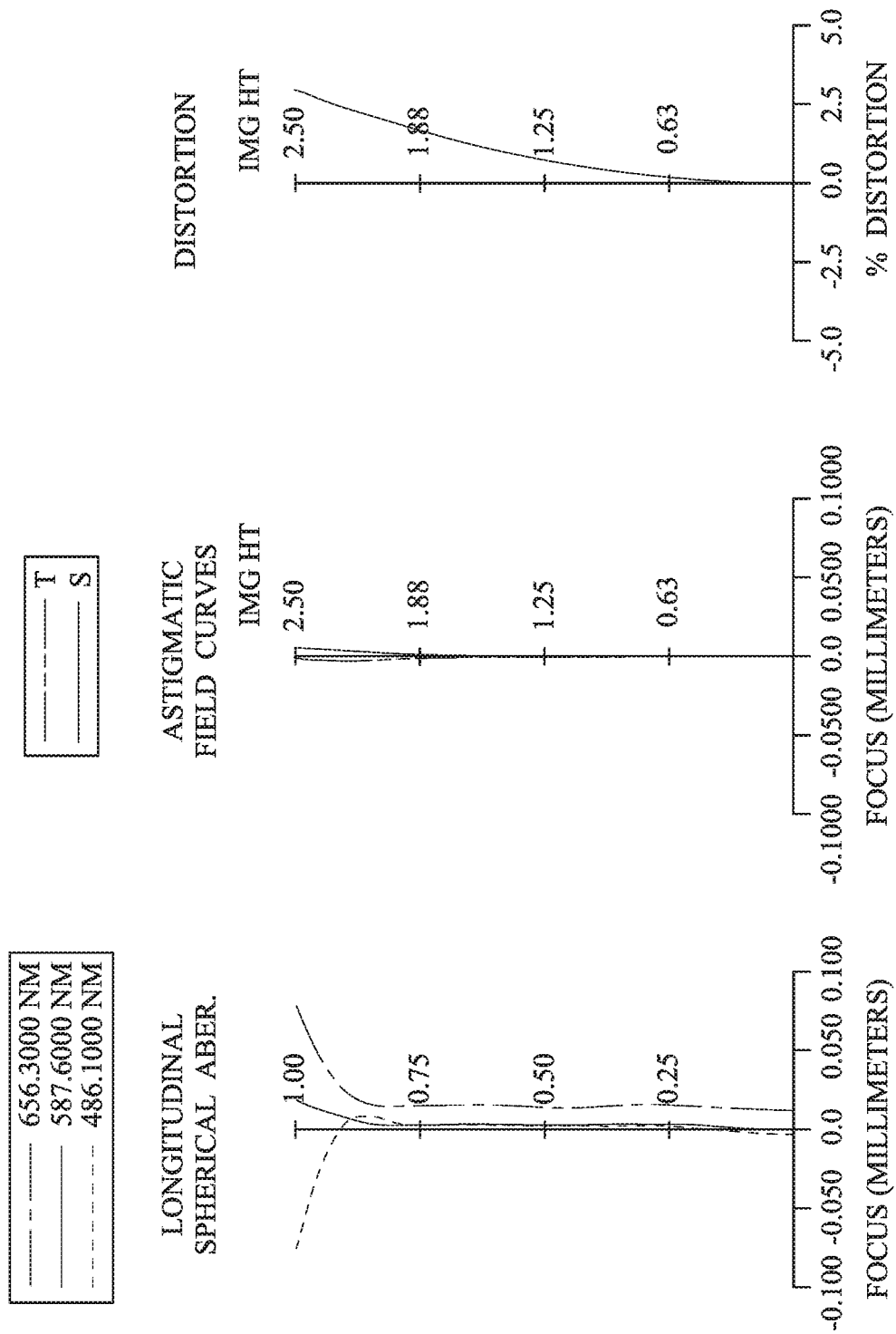
FIG. 10A shows spherical aberration curves, astigmatic field curves and a distortion curve of the imaging apparatus according to the 5th embodiment of FIG. 9A.
Figure 10B:
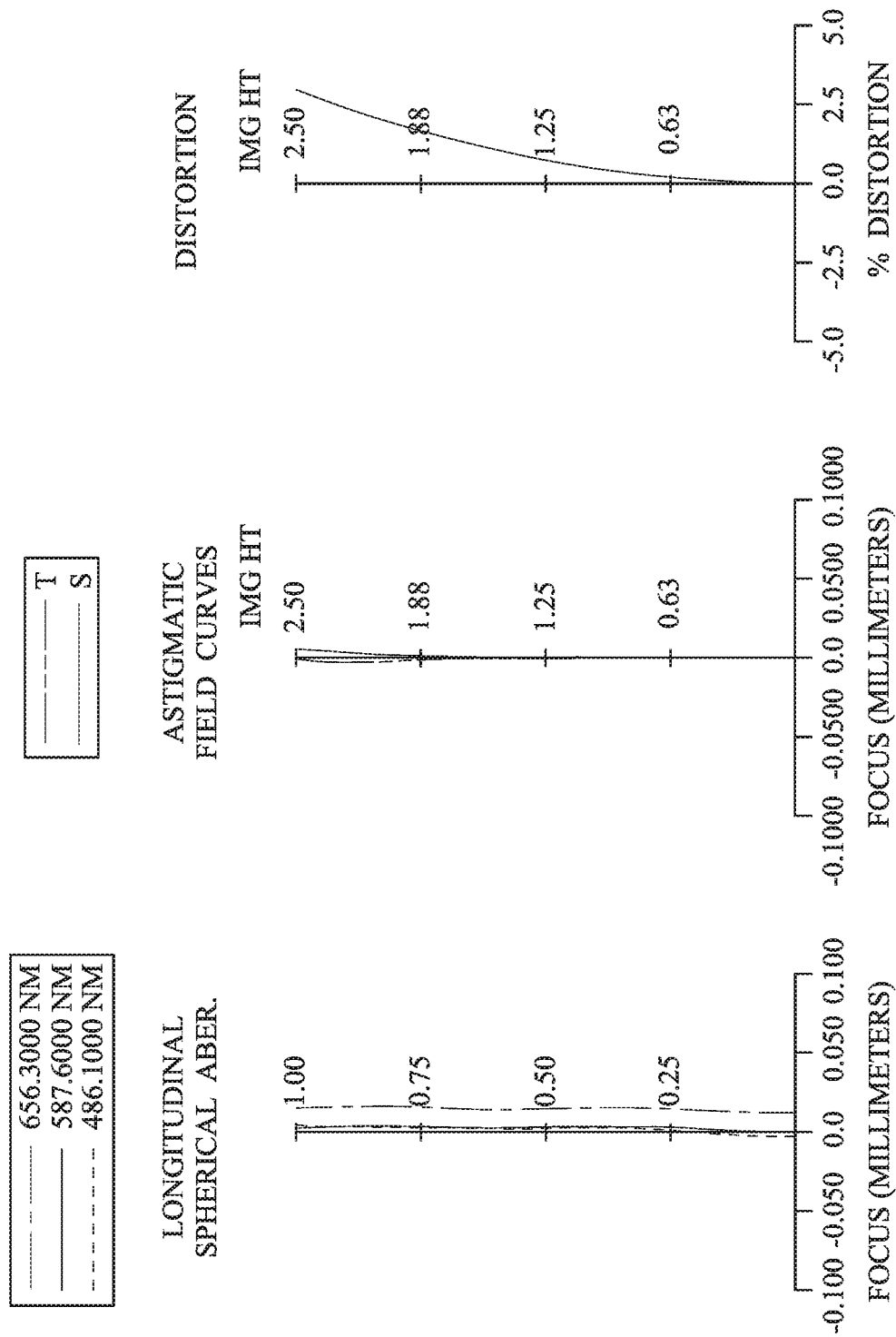
FIG. 10B shows spherical aberration curves, astigmatic field curves and a distortion curve of the imaging apparatus according to the 5th embodiment of FIG. 9B.

FIG. 9A is a schematic view of an imaging apparatus in a major axis direction of an aperture stop therein according to the 5th embodiment of the present disclosure. FIG. 9B is a schematic view of the imaging apparatus in a minor axis direction of the aperture stop therein according to the 5th embodiment of FIG. 9A. FIG. 10A shows spherical aberration curves, astigmatic field curves and a distortion curve of the imaging apparatus according to the 5th embodiment of FIG. 9A. FIG. 10B shows spherical aberration curves, astigmatic field curves and a distortion curve of the imaging apparatus according to the 5th embodiment of FIG. 9B.

In FIG. 9A and FIG. 9B, the imaging apparatus includes an imaging optical lens assembly (its reference numeral is omitted) and an image sensor 595. The imaging optical lens assembly includes, in order from an object side to an image side, an aperture stop 500, a first lens element 510, a second lens element 520, a third lens element 530, a fourth lens element 540, a fifth lens element 550, an IR-cut filter 580 and an image surface 590, wherein the image sensor is disposed on the image surface 590 of the imaging optical lens assembly. The imaging optical lens assembly includes five lens elements (510, 520, 530, 540, and 550) with no additional lens element inserted between each of the adjacent five lens elements, and there is an air gap in a paraxial region between each of adjacent lens elements.

The aperture stop 500 has a fixed elliptical shape, and the aperture stop 500 has a major axis and a minor axis, wherein the major axis is in an X-direction, the minor axis is in a Y-direction, and an optical axis of the imaging optical lens assembly is in a Z-direction.

The first lens element 510 with positive refractive power has an object-side surface 511 being convex in a paraxial region thereof and an image-side surface 512 being concave in a paraxial region thereof. The first lens element 510 is made of plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material, and has the object-side surface 521 and the image-side surface 522 being both aspheric. Furthermore, the second lens element 520 includes at least one inflection point and at least one critical point.

The third lens element 530 with positive refractive power has an object-side surface 531 being convex in a paraxial region thereof and an image-side surface 532 being concave in a paraxial region thereof. The third lens element 530 is made of plastic material, and has the object-side surface 531 and the image-side surface 532 being both aspheric. Furthermore, the third lens element 530 includes at least one inflection point.

The fourth lens element 540 with positive refractive power has an object-side surface 541 being concave in a paraxial region thereof and an image-side surface 542 being convex in a paraxial region thereof. The fourth lens element 540 is made of plastic material, and has the object-side surface 541 and the image-side surface 542 being both aspheric.

The fifth lens element 550 with negative refractive power has an object-side surface 551 being concave in a paraxial region thereof and an image-side surface 552 being concave in a paraxial region thereof. The fifth lens element 550 is made of plastic material, and has the object-side surface 551 and the image-side surface 552 being both aspheric. Furthermore, the fifth lens element 550 includes at least one inflection point and at least one critical point.

The IR-cut filter 580 is made of glass material, which is located between the fifth lens element 550 and the image surface 590 in order, and will not affect the focal length of the imaging optical lens assembly.

The detailed optical data of the 5th embodiment are shown in Table 9 and the aspheric surface data are shown in Table 10 below.

TABLE 9

5th Embodiment
f = 14.01 mm, Fno_eff = 3.55, HFOV = 9.8 deg.
EPDX = 4.444 mm, EPDY = 3.500 mm

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.582 | | | | |
| 2 | Lens 1 | 2.978 | ASP | 2.100 | Plastic | 1.545 | 56.1 | 5.54 |
| 3 | | 167.567 | ASP | 0.110 | | | | |
| 4 | Lens 2 | 10.051 | ASP | 0.300 | Plastic | 1.639 | 23.5 | −6.84 |
| 5 | | 3.010 | ASP | 0.541 | | | | |
| 6 | Lens 3 | 7.658 | ASP | 1.191 | Plastic | 1.544 | 56.0 | 352.93 |
| 7 | | 7.539 | ASP | 0.340 | | | | |
| 8 | Lens 4 | −9.666 | ASP | 1.214 | Plastic | 1.669 | 19.4 | 14.24 |
| 9 | | −5.040 | ASP | 0.094 | | | | |
| 10 | Lens 5 | −11.687 | ASP | 0.433 | Plastic | 1.559 | 40.4 | −10.43 |
| 11 | | 11.782 | ASP | 0.640 | | | | |
| 12 | IR-cut filter | Plano | | 0.210 | Glass | 1.517 | 64.2 | — |
| 13 | | Plano | | 5.467 | | | | |
| 14 | Image | Plano | | — | | | | |

Reference wavelength is 587.6 nm (d-line).
Ape. Stop is elliptical-shaped.
EPDX is a major axis (in X-direction) & EPDY is a minor axis (in Y-direction).
Effective region of Surface 11 is circular-shaped, which has a radius being 3.060 mm.

TABLE 10

Aspheric Coefficients

| Surface # | 2 | 3 | 4 | 5 | 6 |
|---|---|---|---|---|---|
| k= | 5.3176E−01 | −9.0000E+01 | 2.3576E+01 | 1.9475E+00 | 2.0020E+01 |
| A4= | −1.1182E−03 | 6.0053E−03 | −4.3661E−02 | −6.3127E−02 | −2.9078E−02 |
| A6= | −1.5695E−04 | 1.9062E−03 | 3.2574E−02 | 4.5173E−02 | 1.2279E−02 |
| A8= | −4.8786E−05 | 2.2528E−03 | −2.1913E−02 | −5.4617E−04 | 1.7595E−02 |
| A10= | 9.9131E−06 | −1.2892E−03 | −6.1656E−03 | −6.4329E−03 | −1.5167E−02 |
| A12= | −1.0582E−06 | 2.4221E−04 | 2.2968E−03 | 8.5980E−04 | 4.8292E−03 |
| A14= | | | −2.7509E−04 | | −6.8568E−04 |

| Surface # | 7 | 8 | 9 | 10 | 1 |
|---|---|---|---|---|---|
| k= | 0.0000E+00 | 1.8355E+01 | −1.5551E+00 | 4.2832E+01 | −1.0000E+00 |
| A4= | −3.4804E−02 | −1.0386E−02 | 6.1479E−03 | −1.5565E−02 | −2.1393E+00 |
| A6= | 4.4803E−03 | −3.1289E−03 | −4.0923E−02 | −5.2646E−02 | −4.5036E+00 |
| A8= | 2.8698E−02 | 1.6736E−02 | 4.0718E−02 | 4.9215E−02 | 5.2812E+00 |
| A10= | −2.6087E−02 | −7.9438E−03 | −1.8763E−02 | −1.5525E−02 | 1.5419E+00 |
| A12= | 1.0298E−02 | −1.2793E−03 | 5.5079E−03 | 1.1139E−03 | −2.7455E+00 |
| A14= | −1.7550E−03 | 2.1016E−03 | −1.4083E−03 | −1.6859E−04 | 9.6170E+00 |
| A16= | | −5.3082E−04 | 1.9635E−04 | 1.1621E−04 | −1.0732E+00 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 14.01 | ESDX/ESDY | 1.27 |
| f/EPDC | 3.55 | Tan(FOV) | 0.36 |
| HFOV [deg.] | 9.8 | TL/f | 0.90 |
| FOV [deg.] | 19.6 | Nmax | 1.67 |
| ESDX | 4.444 | Vmin | 19.44 |
| ESDY | 3.500 | f/R1 | 4.70 |
| ESDC | 3.944 | CT1/(ΣCT − CT1) | 0.67 |
| EPDC | 3.944 | Ymax [mm] | 2.25 |

Furthermore, in the imaging optical lens assembly according to the 5th embodiment, a maximum optical effective diameter of the first lens element 510 is a maximum among maximum optical effective diameters of the lens elements of the imaging optical lens assembly.

6th Embodiment

Figure 11A:
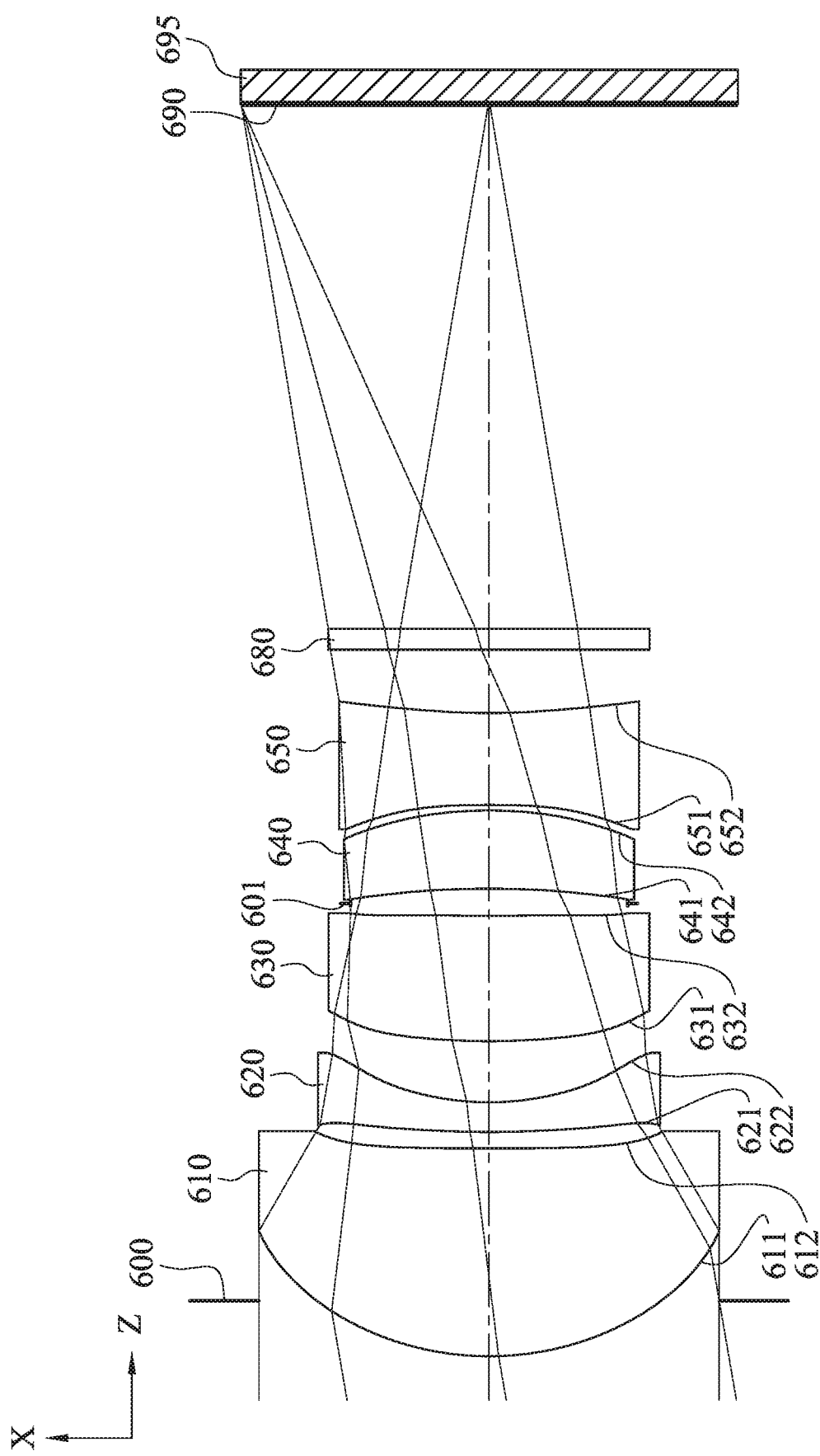
FIG. 11A is a schematic view of an imaging apparatus in a major axis direction of an aperture stop therein according to the 6th embodiment of the present disclosure.
Figure 11B:
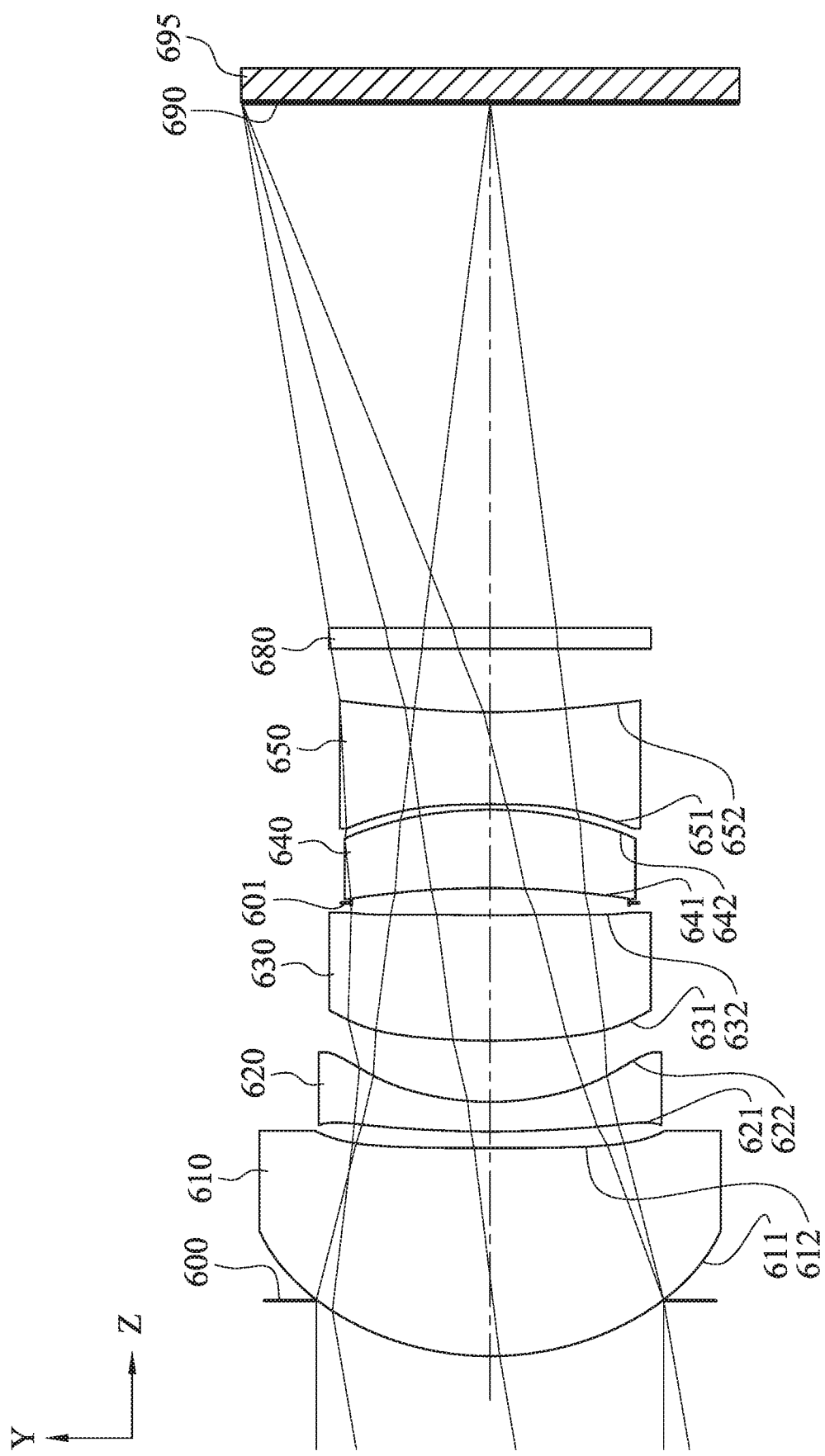
FIG. 11B is a schematic view of the imaging apparatus in a minor axis direction of the aperture stop therein according to the 6th embodiment of FIG. 11A.
Figure 12A:
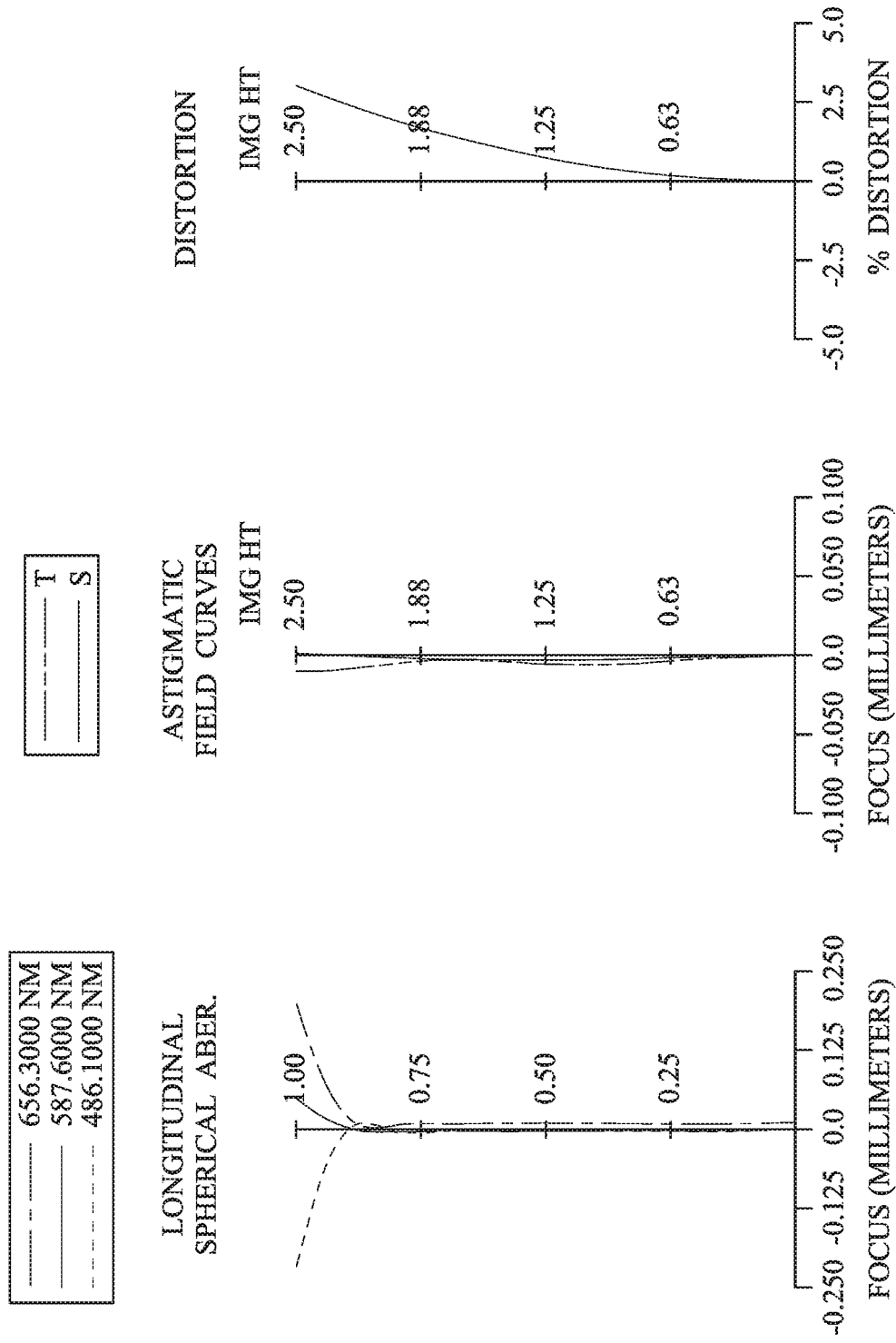
FIG. 12A shows spherical aberration curves, astigmatic field curves and a distortion curve of the imaging apparatus according to the 6th embodiment of FIG. 11A.
Figure 12B:
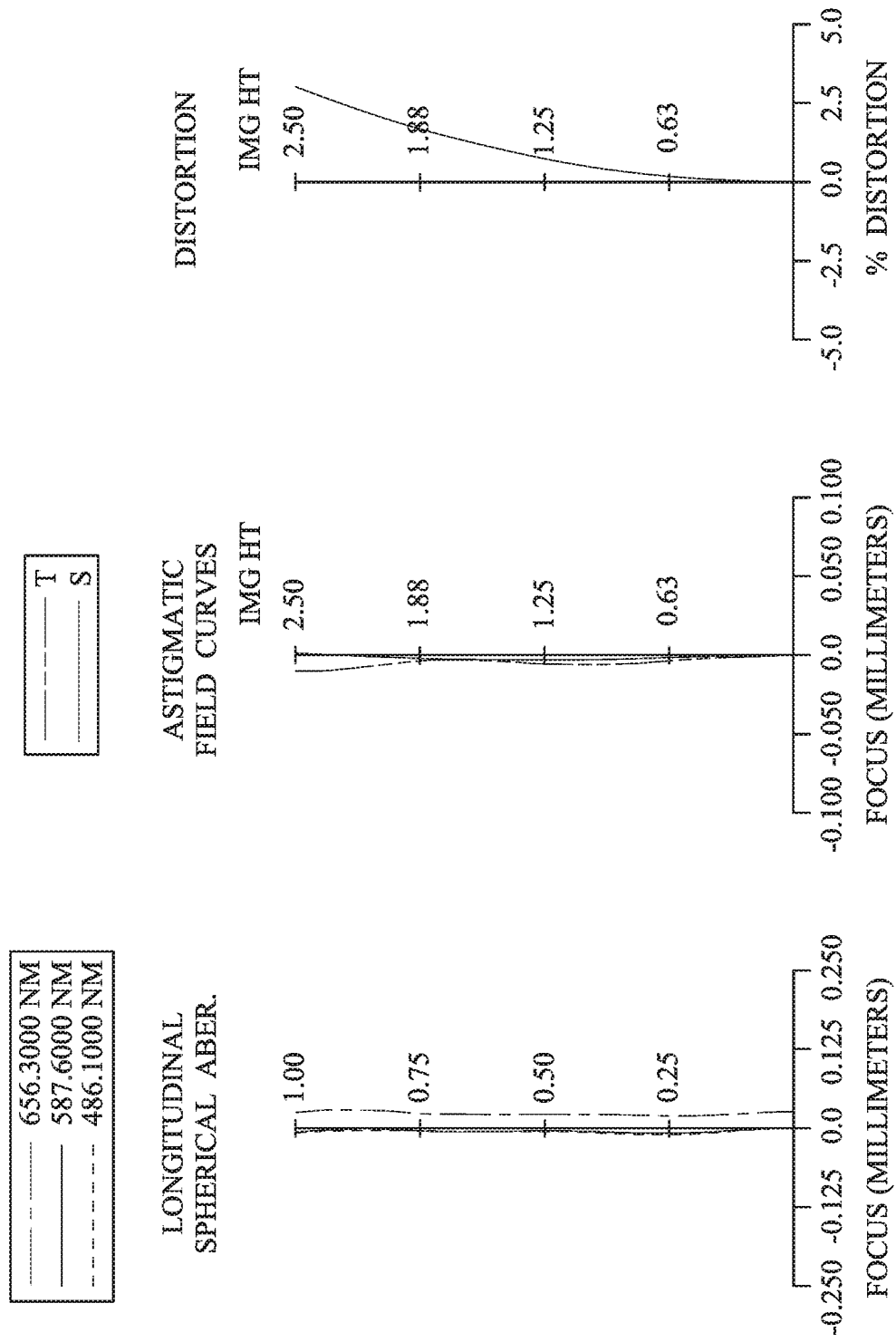
FIG. 12B shows spherical aberration curves, astigmatic field curves and a distortion curve of the imaging apparatus according to the 6th embodiment of FIG. 11B.

FIG. 11A is a schematic view of an imaging apparatus in a major axis direction of an aperture stop therein according to the 6th embodiment of the present disclosure. FIG. 11B is a schematic view of the imaging apparatus in a minor axis direction of the aperture stop therein according to the 6th embodiment of FIG. 11A. FIG. 12A shows spherical aberration curves, astigmatic field curves and a distortion curve of the imaging apparatus according to the 6th embodiment of FIG. 11A. FIG. 12B shows spherical aberration curves, astigmatic field curves and a distortion curve of the imaging apparatus according to the 6th embodiment of FIG. 11B.

In FIG. 11A and FIG. 11B, the imaging apparatus includes an imaging optical lens assembly (its reference numeral is omitted) and an image sensor 695. The imaging optical lens assembly includes, in order from an object side to an image side, an aperture stop 600, a first lens element 610, a second lens element 620, a third lens element 630, a stop 601, a fourth lens element 640, a fifth lens element 650, an IR-cut filter 680 and an image surface 690, wherein the image sensor is disposed on the image surface 690 of the imaging optical lens assembly. The imaging optical lens assembly includes five lens elements (610, 620, 630, 640, and 650) with no additional lens element inserted between each of the adjacent five lens elements, and there is an air gap in a paraxial region between each of adjacent lens elements.

The aperture stop 600 has a fixed elliptical shape, and the aperture stop 600 has a major axis and a minor axis, wherein the major axis is in an X-direction, the minor axis is in a Y-direction, and an optical axis of the imaging optical lens assembly is in a Z-direction.

The first lens element 610 with positive refractive power has an object-side surface 611 being convex in a paraxial region thereof and an image-side surface 612 being concave in a paraxial region thereof. The first lens element 610 is made of plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material, and has the object-side surface 621 and the image-side surface 622 being both aspheric. Furthermore, the second lens element 620 includes at least one inflection point and at least one critical point.

The third lens element 630 with positive refractive power has an object-side surface 631 being convex in a paraxial region thereof and an image-side surface 632 being concave in a paraxial region thereof. The third lens element 630 is made of plastic material, and has the object-side surface 631 and the image-side surface 632 being both aspheric. Furthermore, the third lens element 630 includes at least one inflection point and at least one critical point.

The fourth lens element 640 with positive refractive power has an object-side surface 641 being concave in a paraxial region thereof and an image-side surface 642 being convex in a paraxial region thereof. The fourth lens element 640 is made of plastic material, and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of plastic material, and has the object-side surface 651 and the image-side surface 652 being both aspheric.

The IR-cut filter 680 is made of glass material, which is located between the fifth lens element 650 and the image surface 690 in order, and will not affect the focal length of the imaging optical lens assembly.

The detailed optical data of the 6th embodiment are shown in Table 11 and the aspheric surface data are shown in Table 12 below.

TABLE 11

| 6th Embodiment f = 14.01 mm, Fno_eff = 3.47, HFOV = 9.8 deg. EPDX = 4.650 mm, EPDY = 3.500 mm | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.559 | | | | |
| 2 | Lens 1 | 3.060 | ASP | 2.100 | Plastic | 1.545 | 56.1 | 5.80 |
| 3 | | 71.720 | ASP | 0.166 | | | | |
| 4 | Lens 2 | 9.390 | ASP | 0.300 | Plastic | 1.639 | 23.5 | −6.12 |
| 5 | | 2.726 | ASP | 0.618 | | | | |
| 6 | Lens 3 | 7.005 | ASP | 1.266 | Plastic | 1.544 | 56.0 | 20.01 |

TABLE 11-continued

6th Embodiment
f = 14.01 mm, Fno_eff = 3.47, HFOV = 9.8 deg.
EPDX = 4.650 mm, EPDY = 3.500 mm

| Surface # | | Curvature Radius | | Thickness | Material | Index | Abbe # | Focal Length |
|---|---|---|---|---|---|---|---|---|
| 7 | | 18.391 | ASP | 0.125 | | | | |
| 8 | Stop | Plano | | 0.150 | | | | |
| 9 | Lens 4 | −10.072 | ASP | 0.790 | Plastic | 1.669 | 19.4 | 10.88 |
| 10 | | −4.358 | ASP | 0.057 | | | | |
| 11 | Lens 5 | −9.432 | ASP | 0.928 | Plastic | 1.559 | 40.4 | −6.90 |
| 12 | | 6.756 | ASP | 0.640 | | | | |
| 13 | IR-cut filter | Plano | | 0.210 | Glass | 1.517 | 64.2 | — |
| 14 | | Plano | | 5.306 | | | | |
| 15 | Image | Plano | | — | | | | |

Reference wavelength is 587.6 nm (d-line).
Ape. Stop is elliptical-shaped.
EPDX is a major axis (in X-direction) & EPDY is a minor axis (in Y-direction).
Effective region of Surface 8 is circular-shaped, which has a radius being 2.800 mm.

TABLE 12

Aspheric Coefficients

| Surface # | 2 | 3 | 4 | 5 | 6 |
|---|---|---|---|---|---|
| k= | 5.7044E−01 | 1.0000E+01 | 1.7385E+01 | 1.0147E+00 | 1.3445E+01 |
| A4= | −1.5539E−03 | 1.1602E−02 | −1.8813E−02 | −3.1823E−02 | −1.4957E−02 |
| A6= | −1.2602E−04 | −9.0853E−03 | −6.1298E−03 | 5.2550E−03 | 5.3160E−04 |
| A8= | −8.0652E−05 | 8.3808E−03 | 2.1748E−02 | 2.2321E−02 | 1.8280E−02 |
| A10= | 2.3159E−05 | −2.5920E−03 | −1.3450E−02 | −1.3320E−02 | −1.0988E−02 |
| A12= | −2.5066E−06 | 3.1497E−04 | 3.3143E−03 | 1.8160E−03 | 2.9583E−03 |
| A14= | | | −3.2407E−04 | | −3.7127E−04 |

| Surface # | 7 | 9 | 10 | 11 | 12 |
|---|---|---|---|---|---|
| k= | 0.0000E+00 | 1.8451E+01 | −1.1596E+00 | 1.9750E+01 | −6.0971E+00 |
| A4= | −2.6739E−02 | 5.9375E−03 | 9.8345E−03 | −2.3743E−02 | −1.7760E−02 |
| A6= | −2.8222E−02 | −4.7134E−02 | −9.1286E−02 | −8.7564E−02 | 4.1786E−03 |
| A8= | 6.3910E−02 | 7.3023E−02 | 1.3874E−01 | 1.4627E−01 | 9.1041E−04 |
| A10= | −4.4781E−02 | −4.9085E−02 | −1.0929E−01 | −1.1703E−01 | −4.5952E−04 |
| A12= | 1.6115E−02 | 1.6746E−02 | 5.0454E−02 | 5.4758E−02 | −1.2597E−04 |
| A14= | −2.4754E−03 | −2.4504E−03 | −1.2941E−02 | −1.4107E−02 | 1.1426E−04 |
| A16= | | −2.3443E−05 | 1.3904E−03 | 1.5213E−03 | −1.9505E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 14.01 | ESDX/ESDY | 1.33 |
| f/EPDC | 3.47 | Tan(FOV) | 0.36 |
| HFOV [deg.] | 9.8 | TL/f | 0.90 |
| FOV [deg.] | 19.6 | Nmax | 1.67 |
| ESDX | 4.650 | Vmin | 19.44 |
| ESDY | 3.500 | f/R1 | 4.58 |
| ESDC | 4.034 | CT1/(ΣCT − CT1) | 0.64 |
| EPDC | 4.034 | Ymax [mm] | 2.33 |

Furthermore, in the imaging optical lens assembly according to the 6th embodiment, a maximum optical effective diameter of the first lens element 610 is a maximum among maximum optical effective diameters of the lens elements of the imaging optical lens assembly.

7th Embodiment

Figure 13A:
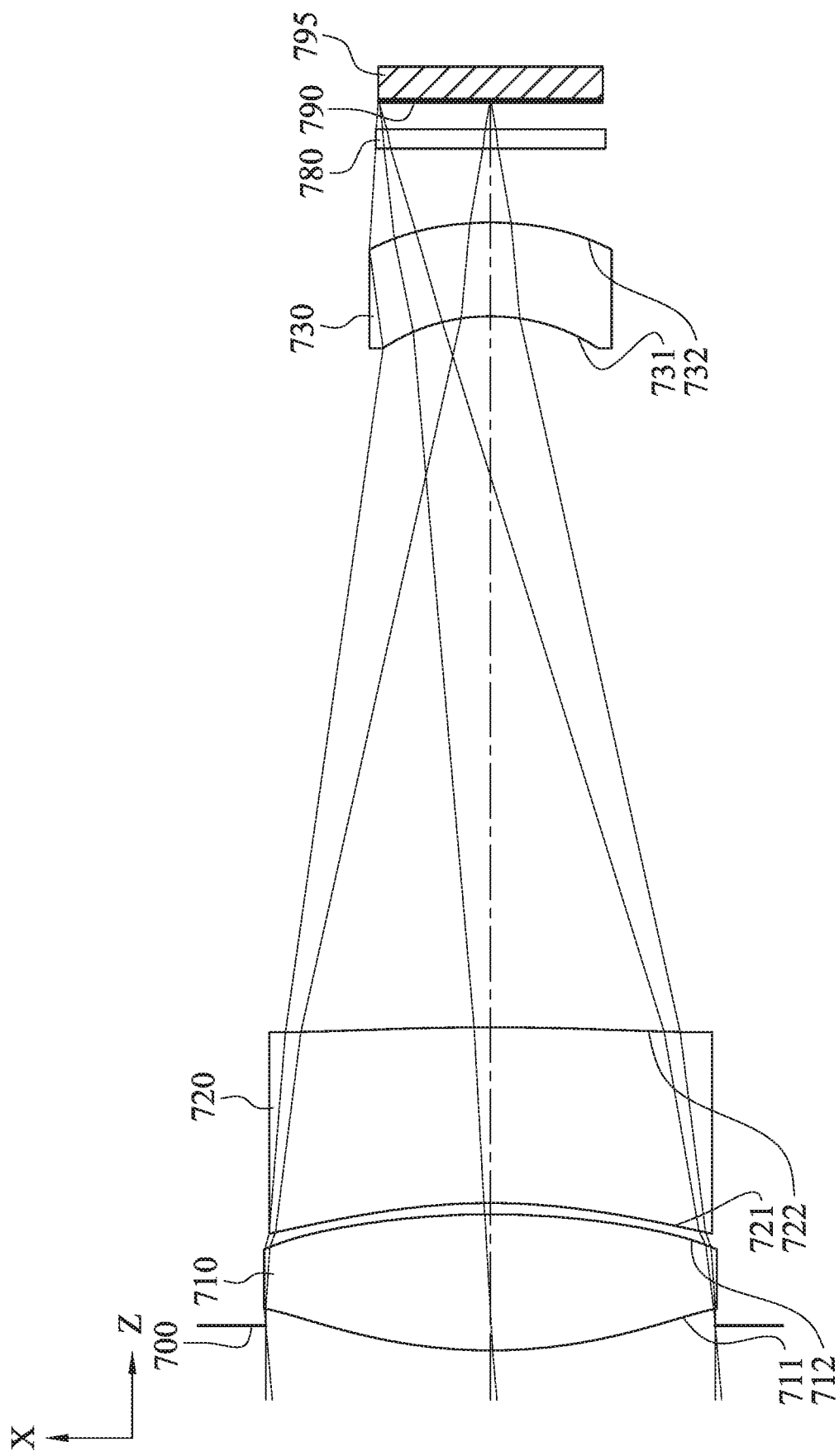
FIG. 13A is a schematic view of an imaging apparatus in a major axis direction of an aperture stop therein according to the 7th embodiment of the present disclosure.
Figure 13B:
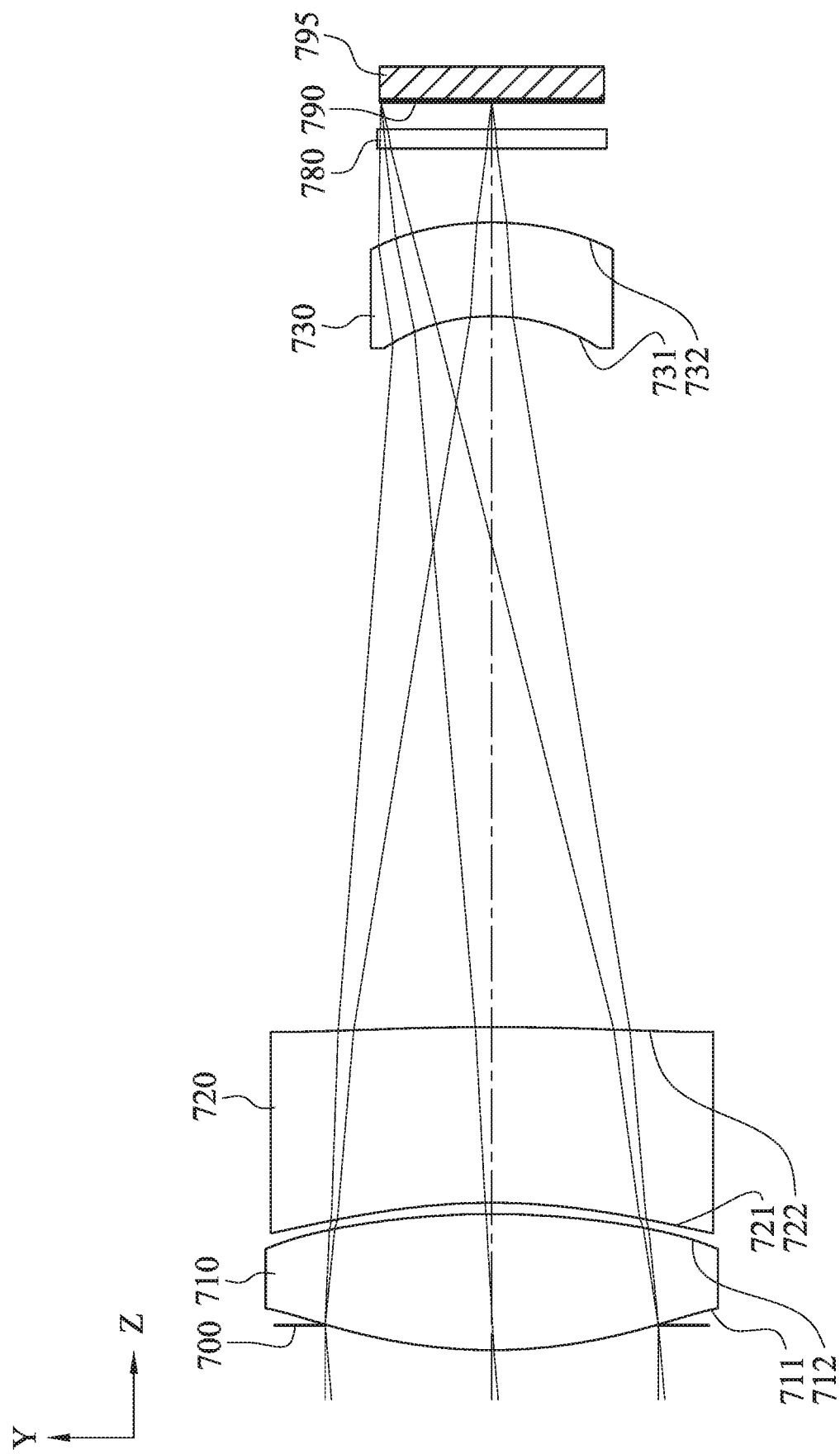
FIG. 13B is a schematic view of the imaging apparatus in a minor axis direction of the aperture stop therein according to the 7th embodiment of FIG. 13A.
Figure 14A:
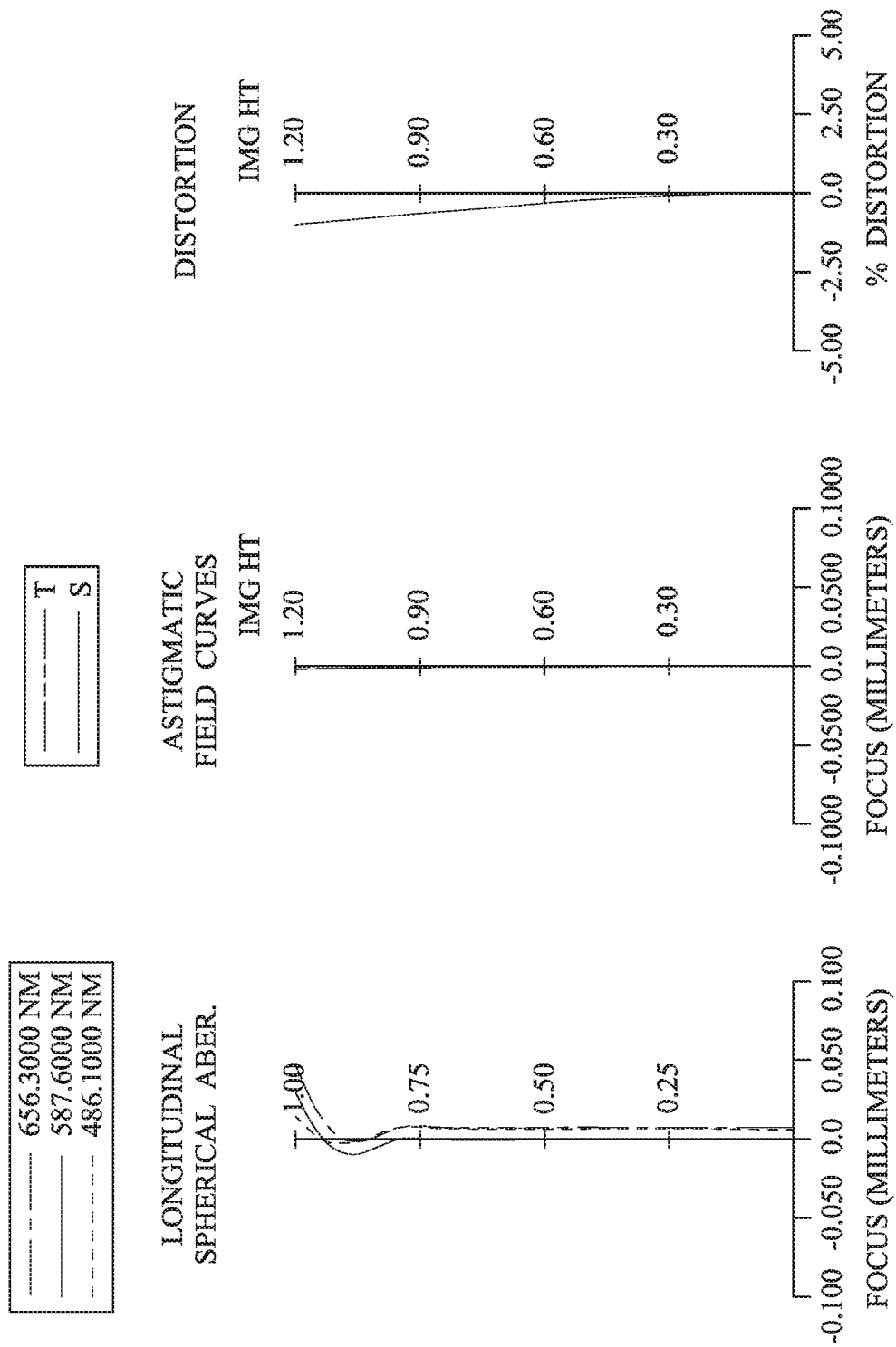
FIG. 14A shows spherical aberration curves, astigmatic field curves and a distortion curve of the imaging apparatus according to the 7th embodiment of FIG. 13A.
Figure 14B:
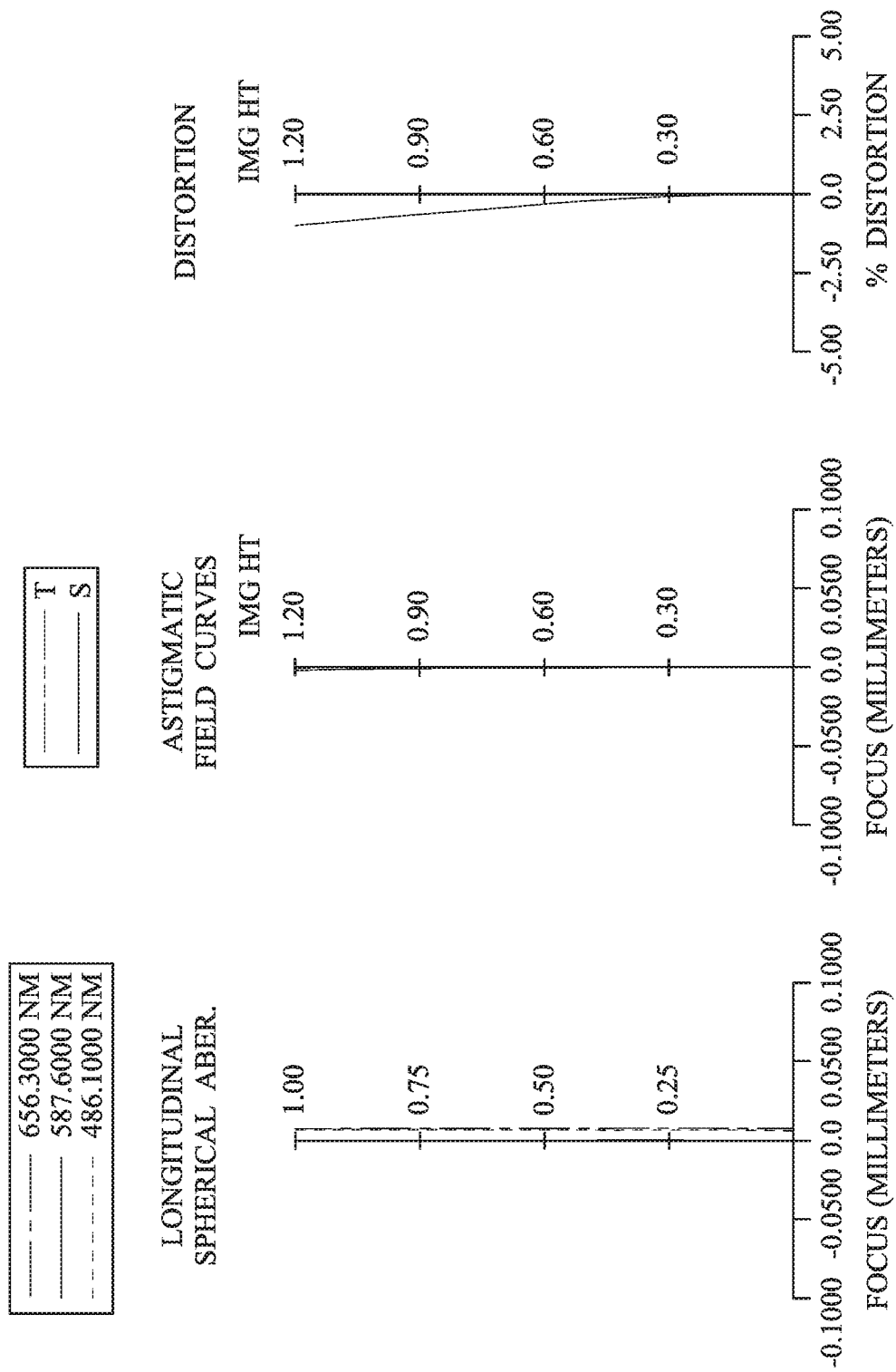
FIG. 14B shows spherical aberration curves, astigmatic field curves and a distortion curve of the imaging apparatus according to the 7th embodiment of FIG. 13B.

FIG. 13A is a schematic view of an imaging apparatus in a major axis direction of an aperture stop therein according to the 7th embodiment of the present disclosure. FIG. 13B is a schematic view of the imaging apparatus in a minor axis direction of the aperture stop therein according to the 7th embodiment of FIG. 13A. FIG. 14A shows spherical aberration curves, astigmatic field curves and a distortion curve of the imaging apparatus according to the 7th embodiment of FIG. 13A. FIG. 14B shows spherical aberration curves, astigmatic field curves and a distortion curve of the imaging apparatus according to the 7th embodiment of FIG. 13B.

In FIG. 13A and FIG. 13B, the imaging apparatus includes an imaging optical lens assembly (its reference numeral is omitted) and an image sensor 795. The imaging optical lens assembly includes, in order from an object side to an image side, an aperture stop 700, a first lens element 710, a second lens element 720, a third lens element 730, an IR-cut filter 780 and an image surface 790, wherein the image sensor is disposed on the image surface 790 of the imaging optical lens assembly. The imaging optical lens assembly includes three lens elements (710, 720, and 730) with no additional lens element inserted between each of the adjacent three lens elements, and there is an air gap in a paraxial region between each of adjacent lens elements.

The aperture stop 700 has a fixed elliptical shape, and the aperture stop 700 has a major axis and a minor axis, wherein the major axis is in an X-direction, the minor axis is in a Y-direction, and an optical axis of the imaging optical lens assembly is in a Z-direction.

The first lens element 710 with positive refractive power has an object-side surface 711 being convex in a paraxial region thereof and an image-side surface 712 being concave in a paraxial region thereof. The first lens element 710 is made of plastic material, and has the object-side surface 711 and the image-side surface 712 being both aspheric. Furthermore, the first lens element 710 includes at least one inflection point.

The second lens element 720 with negative refractive power has an object-side surface 721 being convex in a paraxial region thereof and an image-side surface 722 being concave in a paraxial region thereof. The second lens element 720 is made of plastic material, and has the object-side surface 721 and the image-side surface 722 being both aspheric. Furthermore, the second lens element 720 includes at least one inflection point.

The third lens element 730 with negative refractive power has an object-side surface 731 being convex in a paraxial region thereof and an image-side surface 732 being convex in a paraxial region thereof. The third lens element 730 is made of plastic material, and has the object-side surface 731 and the image-side surface 732 being both aspheric.

The IR-cut filter 780 is made of glass material, which is located between the third lens element 730 and the image surface 790 in order, and will not affect the focal length of the imaging optical lens assembly.

The detailed optical data of the 7th embodiment are shown in Table 13 and the aspheric surface data are shown in Table 14 below.

TABLE 13

7th Embodiment
f = 14.00 mm, Fno_eff = 3.35, HFOV = 4.9 deg.
EPDX = 4.852 mm, EPDY = 3.600 mm

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.267 | | | | |
| 2 | Lens 1 | 2.201 | ASP | 1.471 | Plastic | 1.545 | 56.0 | 6.61 |
| 3 | | 5.534 | ASP | 0.122 | | | | |
| 4 | Lens 2 | 2.312 | ASP | 1.900 | Plastic | 1.634 | 23.8 | −15.38 |
| 5 | | 2.529 | ASP | 7.684 | | | | |
| 6 | Lens 3 | 15.572 | ASP | 1.013 | Plastic | 1.534 | 55.9 | −14.40 |
| 7 | | −2.308 | ASP | 0.800 | | | | |
| 16 | IR-cut filter | Plano | | 0.210 | Glass | 1.517 | 64.2 | — |
| 17 | | Plano | | 0.306 | | | | |
| 18 | Image | Plano | | — | | | | |

Reference wavelength is 587.6 nm (d-line).
Ape. Stop is elliptical-shaped.
EPDX is a major axis (in X-direction) & EPDY is a minor axis (in Y-direction).

TABLE 14

Aspheric Coefficients

| Surface # | 2 | 3 | 4 | 5 | 6 | 7 |
|---|---|---|---|---|---|---|
| k= | 0.0000E−00 | 0.0000E−00 | 0.0000E−00 | 0.0000E−00 | 0.0000E+00 | 0.0000E−00 |
| A4= | −9.5250E−04 | 7.1966E−04 | 3.5619E−03 | 2.0634E−03 | −1.1056E−02 | −2.0399E−02 |
| A6= | −1.0155E−04 | −1.1393E−05 | 5.4249E−05 | 1.8871E−06 | 2.5112E−03 | 3.7857E−03 |
| A8= | −2.3483E−05 | −3.6260E−05 | −3.8445E−05 | −2.8800E−05 | −9.7376E−04 | −1.0075E−03 |
| A10= | 2.7683E−06 | −5.8990E−06 | −7.0019E−07 | 7.1881E−06 | 5.2790E−04 | 2.6397E−04 |
| A12= | −8.0080E−07 | 6.2899E−07 | 6.0883E−07 | −6.4045E−07 | −8.2400E−05 | −3.2684E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 14.00 | ESDX/ESDY | 1.35 |
| f/EPDC | 3.35 | Tan(FOV) | 0.17 |
| HFOV [deg.] | 4.9 | TL/f | 0.96 |
| FOV [deg.] | 9.8 | Nmax | 1.63 |
| ESDX | 4.852 | Vmin | 23.84 |
| ESDY | 3.600 | f/R1 | 2.47 |
| ESDC | 4.179 | CT1/(ΣCT − CT1) | 0.50 |
| EPDC | 4.179 | Ymax [mm] | 2.44 |

Furthermore, in the imaging optical lens assembly according to the 7th embodiment, a maximum optical effective diameter of the first lens element 710 is a maximum among maximum optical effective diameters of the lens elements of the imaging optical lens assembly.

8th Embodiment

Figure 15A:
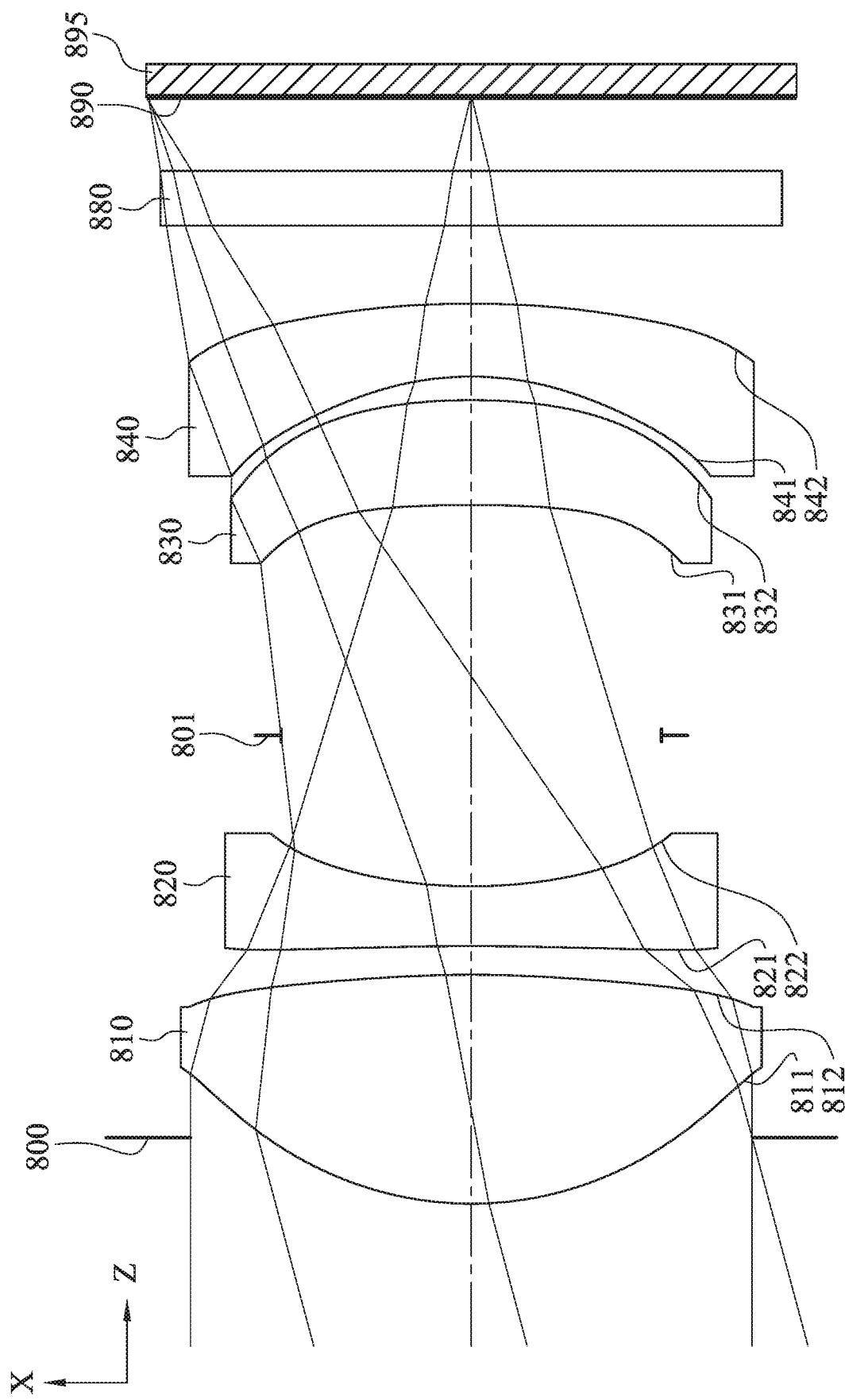
FIG. 15A is a schematic view of an imaging apparatus in a major axis direction of an aperture stop therein according to the 8th embodiment of the present disclosure.
Figure 15B:
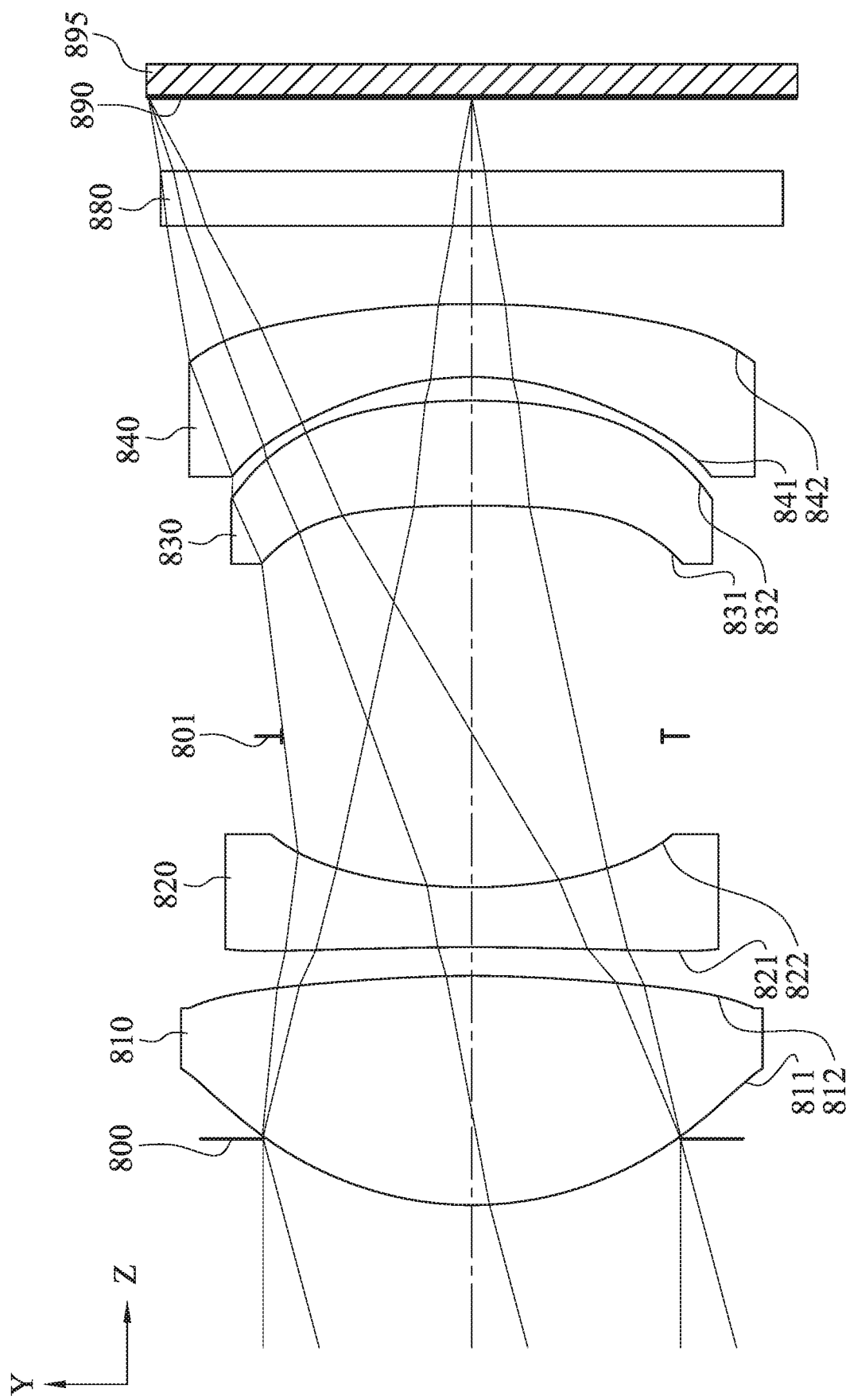
FIG. 15B is a schematic view of the imaging apparatus in a minor axis direction of the aperture stop therein according to the 8th embodiment of FIG. 15A.
Figure 16A:
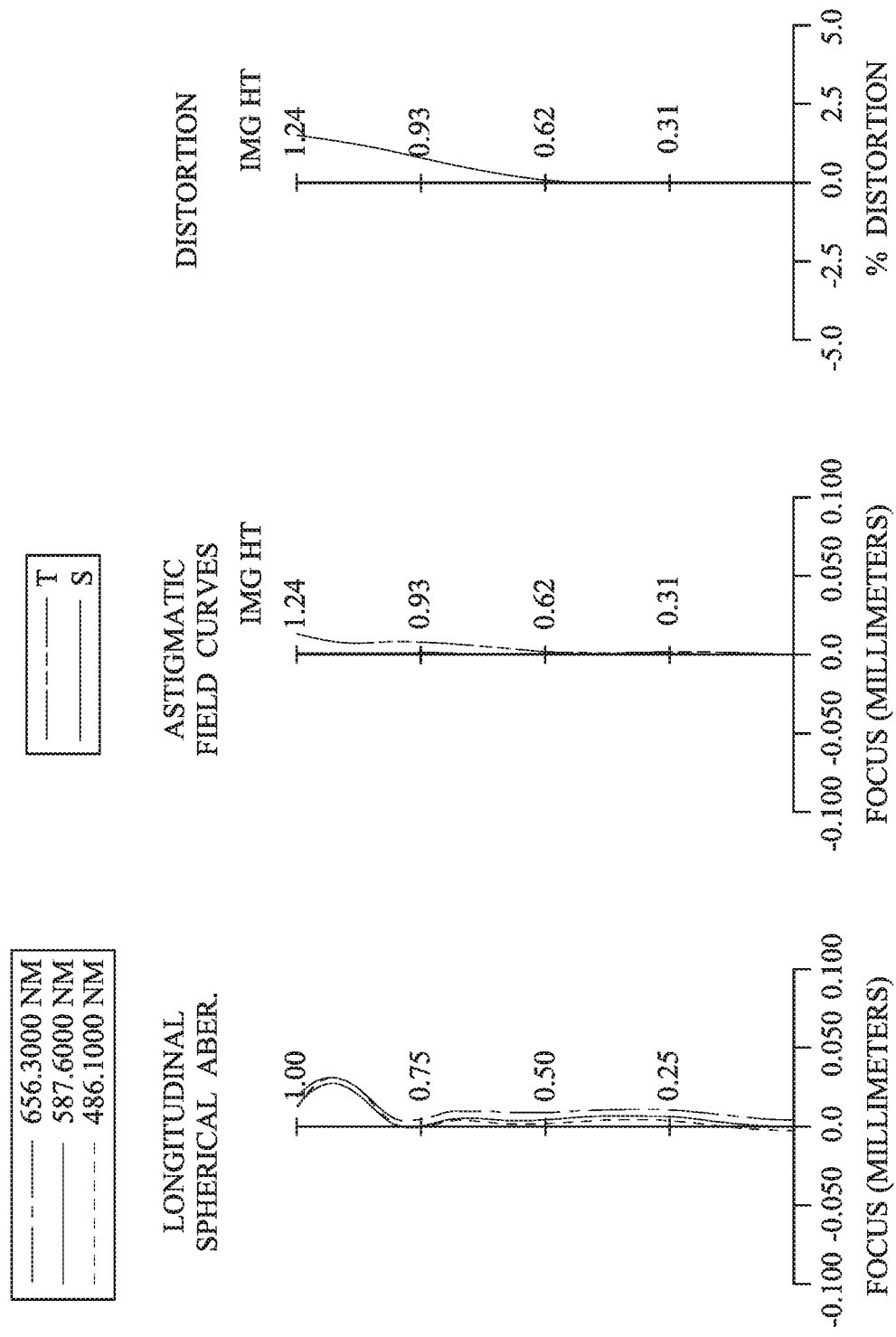
FIG. 16A shows spherical aberration curves, astigmatic field curves and a distortion curve of the imaging apparatus according to the 8th embodiment of FIG. 15A.
Figure 16B:
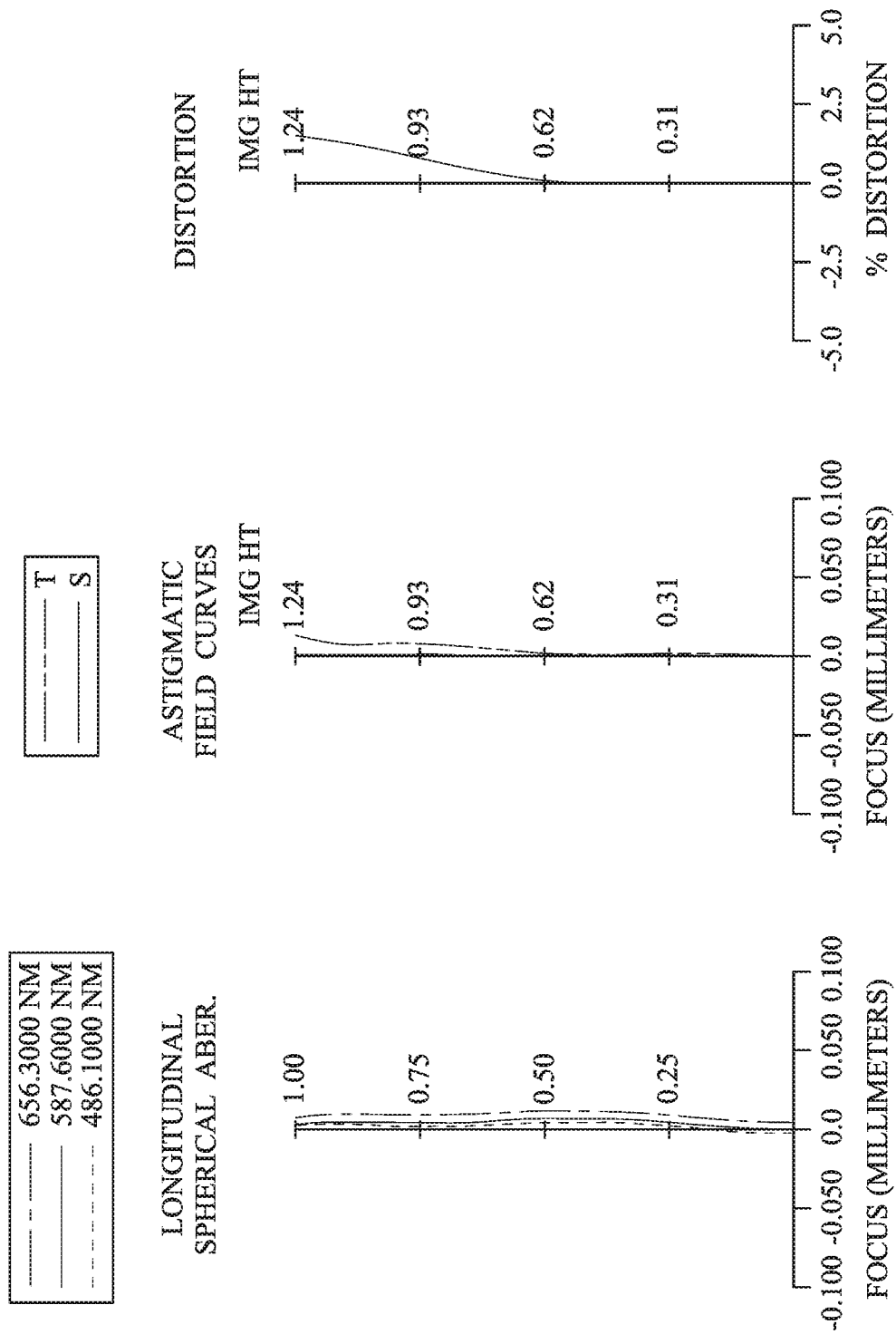
FIG. 16B shows spherical aberration curves, astigmatic field curves and a distortion curve of the imaging apparatus according to the 8th embodiment of FIG. 15B.

FIG. 15A is a schematic view of an imaging apparatus in a major axis direction of an aperture stop therein according to the 8th embodiment of the present disclosure. FIG. 15B is a schematic view of the imaging apparatus in a minor axis direction of the aperture stop therein according to the 8th embodiment of FIG. 15A. FIG. 16A shows spherical aberration curves, astigmatic field curves and a distortion curve of the imaging apparatus according to the 8th embodiment of FIG. 15A. FIG. 16B shows spherical aberration curves, astigmatic field curves and a distortion curve of the imaging apparatus according to the 8th embodiment of FIG. 15B.

In FIG. 15A and FIG. 15B, the imaging apparatus includes an imaging optical lens assembly (its reference numeral is omitted) and an image sensor 895. The imaging optical lens assembly includes, in order from an object side to an image side, an aperture stop 800, a first lens element 810, a second lens element 820, a stop 801, a third lens element 830, a fourth lens element 840, an IR-cut filter 880 and an image surface 890, wherein the image sensor is disposed on the image surface 890 of the imaging optical lens assembly. The imaging optical lens assembly includes four lens elements (810, 820, 830, and 840) with no additional lens element inserted between each of the adjacent four lens elements, and there is an air gap in a paraxial region between each of adjacent lens elements.

The aperture stop 800 has a fixed elliptical shape, and the aperture stop 800 has a major axis and a minor axis, wherein the major axis is in an X-direction, the minor axis is in a Y-direction, and an optical axis of the imaging optical lens assembly is in a Z-direction.

The first lens element 810 with positive refractive power has an object-side surface 811 being convex in a paraxial region thereof and an image-side surface 812 being convex in a paraxial region thereof. The first lens element 810 is made of plastic material, and has the object-side surface 811 and the image-side surface 812 being both aspheric. Furthermore, the first lens element 810 includes at least one inflection point.

The second lens element 820 with negative refractive power has an object-side surface 821 being concave in a paraxial region thereof and an image-side surface 822 being concave in a paraxial region thereof. The second lens element 820 is made of plastic material, and has the object-side surface 821 and the image-side surface 822 being both aspheric. Furthermore, the second lens element 820 includes at least one inflection point and at least one critical point.

The third lens element 830 with positive refractive power has an object-side surface 831 being concave in a paraxial region thereof and an image-side surface 832 being convex in a paraxial region thereof. The third lens element 830 is made of plastic material, and has the object-side surface 831 and the image-side surface 832 being both aspheric.

The fourth lens element 840 with negative refractive power has an object-side surface 841 being concave in a paraxial region thereof and an image-side surface 842 being convex in a paraxial region thereof. The fourth lens element 840 is made of plastic material, and has the object-side surface 841 and the image-side surface 842 being both aspheric.

The IR-cut filter 880 is made of glass material, which is located between the fourth lens element 840 and the image surface 890 in order, and will not affect the focal length of the imaging optical lens assembly.

The detailed optical data of the 8th embodiment are shown in Table 15 and the aspheric surface data are shown in Table 16 below.

TABLE 15

8th Embodiment
f = 4.55 mm, Fno_eff = 2.45, HFOV = 15.0 deg.
EPDX = 2.156 mm, EPDY = 1.600 mm

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.254 | | | | |
| 2 | Lens 1 | 1.321 | ASP | 0.879 | Plastic | 1.544 | 56.0 | 2.01 |
| 3 | | −4.802 | ASP | 0.110 | | | | |
| 4 | Lens 2 | −12.221 | ASP | 0.230 | Plastic | 1.639 | 23.5 | −2.67 |
| 5 | | 1.998 | ASP | 0.579 | | | | |
| 6 | Stop | Plano | | 0.885 | | | | |
| 7 | Lens 3 | −5.612 | ASP | 0.403 | Plastic | 1.669 | 19.4 | 5.75 |
| 8 | | −2.349 | ASP | 0.090 | | | | |
| 9 | Lens 4 | −1.254 | ASP | 0.280 | Plastic | 1.544 | 56.0 | −3.30 |
| 10 | | −4.501 | ASP | 0.300 | | | | |
| 11 | IR-cut filter | Plano | | 0.210 | Glass | 1.517 | 64.2 | — |

TABLE 15-continued

8th Embodiment
f = 4.55 mm, Fno_eff = 2.45, HFOV = 15.0 deg.
EPDX = 2.156 mm, EPDY = 1.600 mm

| Surface # | | Curvature Radius | Thickness | Material | Index | Abbe # | Focal Length |
|---|---|---|---|---|---|---|---|
| 12 | | Plano | 0.284 | | | | |
| 13 | Image | Plano | — | | | | |

Reference wavelength is 587.6 nm (d-line).
Ape. Stop is elliptical-shaped.
EPDX is a major axis (in X-direction) & EPDY is a minor axis (in Y-direction).
Effective region of Surface 8 is circular-shaped, which has a radius being 2.800 mm.

TABLE 16

Aspheric Coefficients

| Surface # | 2 | 3 | 4 | 5 |
|---|---|---|---|---|
| k= | −2.5699E+00 | −3.5008E+01 | 5.0000E+01 | −1.6900E+00 |
| A4= | 1.3117E−01 | 2.6422E−02 | 2.4352E−02 | 6.3980E−02 |
| A6= | −3.1214E−02 | −4.6181E−04 | 8.8743E−02 | 5.2262E−03 |
| A8= | 5.2934E−02 | −6.8374E−02 | −2.5950E−01 | 9.1701E−01 |
| A10= | −9.0815E−02 | 4.4541E−02 | 2.5870E−01 | −3.2478E+00 |
| A12= | 9.7059E−02 | −9.1953E−03 | −3.7371E−02 | 5.4642E+00 |
| A14= | −4.7230E−02 | −4.1312E−03 | −2.8482E−02 | −3.0289E+00 |

| Surface # | 7 | 8 | 9 | 10 |
|---|---|---|---|---|
| k= | 2.2773E+01 | −8.0955E−01 | 2.7577E−01 | 6.0428E+00 |
| A4= | −2.2516E−01 | −3.0582E−01 | −3.0348E−01 | −2.3540E−01 |
| A6= | 2.0426E−01 | 8.8705E−01 | 2.1746E+00 | 8.2656E−01 |
| A8= | −2.7269E+00 | −3.6367E+00 | −5.5635E+00 | −1.3438E+00 |
| A10= | 7.5210E+00 | 7.1225E+00 | 8.3036E+00 | 1.1190E+00 |
| A12= | −9.9472E+00 | −6.9299E+00 | −6.7944E+00 | −5.0428E−01 |
| A14= | 5.1074E+00 | 2.5955E+00 | 2.2318E+00 | 9.3509E−02 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.55 | ESDX/ESDY | 1.35 |
| f/EPDC | 2.45 | Tan(FOV) | 0.58 |
| HFOV [deg.] | 15.0 | TL/f | 0.93 |
| FOV [deg.] | 30.0 | Nmax | 1.67 |
| ESDX | 2.156 | Vmin | 19.44 |
| ESDY | 1.600 | f/R1 | 3.44 |
| ESDC | 1.857 | CT1/(ΣCT − CT1) | 0.96 |
| EPDC | 1.857 | Ymax [mm] | 1.11 |

Furthermore, in the imaging optical lens assembly according to the 8th embodiment, a maximum optical effective diameter of the first lens element 810 is a maximum among maximum optical effective diameters of the lens elements of the imaging optical lens assembly.

9th Embodiment

Figure 18B:
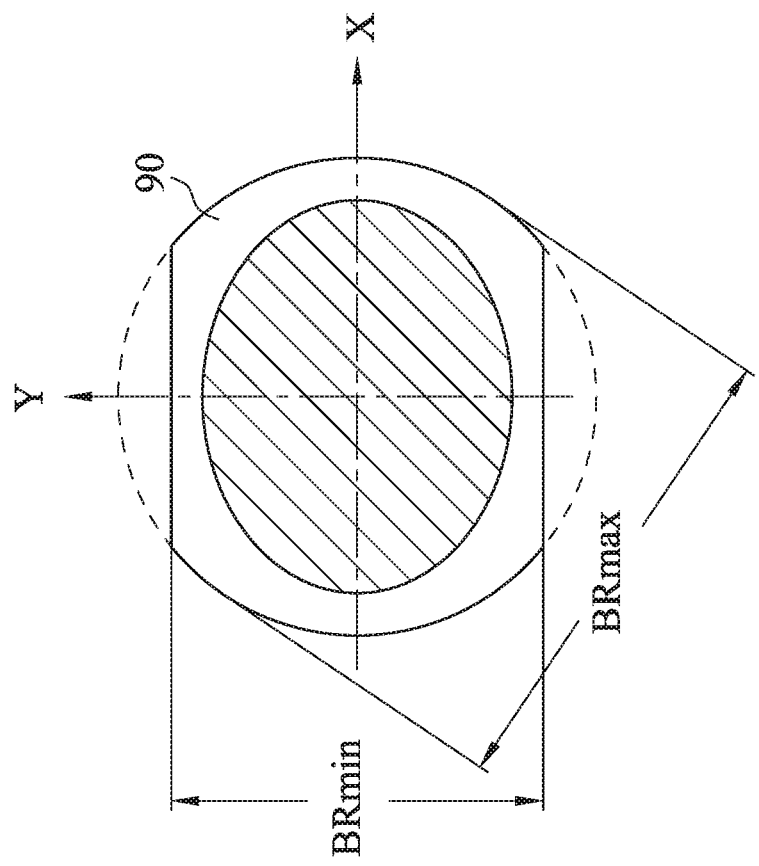
FIG. 18B is a schematic view of parameters BRmin and BRmax according to the 9th embodiment of FIG. 18A.
Figure 18A:
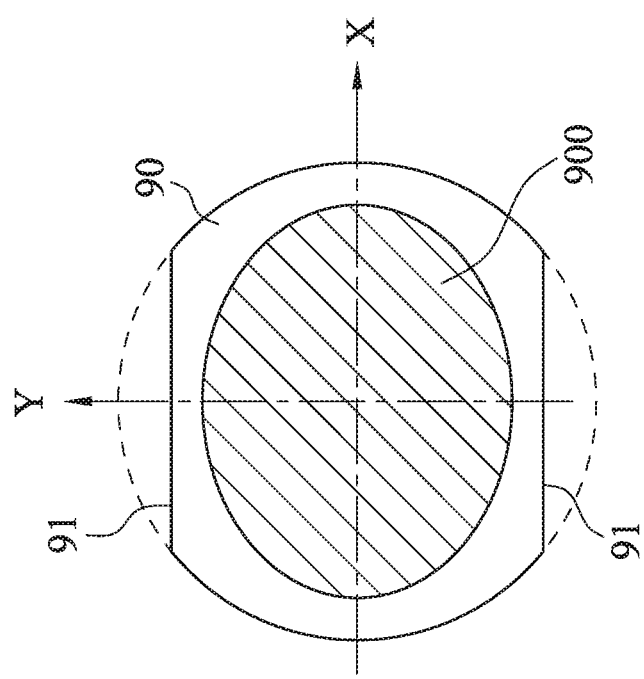
FIG. 18A is a schematic view of a lens barrel and an aperture stop of an imaging apparatus according to the 9th embodiment of the present disclosure.

FIG. 18A is a schematic view of a lens barrel 90 and an aperture stop 900 of an imaging apparatus according to the 9th embodiment of the present disclosure. In FIG. 18A, the imaging apparatus (its reference numeral is omitted) includes an imaging optical lens assembly (its reference numeral is omitted) and an image sensor (its reference numeral is omitted), wherein the imaging optical lens assembly includes the lens barrel 90, the aperture stop 900 and a plurality of lens elements (its reference numeral is omitted). The aperture stop 900 and the lens elements are disposed in the lens barrel 90, and the image sensor is disposed on an image surface of the imaging optical lens assembly. According to the 9th embodiment, the imaging optical lens assembly can be any one of the 1st to 8th embodiments, and will not be limited thereto.

An outer diameter of the lens barrel 90 includes at least two cut sides 91; in detail, according to the 9th embodiment, there are two cut sides 91 of the lens barrel 90.

In the imaging optical lens assembly, the aperture stop 900 has a fixed elliptical shape, and the aperture stop 900 has a major axis and a minor axis, wherein the major axis is in an X-direction, the minor axis is in a Y-direction. The cut sides 91 of the lens barrel 90 are corresponding to the minor axis of the aperture stop 900.

FIG. 18B is a schematic view of parameters BRmin and BRmax according to the 9th embodiment of FIG. 18A. In FIG. 18B, when a double shortest distance from a center to the outer diameter of the lens barrel 90 is BRmin, and a double longest distance from the center to the outer diameter of the lens barrel 90 is BRmax, the following conditions are satisfied: BRmax=4.20 mm; BRmin=3.25 mm; and BRmin/BRmax=0.774.

10th Embodiment

Figure 19B:
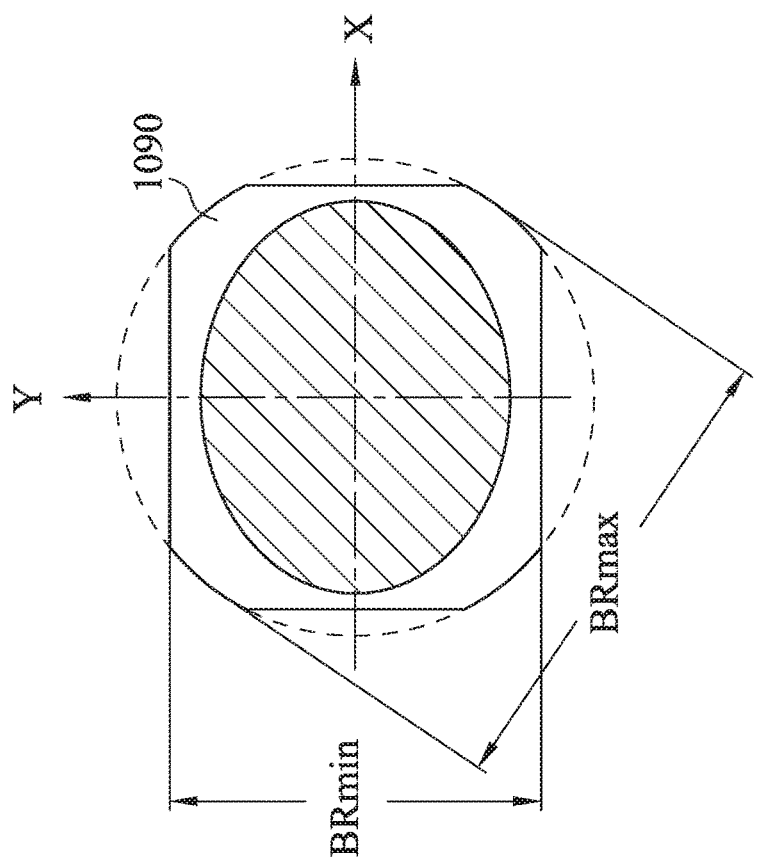
FIG. 19B is a schematic view of parameters BRmin and BRmax according to the 10th embodiment of FIG. 19A.
Figure 19A:
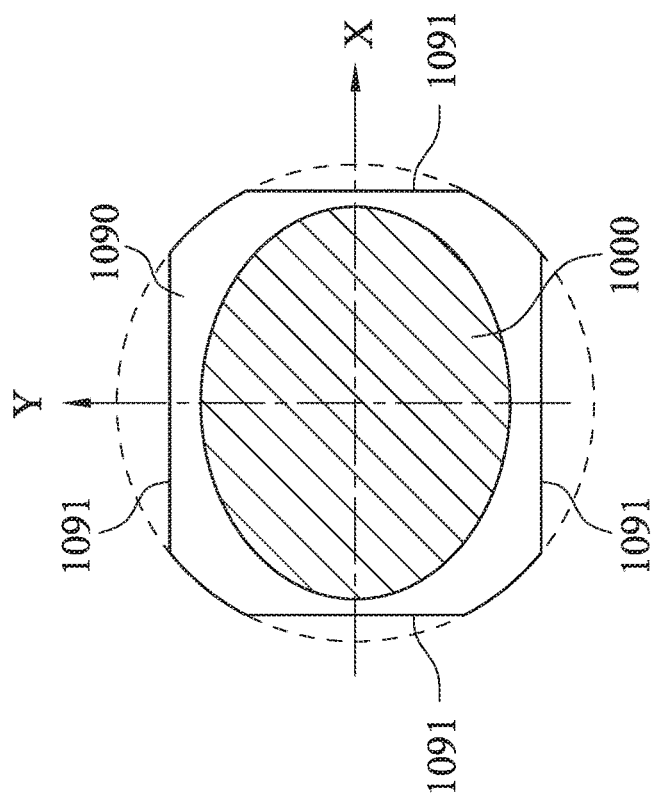
FIG. 19A is a schematic view of a lens barrel and an aperture stop of an imaging apparatus according to the 10th embodiment of the present disclosure.

FIG. 19A is a schematic view of a lens barrel 1090 and an aperture stop 1000 of an imaging apparatus according to the 10th embodiment of the present disclosure. In FIG. 19A, the imaging apparatus (its reference numeral is omitted) includes an imaging optical lens assembly (its reference numeral is omitted) and an image sensor (its reference numeral is omitted), wherein the imaging optical lens assembly includes the lens barrel 1090, the aperture stop 1000 and a plurality of lens elements (its reference numeral is omitted). The aperture stop 1000 and the lens elements are disposed in the lens barrel 1090, and the image sensor is disposed on an image surface of the imaging optical lens assembly. According to the 10th embodiment, the imaging optical lens assembly can be any one of the 1st to 8th embodiments, and will not be limited thereto.

An outer diameter of the lens barrel 1090 includes at least two cut sides 1091; in detail, according to the 10th embodiment, there are four cut sides 1091 of the lens barrel 1090.

In the imaging optical lens assembly, the aperture stop 1000 has a fixed elliptical shape, and the aperture stop 1000 has a major axis and a minor axis, wherein the major axis is in an X-direction, the minor axis is in a Y-direction.

FIG. 19B is a schematic view of parameters BRmin and BRmax according to the 10th embodiment of FIG. 19A. In FIG. 19B, when a double shortest distance from a center to the outer diameter of the lens barrel 1090 is BRmin, and a double longest distance from the center to the outer diameter of the lens barrel 1090 is BRmax, the following conditions are satisfied: BRmax=4.20 mm; BRmin=3.25 mm; and BRmin/BRmax=0.774.

11th Embodiment

Figure 20A:
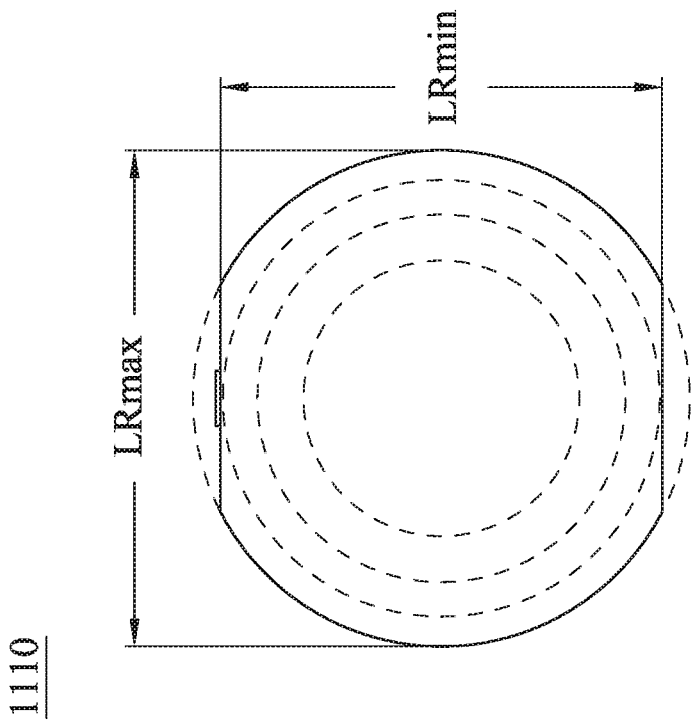
FIG. 20A is a schematic view of a lens element of an imaging apparatus according to the 11th embodiment of the present disclosure.

FIG. 20A is a schematic view of a lens element 1110 of an imaging apparatus according to the 11th embodiment of the present disclosure. In FIG. 20A, the imaging apparatus (its reference numeral is omitted) includes an imaging optical lens assembly (its reference numeral is omitted) and an image sensor (its reference numeral is omitted), wherein the imaging optical lens assembly includes a lens barrel (its reference numeral is omitted), an aperture stop (its reference numeral is omitted) and a plurality of lens elements (its reference numeral is omitted). The aperture stop and the lens elements are disposed in the lens barrel, and the image sensor is disposed on an image surface of the imaging optical lens assembly. According to the 11th embodiment, the imaging optical lens assembly can be any one of the 1st to 8th embodiments, and will not be limited thereto.

In the imaging optical lens assembly according to the 11th embodiment, an outer diameter of at least one of the lens elements 1110 includes at least two cut sides 1111; in detail, according to the 11th embodiment, there are two cut sides 1111 of the lens element 1110. In FIG. 20A, the lens element 1110 has a maximum optical effective diameter 1111a, an effective diameter of a parallel projecting image of the lens element 1110 is 1111b, and an effective diameter of a perpendicular projecting image of the lens element 1110 is 1111c.

Figure 20B:
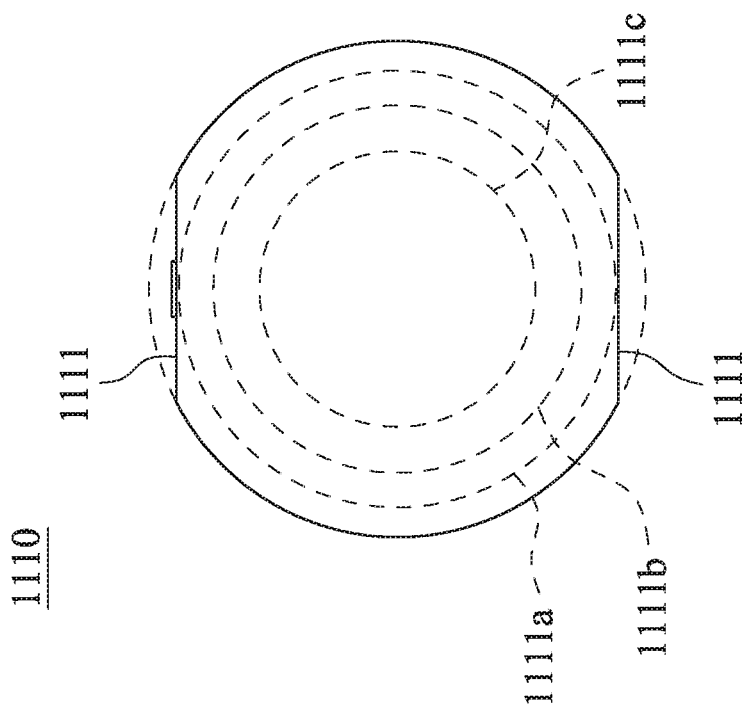
FIG. 20B is a schematic view of parameters LRmin and LRmax according to the 11th embodiment of FIG. 20A.

FIG. 20B is a schematic view of parameters LRmin and LRmax according to the 11th embodiment of FIG. 20A. In FIG. 20B, when a double shortest distance from a center to the outer diameter of the lens element 1110 is LRmin, and a double longest distance from the center to the outer diameter of the lens element 1110 is LRmax, the following conditions are satisfied: LRmax=3.50 mm; LRmin=3.10 mm; and LRmin/LRmax=0.886.

12th Embodiment

Figure 21B:
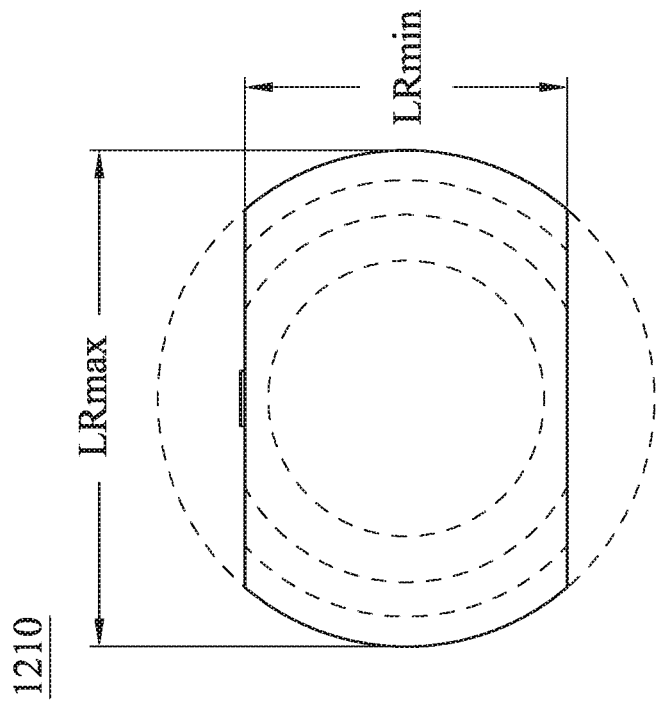
FIG. 21B is a schematic view of parameters LRmin and LRmax according to the 12th embodiment of FIG. 21A.
Figure 21A:
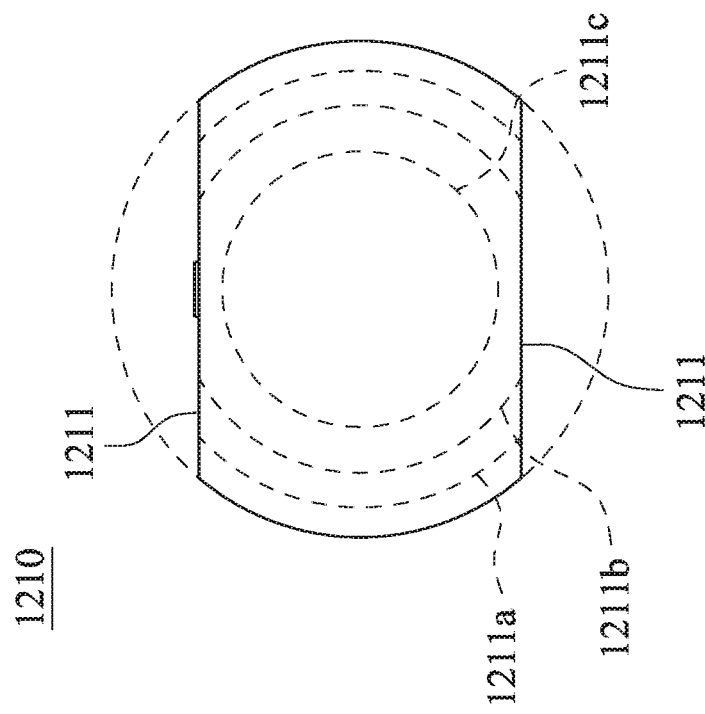
FIG. 21A is a schematic view of a lens element of an imaging apparatus according to the 12th embodiment of the present disclosure.

FIG. 21A is a schematic view of a lens element 1210 of an imaging apparatus according to the 12th embodiment of the present disclosure. In FIG. 21A, the imaging apparatus (its reference numeral is omitted) includes an imaging optical lens assembly (its reference numeral is omitted) and an image sensor (its reference numeral is omitted), wherein the imaging optical lens assembly includes a lens barrel (its reference numeral is omitted), an aperture stop (its reference numeral is omitted) and a plurality of lens elements (its reference numeral is omitted). The aperture stop and the lens elements are disposed in the lens barrel, and the image sensor is disposed on an image surface of the imaging optical lens assembly. According to the 12th embodiment, the imaging optical lens assembly can be any one of the 1st to 8th embodiments, and will not be limited thereto.

In the imaging optical lens assembly according to the 12th embodiment, an outer diameter of at least one of the lens elements 1210 includes at least two cut sides 1211; in detail, according to the 12th embodiment, there are two cut sides 1211 of the lens element 1210. In FIG. 21A, the lens element 1210 has a maximum optical effective diameter 1211a, an effective diameter of a parallel projecting image of the lens element 1210 is 1211b, and an effective diameter of a perpendicular projecting image of the lens element 1210 is 1211c.

FIG. 21B is a schematic view of parameters LRmin and LRmax according to the 12th embodiment of FIG. 21A. In FIG. 21B, when a double shortest distance from a center to the outer diameter of the lens element 1210 is LRmin, and a double longest distance from the center to the outer diameter of the lens element 1210 is LRmax, the following conditions are satisfied: LRmax=3.50 mm; LRmin=2.60 mm; and LRmin/LRmax=0.743.

13th Embodiment

Figure 22B:
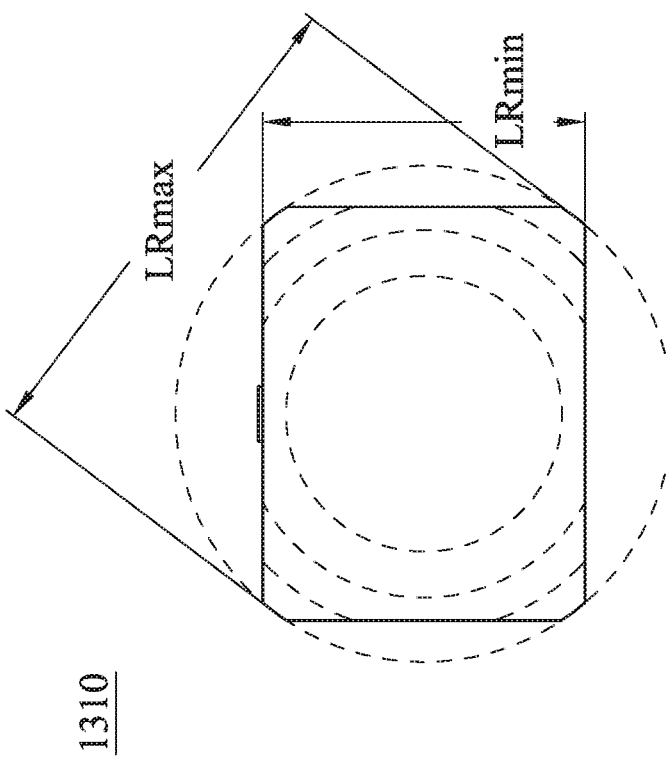
FIG. 22B is a schematic view of parameters LRmin and LRmax according to the 13th embodiment of FIG. 22A.
Figure 22A:
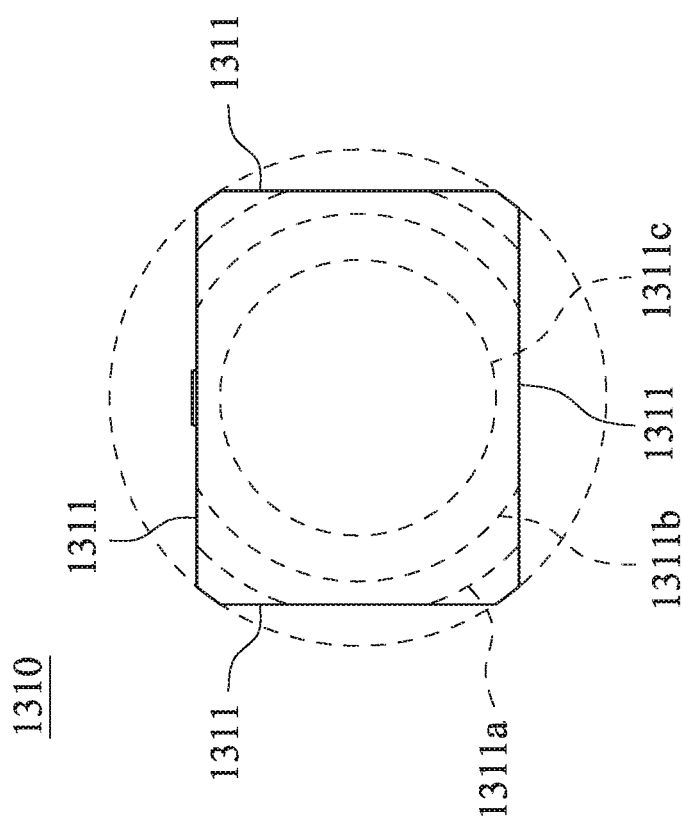
FIG. 22A is a schematic view of a lens element of an imaging apparatus according to the 13th embodiment of the present disclosure.

FIG. 22A is a schematic view of a lens element 1310 of an imaging apparatus according to the 13th embodiment of the present disclosure. In FIG. 22A, the imaging apparatus (its reference numeral is omitted) includes an imaging optical lens assembly (its reference numeral is omitted) and an image sensor (its reference numeral is omitted), wherein the imaging optical lens assembly includes a lens barrel (its reference numeral is omitted), an aperture stop (its reference numeral is omitted) and a plurality of lens elements (its reference numeral is omitted). The aperture stop and the lens elements are disposed in the lens barrel, and the image sensor is disposed on an image surface of the imaging optical lens assembly. According to the 13th embodiment, the imaging optical lens assembly can be any one of the 1st to 8th embodiments, and will not be limited thereto.

In the imaging optical lens assembly according to the 13th embodiment, an outer diameter of at least one of the lens elements 1310 includes at least two cut sides 1311; in detail, according to the 13th embodiment, there are four cut sides 1311 of the lens element 1310. In FIG. 22A, the lens element 1310 has a maximum optical effective diameter 1311a, an effective diameter of a parallel projecting image of the lens element 1310 is 1311b, and an effective diameter of a perpendicular projecting image of the lens element 1310 is 1311c.

FIG. 22B is a schematic view of parameters LRmin and LRmax according to the 13th embodiment of FIG. 22A. In FIG. 22B, when a double shortest distance from a center to the outer diameter of the lens element 1310 is LRmin, and a double longest distance from the center to the outer diameter of the lens element 1310 is LRmax, the following conditions are satisfied: LRmax=3.50 mm; LRmin=2.60 mm; and LRmin/LRmax=0.743.

14th Embodiment

Figure 23A:
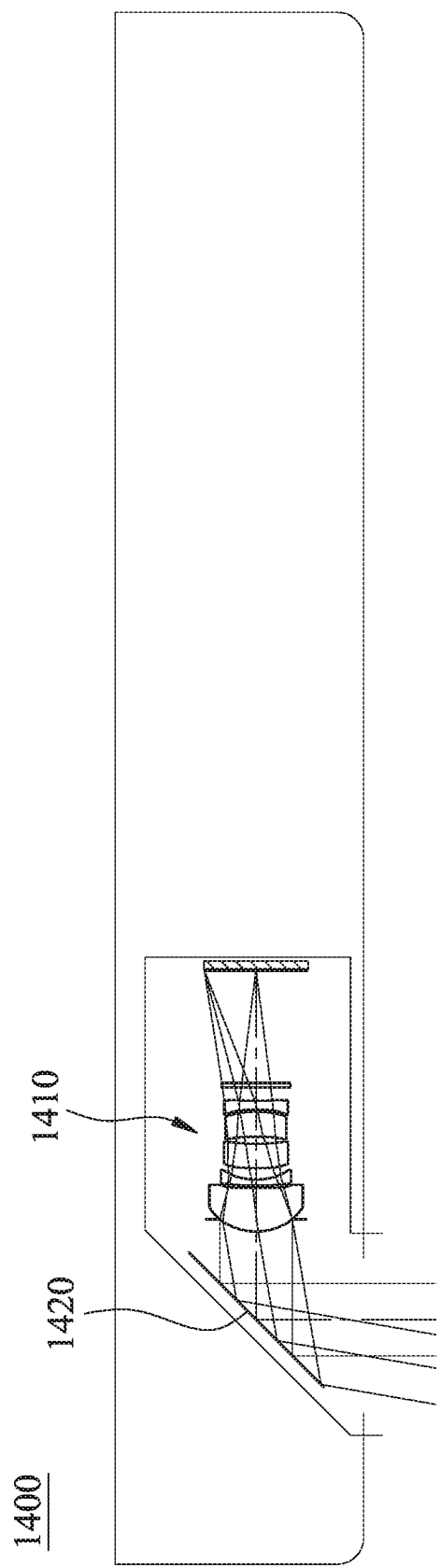
FIG. 23A is a schematic view of an electronic device according to the 14th embodiment of the present disclosure.
Figure 23B:
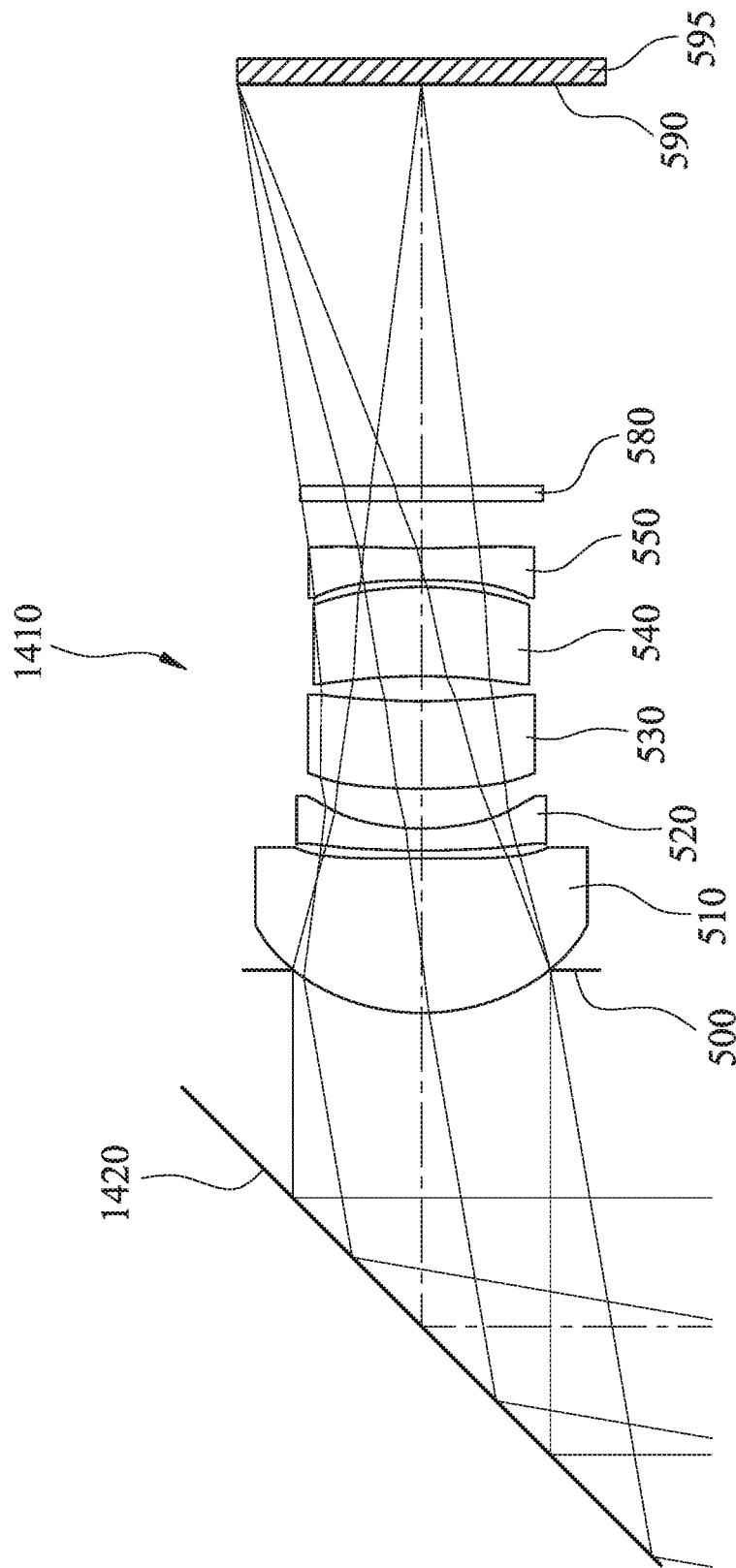
FIG. 23B is a schematic view of an imaging apparatus of the electronic device according to the 14th embodiment of FIG. 23A.

FIG. 23A is a schematic view of an electronic device 1400 according to the 14th embodiment of the present disclosure. FIG. 23B is a schematic view of an imaging apparatus 1410 of the electronic device 1400 according to the 14th embodiment of FIG. 23A. In FIG. 23A, the electronic device 1400 includes the imaging apparatus 1410, wherein an imaging optical lens assembly and an image sensor 595 in the imaging apparatus 1410 are the same with the imaging optical lens assembly and the image sensor 595 in the imaging apparatus according to the 5th embodiment, but will not be limited thereto.

According to the 14th embodiment, the imaging optical lens assembly of the imaging apparatus 1410 can further include at least one reflective element 1420, which can be a prism, a mirror, etc. for shifting the light path by reflection. In detail, there is one reflective element 1420 in the imaging apparatus 1410, which is a mirror, and the reflective element 1420 is located on an object side of the first lens element 510.

Figure 23C:
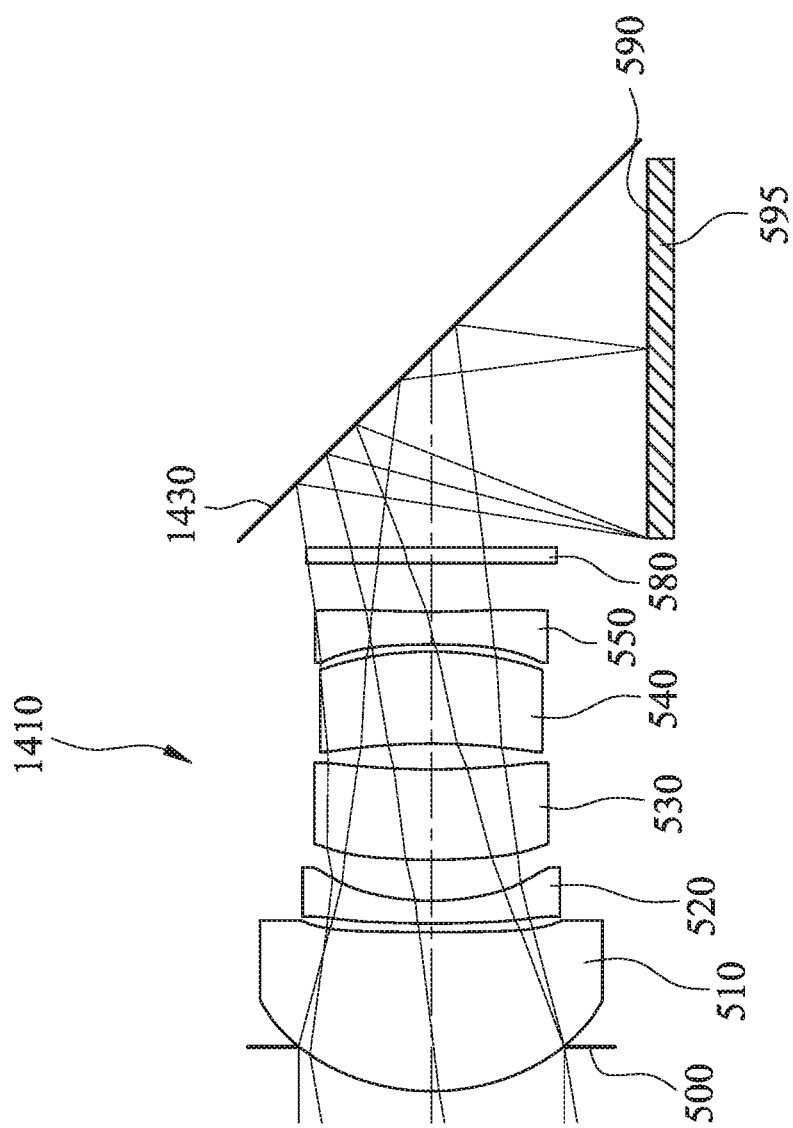
FIG. 23C is a schematic view of the imaging apparatus with another reflective element of FIG. 23A.
Figure 23D:
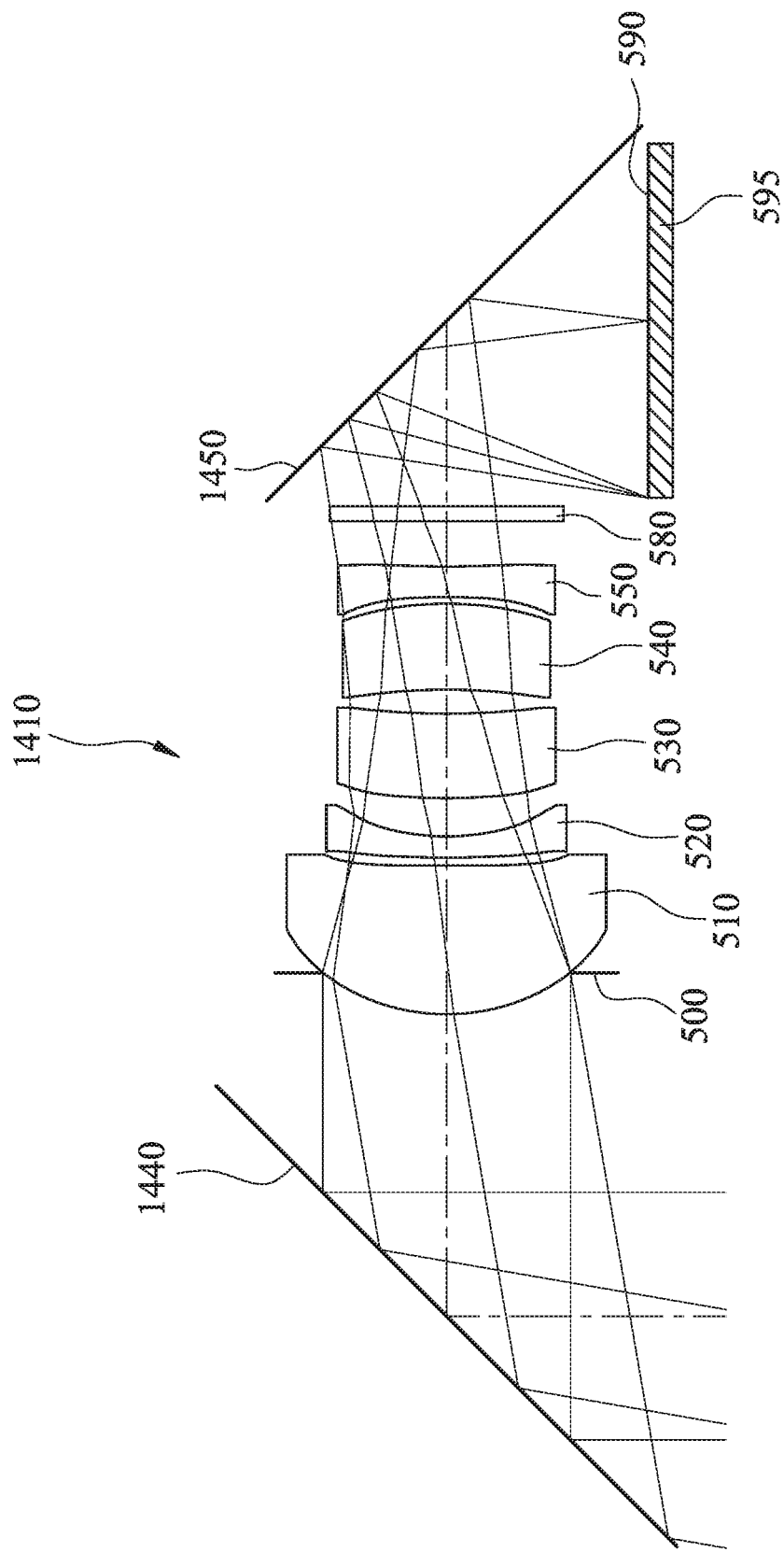
FIG. 23D is a schematic view of the imaging apparatus with yet another reflective element of FIG. 23A.

Furthermore, FIG. 23C is a schematic view of the imaging apparatus 1410 with another reflective element of FIG. 23A, and FIG. 23D is a schematic view of the imaging apparatus 1410 with yet another reflective element of FIG. 23A. In FIG. 23C, the reflective element 1430 of the imaging apparatus 1410 can be located between the IR-cut filter 580 and the image surface 590. In FIG. 23D, the imaging apparatus 1410 can include two reflective elements 1440, 1450, wherein the reflective element 1440 is located on the object side of the first lens element in the imaging optical lens assembly, and the reflective element 1450 is located between the IR-cut filter 580 and the image surface 590.

15th Embodiment

Figure 24:
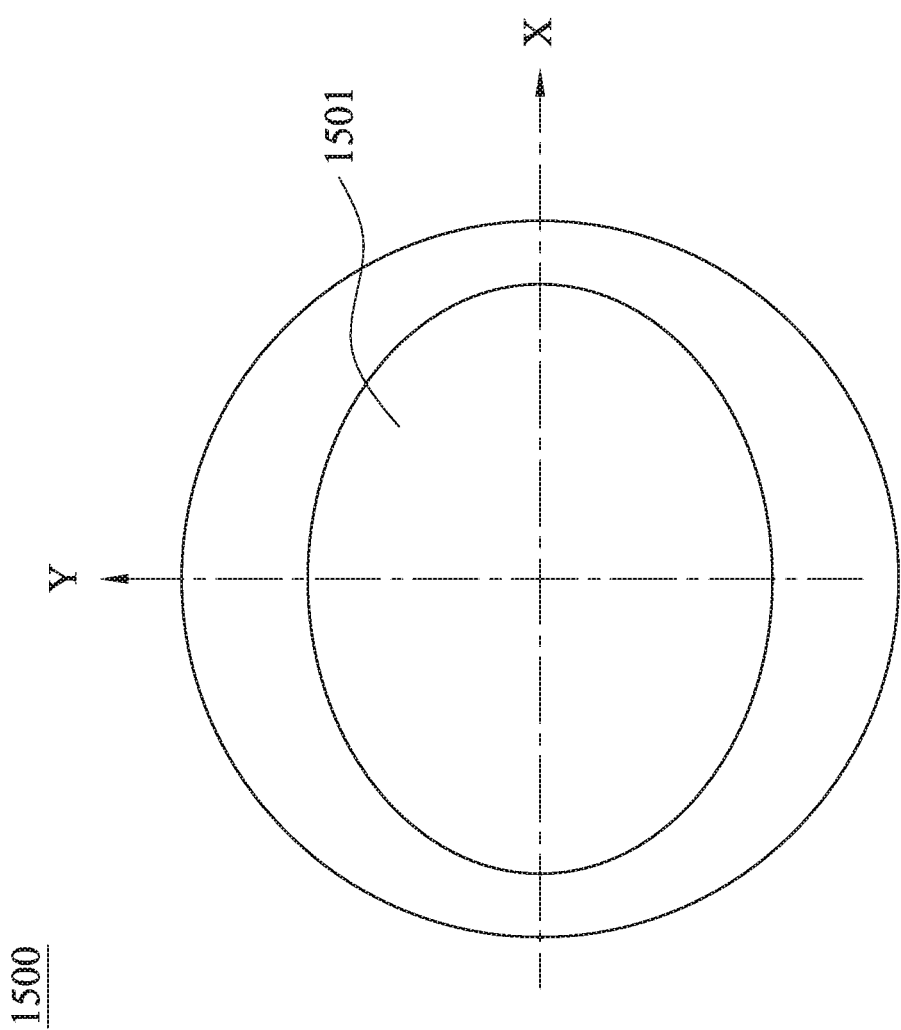
FIG. 24 is a schematic view of a light blocking element of an imaging apparatus according to the 15th embodiment of the present disclosure.

FIG. 24 is a schematic view of a light blocking element 1500 of an imaging apparatus according to the 15th embodiment of the present disclosure. In FIG. 24, the imaging apparatus (its reference numeral is omitted) includes an imaging optical lens assembly (its reference numeral is omitted) and an image sensor (its reference numeral is omitted), wherein the imaging optical lens assembly includes a lens barrel (its reference numeral is omitted), an aperture stop (its reference numeral is omitted), a plurality of lens elements (its reference numeral is omitted) and a light blocking element 1500. The aperture stop, the lens elements and the light blocking element 1500 are disposed in the lens barrel, and the image sensor is disposed on an image surface of the imaging optical lens assembly. According to the 15th embodiment, the imaging optical lens assembly can be any one of the 1st to 8th embodiments, and will not be limited thereto.

In FIG. 24, an opening of the light blocking element 1500 is a non-circular opening; in detail, the opening of the light blocking element 1500 is an elliptical shape, and can be disposed in the imaging apparatus corresponding to the aperture stop being an elliptical shape.

16th Embodiment

Figure 25A:
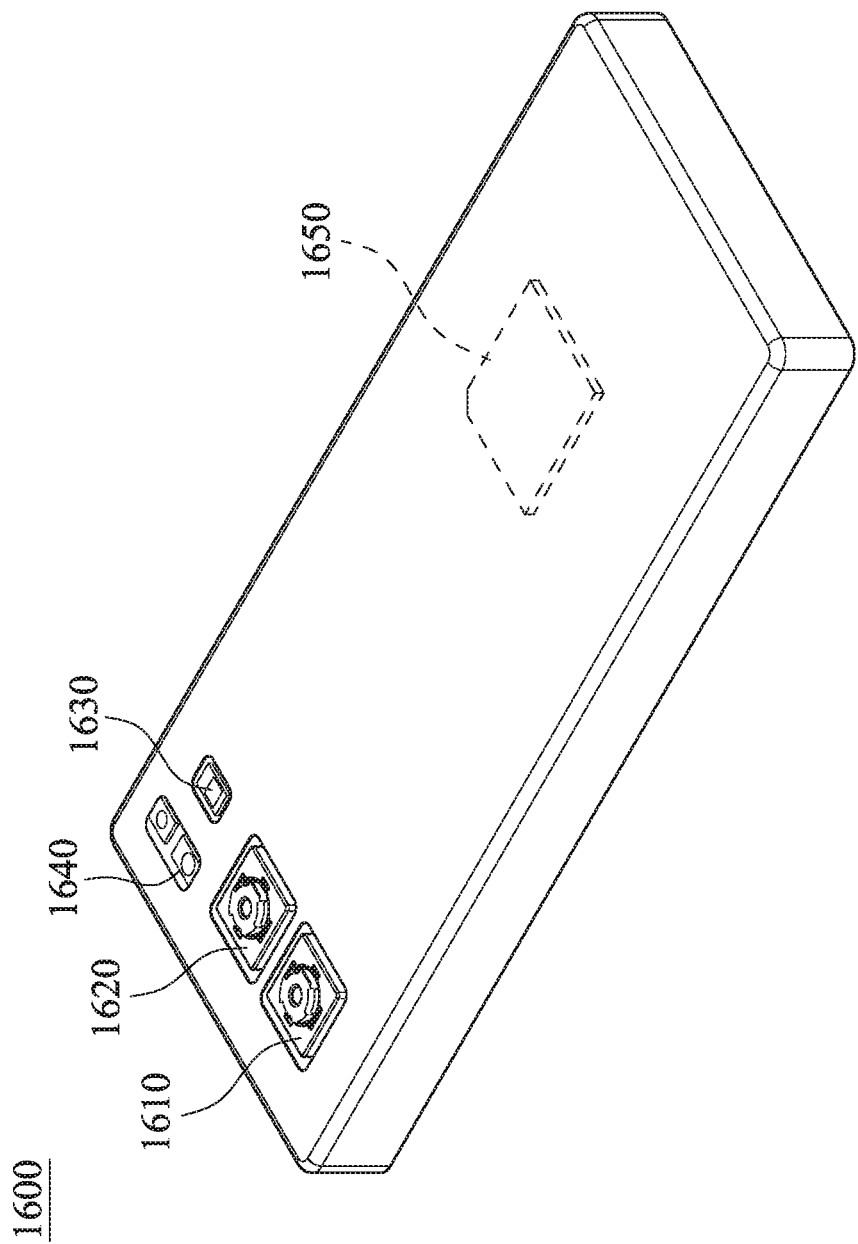
FIG. 25A is a schematic view of one side of an electronic device according to the 16th embodiment of the present disclosure.
Figure 25B:
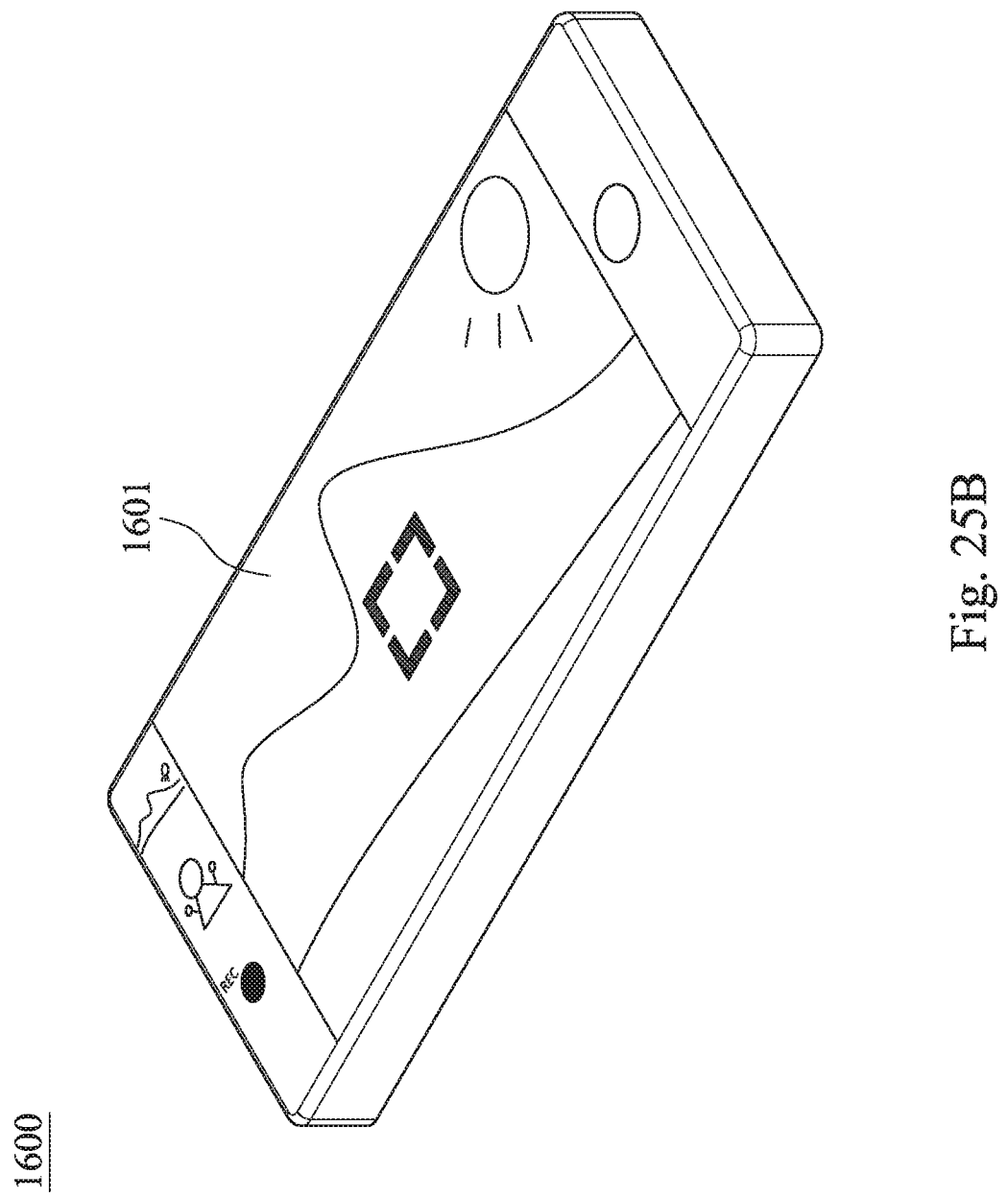
FIG. 25B is a schematic view of another side of the electronic device according to the 16th embodiment of FIG. 25A.

FIG. 25A is a schematic view of one side of an electronic device 1600 according to the 16th embodiment of the present disclosure. FIG. 25B is a schematic view of another side of the electronic device 1600 according to the 16th embodiment of FIG. 25A. In FIGS. 25A and 25B, the electronic device 1600 according to the 16th embodiment is a smartphone, wherein the electronic device 1600 includes two imaging apparatuses 1610, 1620, a flash module 1630, a focusing assisting module 1640, an image signal processor (ISP) 1650, a user interface 1601 and an image software processor (its reference numeral is omitted), wherein the imaging apparatuses 1610, 1620 face towards the same direction. When the user captures images of an imaged object (its reference numeral is omitted) via the user interface 1601, the electronic device 1600 focuses and generates an image via at least one of the imaging apparatuses 1610, 1620 while compensating for low illumination via the flash module 1630 when necessary. Then, the electronic device 1600 quickly focuses on the imaged object according to its object distance information provided by the focusing assisting module 1640, and optimizes the image via the image signal processor 1650 and the image software processor. Thus, the image quality can be further enhanced. The focusing assisting module 1640 can adopt conventional infrared or laser for obtaining quick focusing, and the user interface 1601 can utilize a touch screen or a physical button for capturing and processing the image with various functions of the image processing software.

The imaging apparatuses 1610, 1620 according to the 16th embodiment can be the same with the imaging apparatus according to any one of the 1st to 12th embodiments, and will not describe again herein.

17th Embodiment

Figure 26:
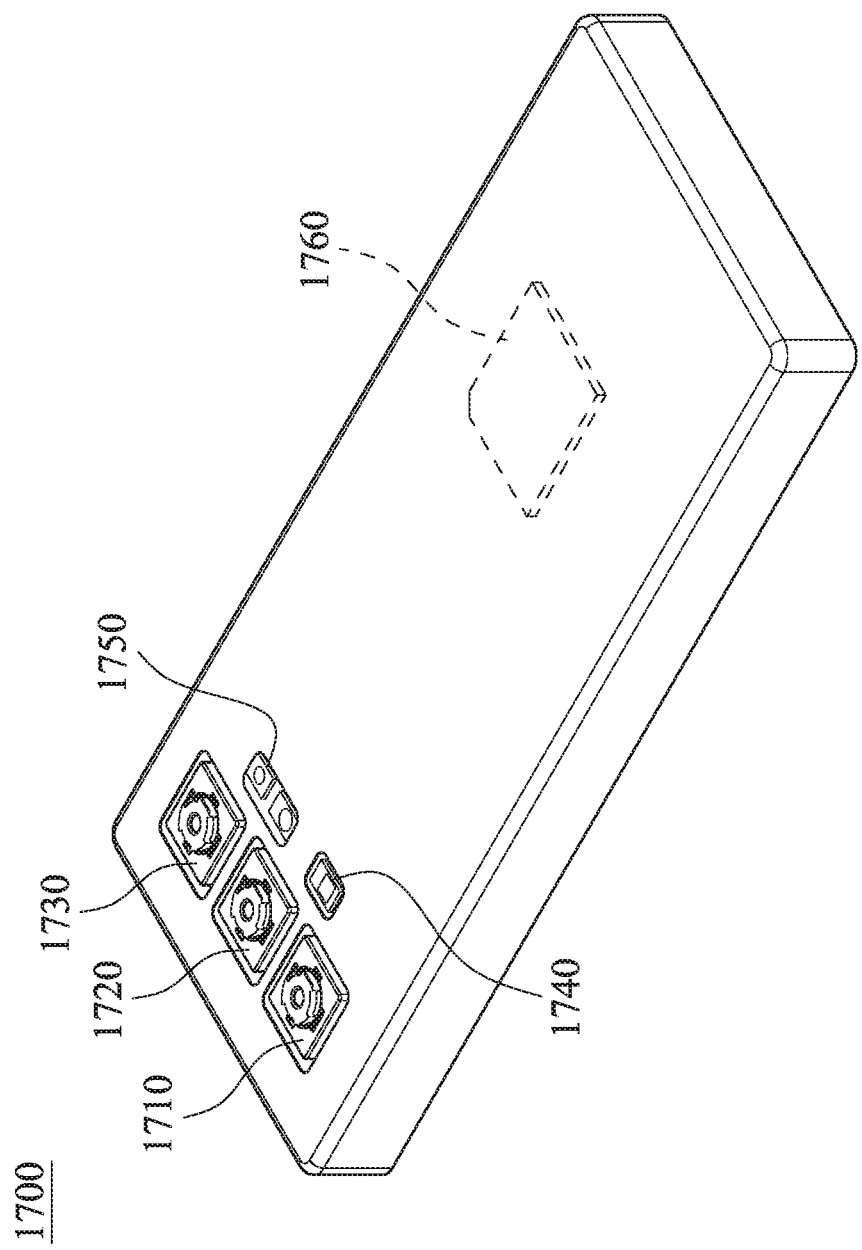
FIG. 26 is a schematic view of an electronic device according to the 17th embodiment of the present disclosure.

FIG. 26 is a schematic view of an electronic device 1700 according to the 17th embodiment of the present disclosure. In FIG. 26, the electronic device 1700 according to the 17th embodiment is a smartphone, wherein the electronic device 1700 includes three imaging apparatuses 1710, 1720, 1730, a flash module 1740, a focusing assisting module 1750, an image signal processor (ISP) 1760, a user interface (its reference numeral is omitted) and an image software processor (its reference numeral is omitted), wherein the imaging apparatuses 1710, 1720, 1730, face towards the same direction, which face towards an object side of the electronic device.

The imaging apparatuses 1710, 1720, 1730 according to the 17th embodiment can be the same with the imaging apparatus according to any one of the 1st to 15th embodiments, and will not describe again herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly, comprising:
   an aperture stop having a fixed elliptical shape, with a major axis and a minor axis;
   a plurality of lens elements, wherein a number of the lens elements is at least three and at most seven; and
   a lens barrel, wherein an outer diameter of the lens barrel comprises at least two cut sides;
   wherein a major axis diameter of the aperture stop is ESDX, a minor axis diameter of the aperture stop is ESDY, a focal length of the imaging optical lens assembly is f, one of the lens elements closest to an object side is a first lens element, an axial distance between an object-side surface of the first lens element and an image surface is TL, and the following conditions are satisfied:
   $1.08 < ESDX/ESDY$; and
   $TL/f < 1.20$.

2. The imaging optical lens assembly of claim 1, wherein a maximum among refractive indices of the lens elements of the imaging optical lens assembly is Nmax, a minimum among Abbe numbers of the lens elements of the imaging optical lens assembly is Vmin, and the following conditions are satisfied:
   $Nmax < 1.70$; and
   $Vmin < 22$.

3. The imaging optical lens assembly of claim 1, wherein the major axis diameter of the aperture stop is ESDX, the minor axis diameter of the aperture stop is ESDY, and the following condition is satisfied:
   $1.10 < ESDX/ESDY < 1.50$.

4. The imaging optical lens assembly of claim 1, wherein the focal length of the imaging optical lens assembly is f, the axial distance between the object-side surface of the first lens element and the image surface is TL, and the following condition is satisfied:
   $0.50 < TL/f < 1.0$.

5. The imaging optical lens assembly of claim 1, wherein there are five or more lens elements and at least three of the lens elements are made of plastic material.

6. The imaging optical lens assembly of claim 1, wherein the first lens element has positive refractive power, and a maximum optical effective diameter of the first lens element is a maximum among maximum optical effective diameters of the lens elements of the imaging optical lens assembly.

7. The imaging optical lens assembly of claim 1, wherein the minimum among Abbe numbers of the lens elements of the imaging optical lens assembly is Vmin, and the following condition is satisfied:
   $Vmin < 20$.

8. The imaging optical lens assembly of claim 1, wherein a central thickness of the first lens element is a maximum among central thicknesses of the lens elements of the imaging optical lens assembly.

9. The imaging optical lens assembly of claim 1, wherein a central thickness of the first lens element is CT1, a sum of central thicknesses of the lens elements of the imaging optical lens assembly is $\Sigma CT$, and the following condition is satisfied:
   $0.55 < CT1/(\Sigma CT - CT1)$.

10. The imaging optical lens assembly of claim 9, wherein the central thickness of the first lens element is CT1, the sum of central thicknesses of the lens elements of the imaging optical lens assembly is $\Sigma CT$, and the following condition is satisfied:
    $0.65 < CT1/(\Sigma CT - CT1)$.

11. The imaging optical lens assembly of claim 1, wherein the aperture stop is located on an object side of the first lens element.

12. The imaging optical lens assembly of claim 1, wherein a curvature radius of the object-side surface of the first lens element is R1, the focal length of the imaging optical lens assembly is f, and the following condition is satisfied:
    $3.50 < f/R1$.

13. The imaging optical lens assembly of claim 1, wherein each of at least half of the lens elements has at least one surface being aspheric, and at least one of the lens elements comprises at least one inflection point.

14. The imaging optical lens assembly of claim 1, wherein a maximum among optical effective radii of the lens elements is Ymax, and the following condition is satisfied:
    $Ymax < 3.0$ mm.

15. The imaging optical lens assembly of claim 1, wherein the focal length of the imaging optical lens assembly is f, a maximum field of view of the imaging optical lens assembly is FOV, and the following conditions are satisfied:
    $8$ mm $< f < 18$ mm; and
    $\tan(FOV) < 0.80$.

16. The imaging optical lens assembly of claim 1, wherein the focal length of the imaging optical lens assembly is f, a diameter of a circle with an area of the same size as an elliptical entrance pupil of the imaging optical lens assembly is EPDC, and the following condition is satisfied:
    $f/EPDC < 3.5$.

17. The imaging optical lens assembly of claim 1, wherein an outer diameter of at least one of the lens elements comprises at least two cut sides.

18. The imaging optical lens assembly of claim 17, wherein a double shortest distance from a center to the outer diameter of the at least one of the lens elements is LRmin, a double longest distance from the center to the outer diameter of the at least one of the lens elements is LRmax, and the following condition is satisfied:
    $LRmin/LRmax < 0.90$.

19. The imaging optical lens assembly of claim 1, wherein a double shortest distance from a center to the outer diameter of the lens barrel is BRmin, a double longest distance from the center to the outer diameter of the lens barrel is BRmax, and the following condition is satisfied:
    $BRmin/BRmax < 0.95$.

20. The imaging optical lens assembly of claim 1, further comprising:
    a light blocking element, an opening of the light blocking element is a non-circular opening.

21. The imaging optical lens assembly of claim 1, further comprising:
    at least one reflective element.

22. The imaging optical lens assembly of claim 21, wherein the reflective element is located on an object side of the first lens element.

23. An imaging apparatus, comprising:
    the imaging optical lens assembly of claim 1; and
    an image sensor disposed on the image surface of the imaging optical lens assembly.

24. An electronic device, comprising:
    the imaging apparatus of claim 23.

25. The electronic device of claim 24, wherein the electronic device comprises at least two photographing apparatuses facing towards the same object side of the imaging apparatus in the electronic device.

\* \* \* \* \*